(12) United States Patent
Sole Rojals et al.

(10) Patent No.: US 9,106,913 B2
(45) Date of Patent: Aug. 11, 2015

(54) CODING OF TRANSFORM COEFFICIENTS FOR VIDEO CODING

(75) Inventors: Joel Sole Rojals, La Jolla, CA (US); Rajan Laxman Joshi, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 13/565,621

(22) Filed: Aug. 2, 2012

(65) Prior Publication Data

US 2013/0058407 A1 Mar. 7, 2013

Related U.S. Application Data

(63) Continuation-in-part of application No. 13/413,497, filed on Mar. 6, 2012.

(60) Provisional application No. 61/515,711, filed on Aug. 5, 2011, provisional application No. 61/450,555, filed (Continued)

(51) Int. Cl.
*H04N 19/18* (2014.01)
*H04N 19/00* (2014.01)
*H04N 19/13* (2014.01)

(Continued)

(52) U.S. Cl.
CPC ............ *H04N 19/13* (2014.11); *H04N 19/129* (2014.11); *H04N 19/157* (2014.11); *H04N 19/18* (2014.11); *H04N 19/184* (2014.11); *H04N 19/436* (2014.11); *H04N 19/60* (2014.11); *H04N 19/61* (2014.11); *H04N 19/91* (2014.11)

(58) Field of Classification Search
None
See application file for complete search history.

(56) References Cited

U.S. PATENT DOCUMENTS 1,679,903 A 8/1928 Holinger
5,295,203 A 3/1994 Krause et al.

(Continued)

FOREIGN PATENT DOCUMENTS

EP 1041826 A1 10/2000
EP 1679903 A2 7/2006

(Continued)

OTHER PUBLICATIONS

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

(Continued)

*Primary Examiner* — Jay Patel
*Assistant Examiner* — Reza Aghevli
(74) *Attorney, Agent, or Firm* — Shumaker & Sieffert, P.A.

(57) ABSTRACT

In an example, a method includes coding significance information for transform coefficients in a set of transform coefficients associated with the residual video data according to a scan order in one or more first passes. The method also includes coding a first set of one or more bins of information for the transform coefficients according to the scan order in one or more second passes, where the first set of one or more bins are coded in a first mode of a coding process. The method also includes coding a second set of one or more bins of information for the transform coefficients according to the scan order in one or more third passes, where the second set of one or more bins are coded in a second mode of the coding process.

40 Claims, 33 Drawing Sheets

Related U.S. Application Data on Mar. 8, 2011, provisional application No. 61/451,485, filed on Mar. 10, 2011, provisional application No. 61/451,496, filed on Mar. 10, 2011, provisional application No. 61/452,384, filed on Mar. 14, 2011, provisional application No. 61/494,855, filed on Jun. 8, 2011, provisional application No. 61/497,345, filed on Jun. 15, 2011.

(51) Int. Cl.

| | | |
|---|---|---|
| H04N 19/129 | (2014.01) | |
| H04N 19/61 | (2014.01) | |
| H04N 19/60 | (2014.01) | |
| H04N 19/91 | (2014.01) | |
| H04N 19/157 | (2014.01) | |
| H04N 19/184 | (2014.01) | |
| H04N 19/436 | (2014.01) | |

(56) References Cited

U.S. PATENT DOCUMENTS

| | | | |
|---|---|---|---|
| 5,583,657 A | 12/1996 | Jeong | |
| 5,631,744 A | 5/1997 | Takeuchi et al. | |
| 5,818,877 A | 10/1998 | Tsai et al. | |
| 5,838,825 A | 11/1998 | Obayashi et al. | |
| 5,852,469 A | 12/1998 | Nagai et al. | |
| 6,301,304 B1 | 10/2001 | Jing et al. | |
| 6,646,578 B1 | 11/2003 | Au | |
| 6,680,974 B1 | 1/2004 | Faryar et al. | |
| 6,775,414 B1 | 8/2004 | Fogg et al. | |
| 6,856,701 B2 | 2/2005 | Karczewicz et al. | |
| 7,369,066 B1 | 5/2008 | Benzreba et al. | |
| 7,376,280 B2 | 5/2008 | Handley et al. | |
| 7,379,608 B2 | 5/2008 | Marpe et al. | |
| 7,483,575 B2 | 1/2009 | Fukuhara et al. | |
| 7,522,774 B2 | 4/2009 | Ramasastry et al. | |
| 7,535,387 B1 | 5/2009 | Delva | |
| 7,609,904 B2 | 10/2009 | Miller | |
| 7,702,013 B2 | 4/2010 | Schwarz et al. | |
| 7,813,567 B2 | 10/2010 | Sankaran | |
| 7,843,998 B2 | 11/2010 | Bjontegaard | |
| 7,885,473 B2 | 2/2011 | Sankaran | |
| 7,920,629 B2 | 4/2011 | Bjontegaard et al. | |
| 8,311,119 B2 | 11/2012 | Srinivasan | |
| 8,687,904 B2 | 4/2014 | Sasai et al. | |
| 8,861,599 B2 | 10/2014 | Auyeung et al. | |
| 2002/0122483 A1 | 9/2002 | Tanaka et al. | |
| 2002/0163967 A1 | 11/2002 | Youn et al. | |
| 2003/0016876 A1 | 1/2003 | Chai et al. | |
| 2003/0048208 A1 | 3/2003 | Karczewicz | |
| 2003/0128886 A1 | 7/2003 | Said | |
| 2004/0131272 A1 | 7/2004 | Kobayashi et al. | |
| 2004/0184544 A1 | 9/2004 | Kondo et al. | |
| 2005/0036549 A1 | 2/2005 | He et al. | |
| 2005/0078754 A1 | 4/2005 | Liang et al. | |
| 2006/0078049 A1 | 4/2006 | Bao et al. | |
| 2006/0227865 A1 | 10/2006 | Sherigar | |
| 2007/0036223 A1 | 2/2007 | Srinivasan | |
| 2007/0071331 A1 | 3/2007 | Liu | |
| 2007/0285285 A1 | 12/2007 | Puri et al. | |
| 2008/0013633 A1 | 1/2008 | Ye et al. | |
| 2008/0089425 A1 | 4/2008 | Karczewicz | |
| 2008/0152015 A1 | 6/2008 | Benzreba et al. | |
| 2008/0219578 A1 | 9/2008 | Lee | |
| 2008/0310504 A1 | 12/2008 | Ye et al. | |
| 2008/0310507 A1 | 12/2008 | Ye et al. | |
| 2008/0310745 A1 | 12/2008 | Ye et al. | |
| 2009/0067503 A1* | 3/2009 | Jeong et al. | 375/240.16 |
| 2009/0154820 A1 | 6/2009 | Li et al. | |
| 2009/0175331 A1 | 7/2009 | Karczewicz et al. | |
| 2009/0175332 A1 | 7/2009 | Karczewicz et al. | |
| 2009/0201994 A1* | 8/2009 | Schwarz et al. | 375/240.18 |
| 2009/0201995 A1* | 8/2009 | Schwarz et al. | 375/240.18 |
| 2009/0201996 A1* | 8/2009 | Schwarz et al. | 375/240.18 |
| 2009/0202158 A1 | 8/2009 | Hwang et al. | |
| 2009/0232204 A1 | 9/2009 | Lee et al. | |
| 2009/0273706 A1 | 11/2009 | Tu et al. | |
| 2009/0273796 A1 | 11/2009 | Garben et al. | |
| 2010/0020867 A1* | 1/2010 | Wiegand et al. | 375/240.02 |
| 2010/0040148 A1* | 2/2010 | Marpe et al. | 375/240.16 |
| 2010/0097248 A1* | 4/2010 | Sze et al. | 341/51 |
| 2010/0097250 A1* | 4/2010 | Demircin et al. | 341/107 |
| 2010/0098155 A1* | 4/2010 | Demircin et al. | 375/240.02 |
| 2010/0111432 A1 | 5/2010 | Mohr | |
| 2010/0118971 A1 | 5/2010 | Tanida et al. | |
| 2010/0141489 A1 | 6/2010 | Reznik | |
| 2010/0150226 A1 | 6/2010 | Hallapuro et al. | |
| 2010/0324912 A1 | 12/2010 | Choo et al. | |
| 2011/0001643 A1 | 1/2011 | Sze et al. | |
| 2011/0080956 A1 | 4/2011 | Zhou et al. | |
| 2011/0090955 A1 | 4/2011 | Liu et al. | |
| 2011/0096834 A1 | 4/2011 | Cheon et al. | |
| 2011/0097003 A1 | 4/2011 | Alshina et al. | |
| 2011/0103489 A1 | 5/2011 | Takada | |
| 2011/0206135 A1 | 8/2011 | Drugeon et al. | |
| 2011/0206289 A1 | 8/2011 | Dikbas et al. | |
| 2011/0243220 A1 | 10/2011 | Seregin et al. | |
| 2011/0249755 A1 | 10/2011 | Shibahara et al. | |
| 2011/0255799 A1 | 10/2011 | Omori | |
| 2011/0268183 A1 | 11/2011 | Sole et al. | |
| 2012/0008683 A1 | 1/2012 | Karczewicz et al. | |
| 2012/0027081 A1 | 2/2012 | Endresen et al. | |
| 2012/0082233 A1 | 4/2012 | Sze et al. | |
| 2012/0140813 A1 | 6/2012 | Sole Rojals et al. | |
| 2012/0140814 A1 | 6/2012 | Sole Rojals et al. | |
| 2012/0163456 A1 | 6/2012 | Coban et al. | |
| 2012/0163469 A1 | 6/2012 | Kim et al. | |
| 2012/0163472 A1 | 6/2012 | Sole Rojals et al. | |
| 2012/0183052 A1 | 7/2012 | Lou et al. | |
| 2012/0207400 A1 | 8/2012 | Sasai et al. | |
| 2012/0230417 A1 | 9/2012 | Sole Rojals et al. | |
| 2012/0230418 A1 | 9/2012 | Sole Rojals et al. | |
| 2012/0230419 A1 | 9/2012 | Sole Rojals et al. | |
| 2012/0230420 A1 | 9/2012 | Sole Rojals et al. | |
| 2012/0236929 A1 | 9/2012 | Liu | |
| 2012/0262313 A1 | 10/2012 | He et al. | |
| 2012/0269263 A1 | 10/2012 | Bordes et al. | |
| 2012/0288003 A1 | 11/2012 | Do et al. | |
| 2013/0003834 A1 | 1/2013 | Sole Rojals et al. | |
| 2013/0003835 A1 | 1/2013 | Sole Rojals et al. | |
| 2013/0051472 A1 | 2/2013 | Wiegand et al. | |
| 2013/0114731 A1 | 5/2013 | Lee et al. | |
| 2013/0343454 A1 | 12/2013 | Yeo et al. | |
| 2014/0307777 A1 | 10/2014 | Sole Rojals et al. | |
| 2014/0362925 A1 | 12/2014 | Nguyen et al. | |

FOREIGN PATENT DOCUMENTS

| | | |
|---|---|---|
| EP | 1768415 A1 | 3/2007 |
| EP | 2182732 A1 | 5/2010 |
| JP | 200322485 A | 8/2003 |
| JP | 2006211304 A | 8/2006 |
| WO | 2007043583 A1 | 4/2007 |
| WO | 2007063472 A2 | 6/2007 |
| WO | 2009075445 A1 | 6/2009 |
| WO | 2009134575 A2 | 11/2009 |
| WO | 2010018138 A1 | 2/2010 |
| WO | 2010131546 A1 | 11/2010 |
| WO | 2010143853 A2 | 12/2010 |
| WO | 2011128303 A2 | 10/2011 |
| WO | 2013006446 A1 | 1/2013 |

OTHER PUBLICATIONS

Budagavi et al., "TE8: TI Parallel context processing (PCP) proposal," JCTVC-C062, Oct. 7-15, 2010, 7 pp.

International Preliminary Report on Patentability—PCT/US2012/049518, The International Bureau of WIPO—Geneva, Switzerland—Nov. 13, 2013, 10 pp.

Second Written Opinion from International Application No. PCT/U2012/049518, dated Jul. 2, 2013, 6 pp.

(56) References Cited

OTHER PUBLICATIONS

Response to Written Opinion dated Sep. 19, 2013, from International Application No. PCT/US2011/062700, filed on Jun. 5, 2013, 38 pp.
Response to Second Written Opinion dated Jul. 2, 2013, from International Application No. PCT/US2011/062700, filed on Aug. 30, 2013, 11 pp.
Seregin et al., "Low-complexity adaptive coefficients scanning", Joint Collaborative Team on Video Coding (JCT-VC) of ITU-T SG16 WP3 and ISO/IEC JTC1/SC29/WG11, vol. JCTVC-C205, Oct. 7-15, 2010, XP055012689, 4 pp.
Anonymous: "Test Model under Consideration", 2. JCT-VC Meeting; Jul. 21-28, 2010; Geneva; (Joint Collaborativeteam on Video Coding of ISO/IEC JTC1/SC29/WG11 and ITU-T SG.16); JCTVC-B205, Jul. 28, 2010, XP030007704, ISSN: 0000-0046, Url:http://wftp3.itu.int/av-arch/jctvc-site/.
Bjontegaard et al., "Context-Adaptive VLC (CVLC) Coding of Coefficients (JVT-O028)", Joint Video Team (JUT) of ISO/IEC MPEG & ITU-T VCEG (ISO/IEC JTC1/SC29/WG11 and ITU-T SG16 Q6), May 6, 2002, pp. 1-8, XP002257292.
Bross et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d21, pp. 290.
Bross et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, pp. 226.
Bross et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), pp. 214.
Budagavi et al., "Parallel context processing techniques for high coding efficiency entropy coding in HEVC", 2. JCT-VC Meeting; Jul. 21-28, 2010; Geneva; (Joint Collaborativeteam on Video Coding of ISO/IEC JTCI/SC29/WGII and ITU-T SG.16); Url:http://wftp3.itu.int/av-arch/jctvc-sit e/ 3 No. JCTVC-B088, Jul. 24, 2010, XP030007668, ISSN: 0000-0046.
Choi et al., "Adaptive Coefficient Scanning Based on the Intra Prediction Mode", ETRI Journal, vol. 29, No. 5, Oct. 1, 2007, pp. 694-696, XP55018056.
Davies, "BBC's Response to the Call for Proposals on Video Compression Technologies," JCTVC-A125, 1" meeting: Dresden, DE, Apr. 15-23, 2010, pp. 30.
Davies et al., "Suggestion for a Test Model", 1. JCT-VC Meeting, Apr. 15-23, 2010, Dresden, (Jointcollaborative Team on Video Coding of ISO/IEC JTCI/SC29/WGII and ITU-TSG.16), pp. 30, May 7, 2010, XP030007526.
International Search Report and Written Opinion, dated Sep. 19, 2012 for corresponding PCT Application No. PCT/US2012/049518—ISA/EPO.
International Telecommunication Union, "ITU-T H.264, Series H: Audiovisual and Multimedia Systems, Infrastructure of audiovisual services—Coding of moving video, Advanced video coding for generic audiovisual services," Mar. 2010, pp. 669.
ITU-T H.264, Series H: Audiovisual and Multimedia Systems, Infrastructure of audiovisual services—Coding of moving video, Advanced video coding for generic audiovisual services, The International Telecommunication Union. Jun. 2011, pp. 674.
J. Sole et al., "CE11: Unified scans for the significance map and coefficient level coding in high efficiency", JCTVC-F288, Joint Collaborative Team on Video Coding (JCT-VC) of ITU-T SG16 WP3 and ISO/IEC JTC1/SC29/WG11, 6th Meeting: Torino (Italy), Jul. 2011.
Jie et al., "A most probable scan mode decision for H.264/AVC inter picture coding", IEEE International Conference on Computer Science and Information Technology, Aug. 8, 2009, pp. 401-405, XP031527376, DOI : 10.1109/ICCSIT.2009.5234771 ISBN: 978-1-4244-4519-6 abstract pp. 401-404, sections 2-3.
Jong H. Lee, et al. "An Efficient Encoding of DCT Blocks with Block-Adaptive Scanning." Dec. 12, 1994, pp. 1483-1494 XP000498064.
Joshi et al., "CE7: Mode dependent intra residual coding ",96. MPEG Meeting; Mar. 21-25, 2011; Geneva; (Motion Picture Expert Group or ISO/IEC JTC1/SC29/WG11),No. m19613, Mar. 17, 2011, XP030048180,second paragraph of section 1.2.
Kim et al., "Efficient entropy coding scheme for H.264/AVC lossless video coding," Elsevier, Image Communication, Apr. 24, 2010, pp. 10.
Marpe et al., "Context-based adaptive binary arithmetic coding in the H.264/AVC video compression standard", IEEE Transactions on Circuits and Systems for Video Technology, Jul. 1, 2003, pp. 620-636, vol. 13, No. 7, IEEE Service Center, XP011099255, ISSN: 1051-8215, DOI: 10.1109/TCSVT.2003.815173.
Marpe et al., "Unified PIPE-Based Entropy Coding for HEVC",6. JCT-VC Meeting; 97. MPEG Meeting;Jul. 14-22, 2011; Torino; (Joint Collaborative Team on Video Coding of ISO/IEC JTC1/SC29/WG11 and ITU-T SG.16 );Url:http://wftp3.itu.int/av-arch/jctvc-site/,No. JCTVC-F268, Jul. 15, 2011,XP030009291.
McCann et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, pp. 42.
Schaar-Mitrea et al., "Novel embedded compression algorithm for memory reduction in MPEG codecs" Proceedings of the SPIE—The International Society for Optical Engineering, SPIE, US, vol. 3653, Dec. 28, 1998, pp. 864-873, XP007902593 ISSN: 0277-786X abstract figure 2 pp. 868-869, section 3.4.
Min et al., "Adaptive significance map coding for large transform", 6. JCT-VC Meeting, Jul. 14-22, 2011, Torino, (Joint Collaborative Team on Video Coding of ISO/IEC JTC1/SC29/WG11 and ITU-T SG.16 ), Url: http://wftp3.itu.int/av-arch/jctvc-site/, No. JCTVC-F598, Jul. 16, 2011, XP030009621.
Misra et al., "A memory efficient method for fast transposing run-length encoded images", This paper appears in: Proceedings of the Fifth International Conference on Document Analysis and Recognition, 1999. ICDAR '99, Sep. 20-22, 1999.
Nguyen et al., "Improved Context Modeling for Coding Quantized Transform Coefficients in Video Compression", Dec. 8, 2010, Picture Coding Symposium, XP030082008.
Nguyen et al., "Context Set Selection for Coefficient Level Coding", 8. JCT-VC Meeting; 99. MPEG Meeting; Feb. 1-10, 2012; San Jose; (Joint Collaborative Team on Video Coding of ISO/IEC JTCI/SC29/WGII and ITU-T SG. 16) ; Url: http://wftp3.itu.int/av-arch/jctvc-site/, No. JCTVC-H0404, Jan. 20, 2012, XP030111431, pp. 1-3, sections 1-2.
Nguyen et al., "Reduced-complexity entropy coding of transform coefficient levels using a combination of VLC and PIPE", 95. MPEG Meeting; Jan. 24-28, 2011;Daegu; (Motion Picture Expert Group or ISO/IEC JTC1/SC29/WG11),No. m19102, Jan. 26, 2011, XP030047669.
Puri et al., "Improvements in DCT Based Video Coding", Proceedings of SPIE, vol. 3024, No. Part 01, Feb. 12, 1997, pp. 676-688, XP000199866, ISSN: 0277-786X, DOI: 10.1117/12.263279 p. 680, section 3.1.3.
Seregin et al., "Low-complexity adaptive coefficients scanning", Joint Collaborative Team on Video Coding (JCT-VC) of ITU-T SG16 WP3 and ISO/IEC JTC1/SC29/WG11, vol. JCTVC-C205v3, Oct. 7, 2010, XP55018069.
Shim et al., "Adaptive Scanning Patterns for Intra Prediction", ITU—Telecommunications Standardization Sector Study Group 16 Question 6 Video Coding Experts Group (VCEG) 34th Meeting: Antalya,

(56) References Cited

OTHER PUBLICATIONS

Turkey, vol. VCEG-AH14, Jan. 12, 2008, Jan. 13, 2008, XP55018051, abstract pp. 1-5, sections 1-2.
Sole et al., "CE11: Parallel Context Processing for the significance map in high coding efficiency", 96. MPEG Meeting; Mar. 21-25, 2011; Geneva; (Motion Picture Expert Group or ISO/IEC JTC1/SC29/WG11),No. m19866, Mar. 17, 2011,XP030048433.
Sole et al., "CE11: Removal of the parsing dependency of residual coding on intra mode", 98. MPEG Meeting; Nov. 28, 2011-Dec. 2, 2011; Geneva; (Motion Picture Expert Group or ISO/IEC JTC1/SC29/WG11),No. m21883, Nov. 19, 2011, XP030050446.
Sole et al., "Parallel Context Processing for the significance map in high coding efficiency", 4. JCT-VC Meeting; 95. MPEG Meeting; Jan. 20-28, 2011; Daegu; (Joint Collaborative Team on Video Coding of ISO/IEC JTC1/SC29/WG11 and ITU-T SG. 16); Url: http://wftp3.itu.int/av-arch/jctvc-site/, No. JCTVC-D262, Jan. 16, 2011, XP030008302, ISSN: 0000-0013.
Sole et al., "Parallel Context Processing for the significance map in high coding efficiency ",95. MPEG Meeting; Jan. 24-28, 2011; Daegu; (Motion Picture Expert Group or ISO/IEC JTC1/SC29/WG11) No. m19026 Jan. 21, 2011, XP030047594, abstract sections 2.1 and 2.2.
Sole et al., "Parallel processing of residual data in HE", 6. JCT-VC Meeting; 97. MPEG Meeting; Jul. 14-22, 2011; Torino; (Joint Collaborative Team on Video Coding of ISO / IEC JTCI/SC29/WGII and ITU-T SG. 16 ); Url:http://wftp3.itu.int/av-arch/jctvc-site/, No. JCTVC-F552, Jul. 16, 2011, XP03000957.
Sole et al., "Removal of the parsing dependency of residual coding on intra mode", 6. JCT-VC Meeting; 97. MPEG Meeting;Jul. 14-22, 2011; Torino; (Joint Collaborative Team on Video Coding of ISO/IEC JTC1/SC29/WG11 and ITU-T SG.16 ); Url:http://wftp3.itu.int/av-arch/jctvc-site/,No. JCTVC-F550, Jul. 17, 2011, XP030009573.
Sole et al., "Unified scans for the significance map and coefficient level coding in high coding efficiency", 5. JCT-VC Meeting; 96. MPEG Meeting; Mar. 16-23, 2011; Geneva; (Joint Collaborative Team on Video Coding of ISO / IEC JTC1/SC29/WG11and ITU-T SG. 16) ; Url: http://wftp3. itu. int/av-arch/jc tvc-site/, No. JCTVC-E335, Mar. 11, 2011, XP030008841, ISSN: 0000-0005.
Sole et al., "Unified scans for the significance map and coefficient level coding in high coding efficiency", 96. MPEG Meeting; Mar. 21-25, 2011; Geneva; (Motion Picture Expert Group or ISO/IEC JTC1/SC29/WG11),No. m19863, Mar. 19, 2011,XP030048430, second paragraph of section 1 section 2.1 section 2.2.
Sole et al., "CE11: Scanning Passes o f Residual Data i n HE", 7. JCT-VC Meeting; 98. MPEG Meeting; Nov. 21-30, 2011 Geneva; (Joint Collaborative Team on Video Coding of ISO / IEC JTCI/SC29/WG11 and ITU-T SG. 16) ; Url: http://wftp3.itu. int/av-arch/jctvc-site/, No. JCTVC-G320, Nov. 9, 2011, XP030110304.
Sole et al., "JCTVC-D262—Parallel Context Processing for the significance map in high coding efficiency",Powerpoint, Qualcomm, Inc., Jan. 20-28, 2011, pp. 8.
Sze, CE11: Coding efficiency of tools i n HHI Transform—Coding (JCTVC-A116), 95. MPEG Meeting; Jan. 24-28, 2011; Daegu; (Motion Picture Expert Group or ISO / IEC JTCI/SC29/WGII), No. m18949, Jan. 21, 2011, XP030047518.
Sze et al., "Parallel Context Processing of Coefficient Level", 6. JCT-VC Meeting;97. MPEG Meeting; Jul. 14-22, 2011; Torino; (Joint Collaborative Team on Video Coding of ISO/IEC JTC1/SC29/WG11 and ITU-T SG.16 );Url: http://wftp3.itu.int/av-arch/jctvc-site/, No. JCTVC-F130, Jul. 22, 2011, XP030009153.
Davies, "Unified scan processing for high efficiency coefficient coding", 4. JCT-VC Meeting; 95. MPEG Meeting; Jan. 20-28, 2011; Daegu; (Joint Collaborative Team on Video Coding of ISO / IEC JTC1/SC29/WG11and ITU-T SG. 16) ; Jan. 15, 2011, XP030008259, ISSN: 0000-0013. Url: http://wftp3. itu. int/av-arch/jc tvc-site/, No. JCTVC-D219.
Wiegand et al., "WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
Wiegand et al., "WD2: Working Draft 2 of High-Efficiency Video Coding", Jan. 28, 2011, No. JCTVC-D503, Jan. 28, 2011, XP002679642, Retrieved from the Internet: Url: http://wftp3.itu.int/av-arch/jctvc-site/2011_01_D_Daegu/ [retrieved on Jul. 11, 2012].
Wiegand et al., "WD3: Working Draft 3 of High-Efficiency Video Coding," Document JCTVC-E603, 5th Meeting: Geneva, CH, Mar. 16-23, 2011, pp. 193.
Winken, et al., "Video Coding Technology Proposal by Fraunhofer HHI", Powerpoint, Fraunhofer Institute for Telecommunications, Heinrich Hertz Insititute, Apr. 24, 2010.
Winken et al., "Video coding technology proposal by Fraunhofer HHI", 1. JCT-VC Meeting; Apr. 15-23, 2010; Dresden; (Jointcollaborative Team on Video Coding of ISO/IEC JTC1/SC29/WG11 and ITU-TSG. 16) ; Url: http://wftp3. itu. int/av-arch/jctvc-site/, No. XP030007556, Apr. 24, 2010, XP030007557.
Ye, "Improved intra coding", 33. VCEG Meeting; 82. MPEG Meeting; Oct. 20, 2007; Shenzhen; (Video Coding Experts Group of ITU-T SG.16), No. VCEG-AG11, Oct. 20, 2007, XP030003615, ISSN: 0000-0095.
Yu et al., "Probability Modeling for Encoding Quantized Transform Coefficients", 25. Picture Coding Symposium, Apr. 24-26, 2006, XP030080334.
Zhang et al. "Context-Based Entropy Coding in AVS Video Coding Standard", Signal Processing. Image Communication, Apr. 1, 2009, pp. 263-276, vol. 24, No. 4, Elsevier Science Publishers, XP026091625, ISSN: 0923-5965, DOI: 10.1016.
Zhang et al., "Non-CE1: On CABAC parsing throughput",8. JCT-VC Meeting; 99. MPEG Meeting; Feb. 1-10, 2012; San Jose; (Joint Collaborative Team on Video Coding of ISO/IEC JTC1/SC29/WG11 and ITU-T SG.16 ); Url: http://wftp3.itu.int/av-arch/jctvc-site/, No. JCTVC-H0533, Jan. 30, 2012, XP030111560.
International Telecommunication Union, "ITU-T H.265, Series H: Audiovisual and Multimedia Systems, Infrastructure of audiovisual services—Coding of moving video, Advanced video coding for generic audiovisual services," Apr. 2013, 317 pp.
Response to Written Opinion dated Sep. 19, 2013, from International Application No. PCT/US2012/049518, filed on Jun. 5, 2013, 38 pp.
Response to Second Written Opinion dated Jul. 2, 2013, from International Application No. PCT/US2012/049518, filed on Aug. 30, 2013, 11 pp.
Auyeung et al., "Context reduction of the last transform position in JCTVC-D262 for CE11.1", 5. JCT-VC meeting; 96. MPEG meeting; Mar. 16-23, 2011; Geneva; (Joint Collaborative Team on Video Coding of ISO/IEC JTC1/SC29/WG11and ITU-T SG.16 ); Url: http://wftp3.itu.int/av-arch/jctvc-site/ No. JCTVC-E344, Mar. 11, 2011, XP030008850, ISSN: 0000-0005 (6 pages).
Wei Y., et al., "Context Probability Modeling for Encoding Quantized Transform Coefficients", PCS2006, Entropy Coding Special Session, Apr. 30, 2006, 5 Pages, [Retrieved on Dec. 4, 2014], Retrieved from the Internet: Url: http://read.pudn.com/downloads94/ebook/370478/Context%20Probability%20Modeling%20for%20Encoding%20Quantized%20Transform%20Coefficients%20web.pdf (6 pages).
Marpe et al., "Novel entropy coding concept," Document JCTVC-A032, 1st Meeting: Dresden, DE, Apr. 15-23, 2010, 17pp.
Sasai H., et al., "Simplified Context Modeling for Transform Coefficient Coding", Joint Collaborative Team on Video Coding (JCT-VC) of ITU-T SG16 WP3 and ISO/IEC JTC1/SC29/WG11 JCTVC-D185, Jan. 2011 (5 pages).
Sze (TI) V: "Context selection complexity in HEVC CABAC", 4. JCT-VC Meeting; 95. MPEG Meeting; Jan. 20-28, 2011; Daegu;(Joint Collaborative Team on Video Coding of ISO/IEC JTC1/SC29/WG11and ITU-T SG.16 ); Url: http://wftp3.itu.int/av-arch/jctvc-site/ No. JCTVC-D244, Jan. 16, 2011, XP030008284, ISSN: 0000-0013 (3 pages).
Ye et al., "Improved H.264 Intra Coding Based on Bi-Directional Intra Prediction, Directional Transform, and Adaptive Coefficient Scanning," 2008 (4 pages).

(56) References Cited

OTHER PUBLICATIONS

Zheng et al., "CE11: Mode Dependent Coefficient Scanning", 4. JCT-VC Meeting; 95. MPEG Meeting; Jan. 20-28, 2011; Daegu; (Joint Collaborative Team on Video Coding of ISO/IEC JTC1/SC29/WG11and ITU-T SG.16); No. JCTVC-D393, Jan. 16, 2011, XP030008432, ISSN: 0000-0013, Url: http://wftp3.itu.int/av-arch/jctvc-site (4 pages).
Australian Examination Report from related Australian Application No. 2012225458 dated Nov. 13, 2014 (2 pages).
Japanese Office Action from related Japanese Application No. 2013-557833 dated Dec. 16, 2014 (9 pages) including a translation.
Joshi, et al, "Mode dependent intra residual coding [online]," Joint Collaborative Team on Video Coding (JCT-VC) of ITU-T SG16 WP3 and ISO/IEC JTC1/SC29/WG11 JCTVC-D392, Jan. 2011, 5 pp.
First Examination Report from counterpart Australian Patent Application No. 2012294683, dated Oct. 30, 2014, 3 pp.
U.S. Appl. No. 14/448,936, by Sole Rojals; Joel, et al., filed Jul. 31, 2014.
Seregin V., et.al., "Utilisation of CABAC equal probability mode for intra modes coding", Joint Collaborative Team on Video Coding (JCT-VC) of ITU-T SG16 WP3 and ISO/IEC JTC1/SC29/WG11, version 3, Document: JCTVC-F376, Jul. 16, 2011 (3 pages).

\* cited by examiner

17

21

19

15

CODING OF TRANSFORM COEFFICIENTS FOR VIDEO CODING

This application claims the benefit of U.S. Provisional Application No. 61/515,711, filed 5 Aug. 2011 and is a continuation-in-part of U.S. application Ser. No. 13/413,497, filed 6 Mar. 2012, which claims the benefit of U.S. Provisional Application No. 61/450,555, filed 8 Mar. 2011, U.S. Provisional Application No. 61/451,485, filed 10 Mar. 2011, U.S. Provisional Application No. 61/451,496, filed 10 Mar. 2011, U.S. Provisional Application No. 61/452,384, filed 14 Mar. 2011, U.S. Provisional Application No. 61/494,855, filed 8 Jun. 2011 and U.S. Provisional Application No. 61/497,345, filed 15 Jun. 2011. This application hereby incorporates by reference each of the non-provisional and provisional applications listed above in their entirety.

TECHNICAL FIELD

This disclosure relates to video coding, and more particularly to techniques for scanning and coding transform coefficients generated by video coding processes.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes devices and methods for coding transform coefficients associated with a block of residual video data in a video coding process. The techniques, structures and methods described in this disclosure are applicable for video coding processes that use entropy coding (e.g., context adaptive binary arithmetic coding (CABAC)) to code syntax elements relating to the transform coefficients. Aspects of this disclosure include the selection of a scan order for both significance coding and level and sign coding, for the transform coefficients, as well as the selection of contexts for entropy coding consistent with the selected scan order. The techniques, structures and methods of this disclosure are applicable for use in both a video encoder and a video decoder.

This disclosure proposes a harmonization of the scan order to code both the significance map of the transform coefficients as well as to code the levels of the transform coefficient. That is to say, in some examples, the scan order for the significance map and the level coding should have the same pattern and direction. In another example, it is proposed that the scan order for the significance map should be in the inverse direction (i.e., from the coefficients for higher frequencies to the coefficients for lower frequencies). In yet another example, it is proposed that the scan order for the significance map and the level coding should be harmonized such that each proceeds in an inverse direction.

This disclosure also proposes that, in some examples, the transform coefficients be scanned in sub-sets. In particular, transform coefficients are scanned in a sub-set consisting of a number of consecutive coefficients according to the scan order. Such sub-sets may be applicable for both the significance map scan as well as the coefficient level scan.

Additionally, this disclosure proposes that, in some examples, the significance map and the coefficient level scan are performed in consecutive scans and according to the same scan order. In one aspect, the scan order is an inverse scan order. The consecutive scans may include several scan passes. Each scan pass may include a syntax element scan pass. For example, a first scan is the significance map scan (also called bin 0 of the level of transform coefficients), a second scan is of bin one of the levels of transform coefficients in each sub-set (i.e., transform coefficients having level greater than 1), a third scan may be of bin two of the levels of transform coefficients in each sub-set (i.e., transform coefficients having level greater than 2), a fourth scan is of the remaining bins of the levels of transform coefficients (i.e., remaining level greater than 2), and a fifth scan is of the sign of the levels of transform coefficients (i.e., plus or minus sign). The sign pass may be at any point after the significance map pass. Additionally, the number of scan passes can be reduced by coding more than one syntax element per pass. For example, there may be one scan pass for the syntax elements using coded bins and a second scan pass for the syntax elements using bypass bins (e.g., the remaining levels and the sign). In this context, a bin is part of the bin string that is entropy coded. A given non-binary valued syntax element is mapped to a binary sequence (the so-called bin string).

This disclosure also proposes that, in some examples, the transform coefficients are entropy coded using CABAC in two different context regions. The context derivation for a first context region depends on the position of the transform coefficients while the context derivation for the second region depends on causal neighbors of the transform coefficients. In another example, the second context region can use two different context models depending on the location of the transform coefficients.

In one example of the disclosure, a method of coding transform coefficients associated with residual video data in a video coding process is proposed. The method comprises arranging a block of transform coefficients into one or more sub-sets of transform coefficients based on a scan order, coding a first portion of levels of transform coefficients in each sub-set, wherein the first portion of levels includes at least a significance of the transform coefficients in each sub-set, and coding a second portion of levels of transform coefficients in each sub-set.

In another example of the disclosure, a system for coding transform coefficients associated with residual video data in a video coding process is proposed. The system comprises a video coding unit configured to arrange a block of transform coefficients into one or more sub-sets of transform coefficients based on a scan order, code a first portion of levels of transform coefficients in each sub-set, wherein the first portion of levels includes at least a significance of the transform coefficients in each sub-set, and code a second portion of levels of transform coefficients in each sub-set.

In another example of the disclosure, a system for coding transform coefficients associated with residual video data in a video coding process is proposed. The system comprises means for arranging a block of transform coefficients into one or more sub-sets of transform coefficients based on a scan order, means for coding a first portion of levels of transform coefficients in each sub-set, wherein the first portion of levels includes at least a significance of the transform coefficients in each sub-set, and means for coding a second portion of levels of transform coefficients in each sub-set.

In another example of the disclosure, a computer program product comprises a computer-readable storage medium having stored thereon instructions that, when executed, cause a processor of a device for coding transform coefficients associated with residual video data in a video coding process to arrange a block of transform coefficients into one or more sub-sets of transform coefficients based on a scan order, code a first portion of levels of transform coefficients in each sub-set, wherein the first portion of levels includes at least a significance of the transform coefficients in each sub-set, and code a second portion of levels of transform coefficients in each sub-set.

In another example of the disclosure, a method of coding transform coefficients associated with residual video data in a video coding process comprises coding significance information for transform coefficients in a set of transform coefficients associated with the residual video data according to a scan order in one or more first passes, coding a first set of one or more bins of information for the transform coefficients according to the scan order in one or more second passes, wherein the one or more second passes are different from the one or more first passes, and wherein the first set of one or more bins are coded in a first mode of a coding process, and coding a second set of one or more bins of information for the transform coefficients according to the scan order in one or more third passes, wherein the one or more third passes are different from the one or more first and second passes, and wherein the second set of one or more bins are coded in a second mode of the coding process.

In another example of the disclosure, an apparatus for coding transform coefficients associated with residual video data comprises one or more processors configured to code significance information for transform coefficients in a set of transform coefficients associated with the residual video data according to a scan order in one or more first passes, code a first set of one or more bins of information for the transform coefficients according to the scan order in one or more second passes, wherein the one or more second passes are different from the one or more first passes, and wherein the first set of one or more bins are coded in a first mode of a coding process, and code a second set of one or more bins of information for the transform coefficients according to the scan order in one or more third passes, wherein the one or more third passes are different from the one or more first and second passes, and wherein the second set of one or more bins are coded in a second mode of the coding process.

In another example of the disclosure, an apparatus for coding transform coefficients associated with residual video data comprises means for coding significance information for transform coefficients in a set of transform coefficients associated with the residual video data according to a scan order in one or more first passes, means for coding a first set of one or more bins of information for the transform coefficients according to the scan order in one or more second passes, wherein the one or more second passes are different from the one or more first passes, and wherein the first set of one or more bins are coded in a first mode of a coding process, and means for coding a second set of one or more bins of information for the transform coefficients according to the scan order in one or more third passes, wherein the one or more third passes are different from the one or more first and second passes, and wherein the second set of one or more bins are coded in a second mode of the coding process.

In another example of the disclosure, a non-transitory computer readable storage medium has instructions stored thereon that, when executed, cause one or more processors to code significance information for transform coefficients in a set of transform coefficients associated with the residual video data according to a scan order in one or more first passes, code a first set of one or more bins of information for the transform coefficients according to the scan order in one or more second passes, wherein the one or more second passes are different from the one or more first passes, and wherein the first set of one or more bins are coded in a first mode of a coding process, and code a second set of one or more bins of information for the transform coefficients according to the scan order in one or more third passes, wherein the one or more third passes are different from the one or more first and second passes, and wherein the second set of one or more bins are coded in a second mode of the coding process.

The details of one or more examples are set forth in the accompanying drawings and the description below. Other features, objects, and advantages will be apparent from the description and drawings, and from the claims.

DETAILED DESCRIPTION

Figure 1:
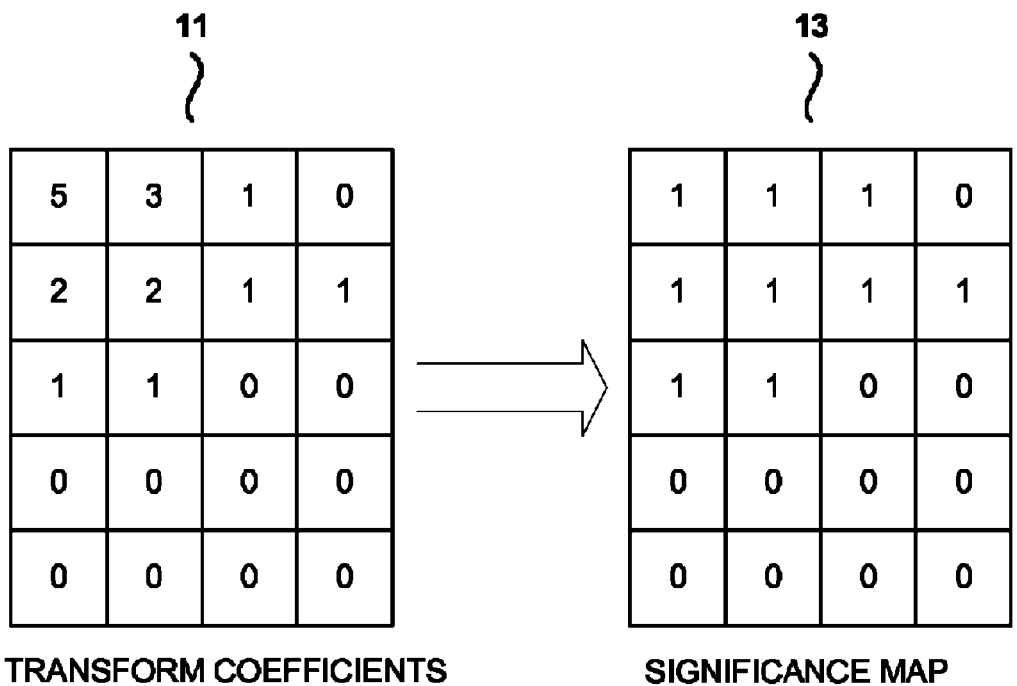
FIG. 1 is a conceptual diagram illustrating a significance map coding process.

Digital video devices implement video compression techniques to transmit and receive digital video information more efficiently. Video compression processes may apply spatial (intra-frame) prediction and/or temporal (inter-frame) prediction techniques to reduce or remove redundancy inherent in video sequences.

For video coding according to the high efficiency video coding (HEVC) standard currently under development by the Joint Cooperative Team for Video Coding (JCT-VC), as one example, a video frame may be partitioned into coding units. The latest Working Draft (WD) of HEVC, and referred to as HEVC WD7 hereinafter, is available from http://phenix.int-evey.fr/jct/doc_end_user/documents/9_Geneva/wg11/JCTVC-I1003-v5.zip, with a more recent version available from http://phenix.int-evey.fr/jct/doc_end_user/documents/9_Geneva/wg11/JCTVC-I1003-v6.zip, both of which are hereby incorporated by reference as if set forth in their entirety herein.

According to HEVC, a coding unit generally refers to an image region that serves as a basic unit to which various coding tools are applied for video compression. A coding unit is typically square (though not necessarily), and may be considered to be similar to a so-called macroblock, e.g., under other video coding standards such as ITU-T H.264. Coding according to some of the proposed aspects of the developing HEVC standard will be described in this application for purposes of illustration. However, the techniques described in this disclosure may be useful for other video coding processes, such as those defined according to H.264 or other standard or proprietary video coding processes.

To achieve desirable coding efficiency, a coding unit (CU) may have variable sizes depending on video content. In addition, a coding unit may be split into smaller blocks for prediction or transform. In particular, each coding unit may be further partitioned into prediction units (PUs) and transform units (TUs). Prediction units may be considered to be similar to so-called partitions under other video coding standards, such as the H.264 standard. A transform unit (TU) generally refers to a block of residual data to which a transform is applied to produce transform coefficients.

A coding unit usually has a luminance component, denoted as Y, and two chroma components, denoted as U and V. Depending on the video sampling format, the size of the U and V components, in terms of number of samples, may be the same as or different from the size of the Y component.

To code a block (e.g., a prediction unit of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same frame (or slice), and other prediction units may be uni-directionally inter-coded (P) or bi-directionally inter-coded (B) with respect to blocks of reference samples in other previously-coded frames (or slices). In each case, the reference samples may be used to form a predictive block for a block to be coded.

Upon identification of a predictive block, the difference between the original video data block and its predictive block is determined. This difference may be referred to as the prediction residual data, and indicates the pixel differences between the pixel values in the block to the coded and the pixel values in the predictive block selected to represent the coded block. To achieve better compression, the prediction residual data may be transformed, e.g., using a discrete cosine transform (DCT), an integer transform, a Karhunen-Loeve (K-L) transform, or another transform.

The residual data in a transform block, such as a TU, may be arranged in a two-dimensional (2D) array of pixel difference values residing in the spatial, pixel domain. A transform converts the residual pixel values into a two-dimensional array of transform coefficients in a transform domain, such as a frequency domain. For further compression, the transform coefficients may be quantized prior to entropy coding. An entropy coder then applies entropy coding, such as Context Adaptive Variable Length Coding (CAVLC), Context Adaptive Binary Arithmetic Coding (CABAC), Probability Interval Partitioning Entropy Coding (PIPE), or the like, to the quantized transform coefficients.

To entropy code a block of quantized transform coefficients, a scanning process is usually performed so that the two-dimensional (2D) array of quantized transform coefficients in a block is processed, according to a particular scan order, in an ordered, one-dimensional (1D) array, i.e., vector, of transform coefficients. Entropy coding is applied in the 1-D order of transform coefficients. The scan of the quantized transform coefficients in a transform unit serializes the 2D array of transform coefficients for the entropy coder. A significance map may be generated to indicate the positions of significant (i.e., non-zero) coefficients. Scanning may be applied to scan levels of significant (i.e., nonzero) coefficients, and/or to code signs of the significant coefficients.

For a DCT, as an example, there is often a higher probability of non-zero coefficients toward an upper left corner (i.e., a low frequency region) of the 2D transform unit. It may be desirable to scan the coefficients in a way that increases the probability of grouping non-zero coefficients together at one end of the serialized run of coefficients, permitting zero-valued coefficients to be grouped together toward another end of the serialized vector and more efficiently coded as runs of zeros. For this reason, scan order may be important for efficient entropy coding.

As one example, the so-called diagonal (or wavefront) scan order has been adopted for use in scanning quantized transform coefficients in the HEVC standard. Alternatively, zig-zag, horizontal, vertical or other scan orders may be used. Through transform and quantization, as mentioned above, non-zero transform coefficients are generally located at the low frequency area toward the upper left region of the block for an example in which the transform is a DCT. As a result, after the diagonal scanning process, which may traverse the upper left region first, non-zero transform coefficients are usually more likely to be located in the front portion of the scan. For a diagonal scanning process that traverses from the lower right region first, the non-zero transform coefficients are usually more likely to be located in the back portion of the scan.

A number of zero-valued coefficients will typically be grouped at one end of the scan, depending on the scan direction, due to reduced energy at higher frequencies, and due to the effects of quantization, which may cause some nonzero coefficients to become zero-valued coefficients upon reduction of bit depth. These characteristics of coefficient distribution in the serialized 1D array may be utilized in entropy coder design to improve coding efficiency. In other words, if non-zero coefficients can be effectively arranged in one portion of the 1D array through some appropriate scan order, better coding efficiency can be expected due to the design of many entropy coders.

To achieve this objective of placing more non-zero coefficients at one end of the 1D array, different scan orders may be used in a video encoder-decoder (CODEC) to code transform coefficients. In some cases, diagonal scanning may be effective. In other cases, different types of scanning, such as zig-zag, vertical or horizontal scanning may be more effective.

Different scan orders may be produced in a variety of ways. One example is that, for each block of transform coefficients, a "best" scan order may be chosen from a number of available scan orders. A video encoder then may provide an indication to the decoder, for each block, of an index of the best scan order among a set of scan orders denoted by respective indices. The selection of the best scan order may be determined by applying several scan orders and selecting one that is most effective in placing nonzero coefficients near the beginning or end of the 1D vector, thereby promoting efficient entropy coding.

In another example, the scan order for a current block may be determined based on various factors relating to the coding of the pertinent prediction unit, such as the prediction mode (I, B, P), block size, transform or other factors. In some cases, because the same information, e.g., prediction mode, can be inferred at both the encoder and decoder side, there may be no need to provide an indication of the scan order index to the decoder. Instead, the video decoder may store configuration data that indicates the appropriate scan order given knowledge of the prediction mode for a block, and one or more criteria that maps a prediction mode to a particular scan order.

To further improve coding efficiency, the available scan orders may not be constant all of the time. Instead, some adaptation might be enabled so that the scan order is adaptively adjusted, e.g., based on coefficients that are already coded. In general, the scan order adaptation may be done in such a way that, according to the selected scan order, zero and non-zero coefficients are more likely to be grouped together.

In some video CODECs, the initial available scan orders may be in a very regular form such as purely horizontal, vertical, diagonal, or zig-zag scan. Alternatively, the scan orders may be derived through a training process and therefore may appear to be somewhat random. The training process may involve application of different scan orders to a block or series of blocks to identify a scan order that produces desirable results, e.g., in terms of efficient placement of non-zero and zero-valued coefficients, as mentioned above.

If a scan order is derived from a training process, or if a variety of different scan orders can be selected, it may be beneficial to save the particular scan orders at both the encoder and decoder side. The amount of data specifying such scan orders can be substantial. For example, for a 32×32 transform block, one scan order may contain 1024 transform coefficient positions. Because there may be differently sized blocks and, for each size of transform block, there may be a number of different scan orders, the total amount of data that needs to be saved is not negligible. Regular scan orders such as diagonal, horizontal, vertical or zig-zag order may not require storage, or may require minimal storage. However, diagonal, horizontal, vertical or zig-zag orders may not provide sufficient variety to provide coding performance that is on par with trained scan orders.

In one example, for H.264 and the HEVC standard presently under development, when the CABAC entropy coder is used, the positions of the significant coefficients (i.e., nonzero transform coefficients) in the transform block (i.e., transform unit in HEVC) are encoded prior to the levels of the coefficients. The process of coding the locations of the significant coefficients is called significance map coding. The significance of a coefficient is the same as the bin zero of the coefficient level. As shown in FIG. 1, significance map coding of the quantized transform coefficients 11 produces a significance map 13. The significance map 13 is a map of ones and zeros, where the ones indicate locations of significant coefficients. The significance map typically requires a high percentage of the video bit-rate. The techniques of this disclosure may also be applicable for use with other entropy coders (e.g., PIPE).

An example process for coding a significance map is described in D. Marpe, H. Schwarz, and T. Wiegand "Context-Based Adaptive Binary Arithmetic Coding in the H.264/AVC Video Compression Standard," IEEE Trans. Circuits and Systems for Video Technology, vol. 13, no. 7, July 2003. In this process, the significance map is coded if there is at least one significant coefficient in the block, as indicated by the Coded Block Flag (CBF), which is defined as:

Coded Block Flag: coded_block_flag is a one-bit symbol, which indicates if there are significant, i.e., nonzero coefficients inside a single block of transform coefficients, for which the coded block pattern indicates non-zero entries. If coded_block_flag is zero, no further information is transmitted for the related block.

If there are significant coefficients in the block, the significance map is encoded by following a scan order of transform coefficients in the block as follows:

Scanning of Transform Coefficients: two-dimensional arrays of transform coefficient levels of sub-blocks for which the coded_block_flag indicates nonzero entries are first mapped into a one-dimensional list using a given scanning pattern. In other words, sub-blocks with significant coefficients are scanned according to a scanning pattern.

Given the scanning pattern, the significance map is scanned as follows:

Significance Map: If the coded_block_flag indicates that a block has significant coefficients, a binary-valued significance map is encoded. For each transform coefficient in the scanning order, a one-bit symbol significant_coeff_flag is transmitted. If the significant_coeff_flag symbol is one, i.e., if a nonzero coefficient exists at this scanning position, a further one-bit symbol last_significant_coeff_flag is sent. This symbol indicates if the current significant coefficient is the last one inside the block or if further significant coefficients follow. If the last scanning position is reached and the significance map encoding was not already terminated by a last_significant_coeff_flag with value one, it is apparent that the last coefficient has to be significant.

Recent proposals for HEVC have removed the last_significant_coeff_flag. In those proposals, before sending the significance map, an indication of the X and Y position of the position of the last significant coefficient is sent.

Figure 2:
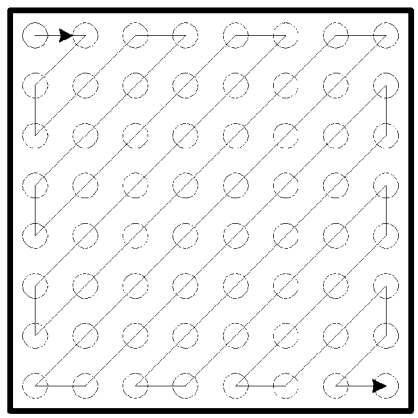
FIG. 2 is a conceptual diagram illustrating scanning patterns and directions for significance map coding.
Figure 2:
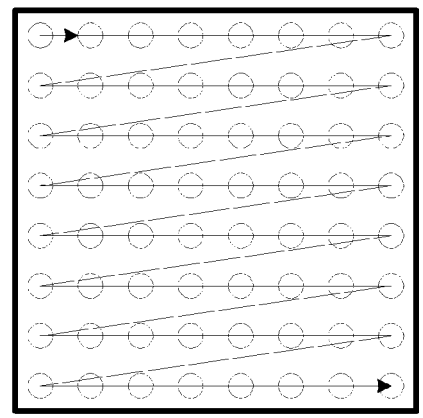
Figure 2:
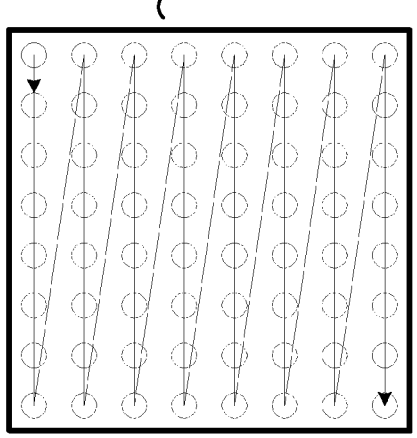
Figure 2:
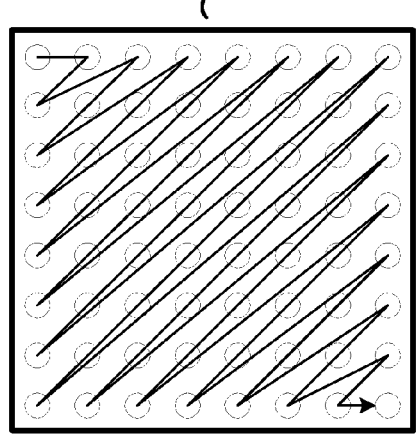

In one proposal for HEVC, it is proposed that three scan patterns be used for the significance map: diagonal, vertical, and horizontal. FIG. 2 shows an example of a zig-zag scan 17, a vertical scan 19, a horizontal scan 21, and a diagonal scan 15. As shown in FIG. 2, each of these scans proceeds in a forward direction, i.e., from lower frequency transform coefficients in the upper left corner of the transform block to the higher frequency transform coefficients in the lower right corner of the transform block. After the significance map is coded, the remaining level information (bins 1–N, where N is the total number of bins) for each significant transform coefficient (i.e., the coefficient value) is coded.

In the CABAC process previously specified in the H.264 standard, following the handling of 4×4 sub-blocks, each of the transform coefficient levels is binarized, e.g., according to a unary code, to produce a series of bins. In H.264, the CABAC context model set for each sub-block consists of two times five context models with five models for both the first bin and all remaining bins (up to and including the 14$^{th}$ bin) of the coeff_abs_level_minus_one syntax element, which encodes the absolute value of a transform coefficient. Notably, in one proposed version of HEVC, the remaining bins include only bin 1 and bin 2. The remainder of the coefficient levels are bypass coded with Golomb-Rice coding and exponential Golomb codes. Bypass coding bypasses the CABAC coding engine for the bypass coded bins.

In HEVC, the selection of context models may be performed as in the original CABAC process proposed for the H.264 standard. However, different sets of context models may be selected for different sub-blocks. In particular, the choice of the context model set for a given sub-block depends on certain statistics of the previously coded sub-blocks.

Figure 3:
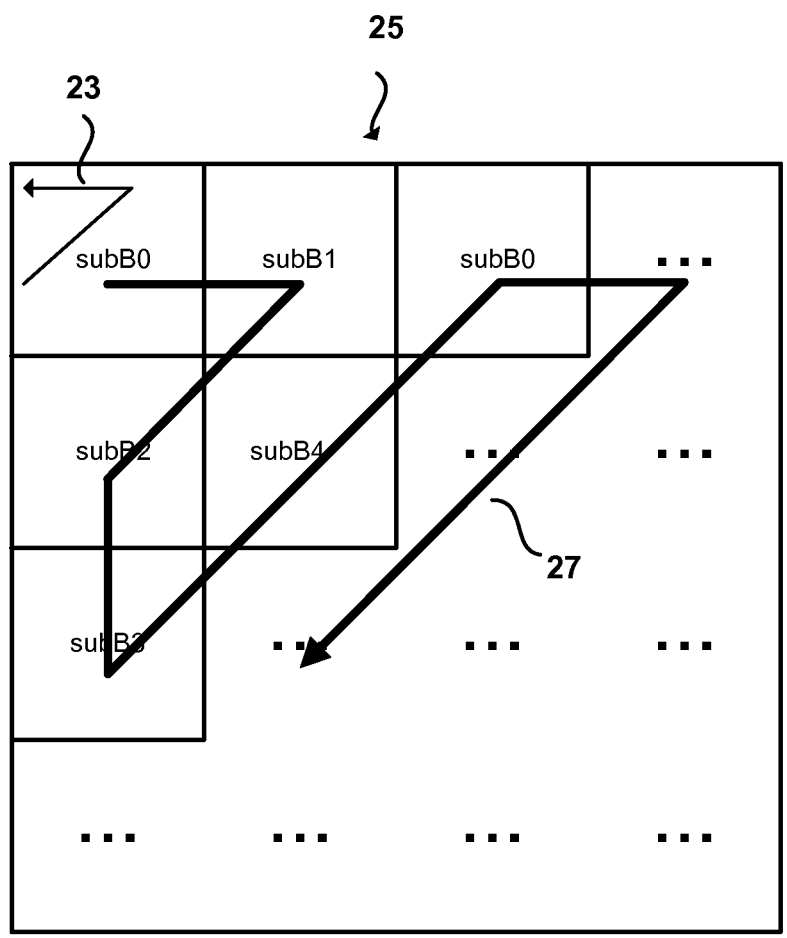
FIG. 3 is a conceptual diagram illustrating a scanning technique for level coding of a transform unit.

FIG. 3 shows the scanning order followed by one proposed version of the HEVC process to encode the levels of transform coefficients (absolute value of the level and sign of the level) in a transform unit 25. Note that there is a forward zig-zag pattern 27 for scanning of the 4×4 sub-blocks of a larger block, and an inverse zig-zag pattern 23 for scanning the levels of transform coefficients within each sub-block. In other words, a series of 4×4 sub-blocks are scanned in a forward zig-zag pattern such that the sub-blocks are scanned in a sequence. Then, within each sub-block, an inverse zig-zag scan is performed to scan the levels of the transform coefficients within the sub-block. Hence, the transform coefficients in the two-dimensional array formed by the transform unit are serialized into a one-dimensional array such that coefficients that are inverse scanned in a given sub-block are then followed by coefficients that are inverse scanned in a successive sub-block.

In one example, the CABAC coding of coefficients scanned according to the sub-block scan approach shown in FIG. 3 may use 60 contexts, i.e., 6 sets of 10 contexts each, distributed as described below. For a 4×4 block, 10 context models might be used (5 models for bin 1 and 5 models for bins 2 to 14), as shown in Table 1:

TABLE 1

Contexts for bin 1 and bins 2 to 14 of the coefficient levels of a sub-block

| | Model bin 1 | | Model bin 2-14 (remaining bins) |
|---|---|---|---|
| 0 | Encoded coefficient larger than 1 | 0 | Initial or 0 coefficients larger than one |
| 1 | Initial - no trailing ones in sub-block | 1 | 1 coefficient larger than one |
| 2 | 1 trailing one in sub-block | 2 | 2 coefficients larger than one |
| 3 | 2 trailing ones in sub-block | 3 | 3 coefficients larger than one |
| 4 | 3 or more trailing ones in sub-block | 4 | 4 or more coefficient larger than one |

Per Table 1, one of context models 0-4 in the context set is used for bin 1 if, respectively, the currently encoded coefficient that is being scanned in the sub-block is encoded after a coefficient larger than 1 has been encoded within the sub-block, the currently encoded coefficient is the initial coefficient scanned in the sub-block or there are no trailing ones (no previously encoded coefficients) in the sub-block, there is one trailing one in the sub-block (i.e., a one has been encoded but no coefficients larger than one have been encoded), there are two trailing ones in the sub-block, or there are three or more trailing ones in the sub-block. For each of bins 2-14 (although at least one proposal for HEVC codes only bin 2 using CABAC, with successive bins of the coefficient level being coded with an exponential Golomb code), one of context models 0-4 may be used, respectively, if the coefficient is the initial coefficient scanned in the sub-block or there are zero previously coded coefficients larger than one, there is one previously coded coefficient larger than one, there are two previously coded coefficients larger than one, there are three previously coded coefficients larger than one, or there are four previously coded coefficients larger than one.

There are 6 different sets of these 10 models, depending on the number of coefficients larger than 1 in the previous coded 4×4 sub-block in the forward scan of sub-blocks:

TABLE 2

Contexts for bin 1 and bins 2 to 14
Context Set

| | |
|---|---|
| 0 | For block size 4 × 4 only |
| 1 | 0-3 Coefficients Larger than 1 in previous sub-block |
| 2 | 4-7 LargerT1 in previous sub-block |
| 3 | 8-11 LargerT1 in previous sub-block |
| 4 | 12-15 LargerT1 in previous sub-block |
| 5 | First 4 × 4 sub-block 16 LargerT1 in previous sub-block |

Per Table 2, sets 0-5 of context models are used for a given sub-block if, respectively, the sub-block size is 4×4, there are 0 to 3 coefficients larger than 1 in the previously coded sub-block, there are 4 to 7 coefficients larger than 1 in the previously coded sub-block, there are 8-11 coefficients larger than 1 in the previously coded sub-block, there are 12 to 15 coefficients larger than 1 in the previously coded sub-block, or the given sub-block is the first 4×4 sub-block (top left sub-block) or there are 16 coefficients larger than 1 in the previously coded sub-block.

The above-described coding process for H.264 and the process proposed by some for HEVC has several drawbacks. As shown in FIG. 3, one drawback is that the scan for coefficient levels proceeds forward for the scan of sub-blocks (i.e., starting with the upper left sub-block) but then backward for the scan of the coefficient levels within each sub-block (i.e., starting with the lower right coefficient in each sub-block). This approach implies going back and forth within the block, which may make data fetching more complex.

Another drawback comes from the fact that the scan order of the coefficient level is different from the scan order of the significance map. In HEVC, there are three different proposed scan orders for the significance map: forward diagonal, forward horizontal and forward vertical as shown in FIG. 2. All of the significant coefficient scans are different from the scan of coefficient levels in a proposal for HEVC, since the level scans proceed in an inverse direction. Because the direction and pattern of the coefficient level scan is not matched with the direction and pattern of the significance scan, more coefficient levels have to be checked. For instance, assume that a horizontal scan is used for the significance map, and the last significant coefficient is found at the end of the first row of coefficients. The coefficient level scan in HEVC would require a diagonal scan across multiple rows for the level scan, when only the first row actually contains coefficient levels different from 0. Such a scanning process may introduce unwanted inefficiencies.

In the proposal for HEVC, the scan of the significance map proceeds forward in the block, from the DC coefficient found in the upper left corner of the block to the highest frequency coefficient typically found in the lower right corner of the block, while the scan for the coefficient levels is backward within each 4×4 sub-block. This too may result in more complex and more inefficient data fetching.

Another drawback to some HEVC proposals comes from the context sets. The context set (see Tables 2 above) for CABAC is different for block size 4×4 than for other block sizes. In accordance with this disclosure, it would be desirable to harmonize contexts across all block sizes so that less memory is dedicated to storing different context sets.

Also, as will be described in more detail below, some proposed CABAC contexts for the significance map for HEVC are only valid if the scan order is forward. As such, this would not allow for inverse significance map scans.

Furthermore, the contexts described above for encoding the level of a quantized coefficient attempt to exploit the local correlation of coefficient levels. These contexts depend on the correlation among 4×4 sub-blocks (see the contexts set in Table 2), and the correlation within each sub-block (see context models in Table 1). The drawback of these contexts is that the dependency might be too far (i.e., there is low dependency between coefficients which are separated from one another by several other coefficients, from one sub-block to another). Also, within each sub-block, the dependency might be weak.

This disclosure proposes several different features that may reduce or eliminate some of the drawbacks described above. In some examples, these features may provide a more efficient and harmonized scan order of the transform coefficients in video coding. In other examples of this disclosure, these features provide a more efficient set of contexts to be used in CABAC-based entropy coding of the transform coefficients consistent with the proposed scan order. It should be noted that all of the techniques described in this disclosure may be used independently or may be used together in any combination.

Figure 4:
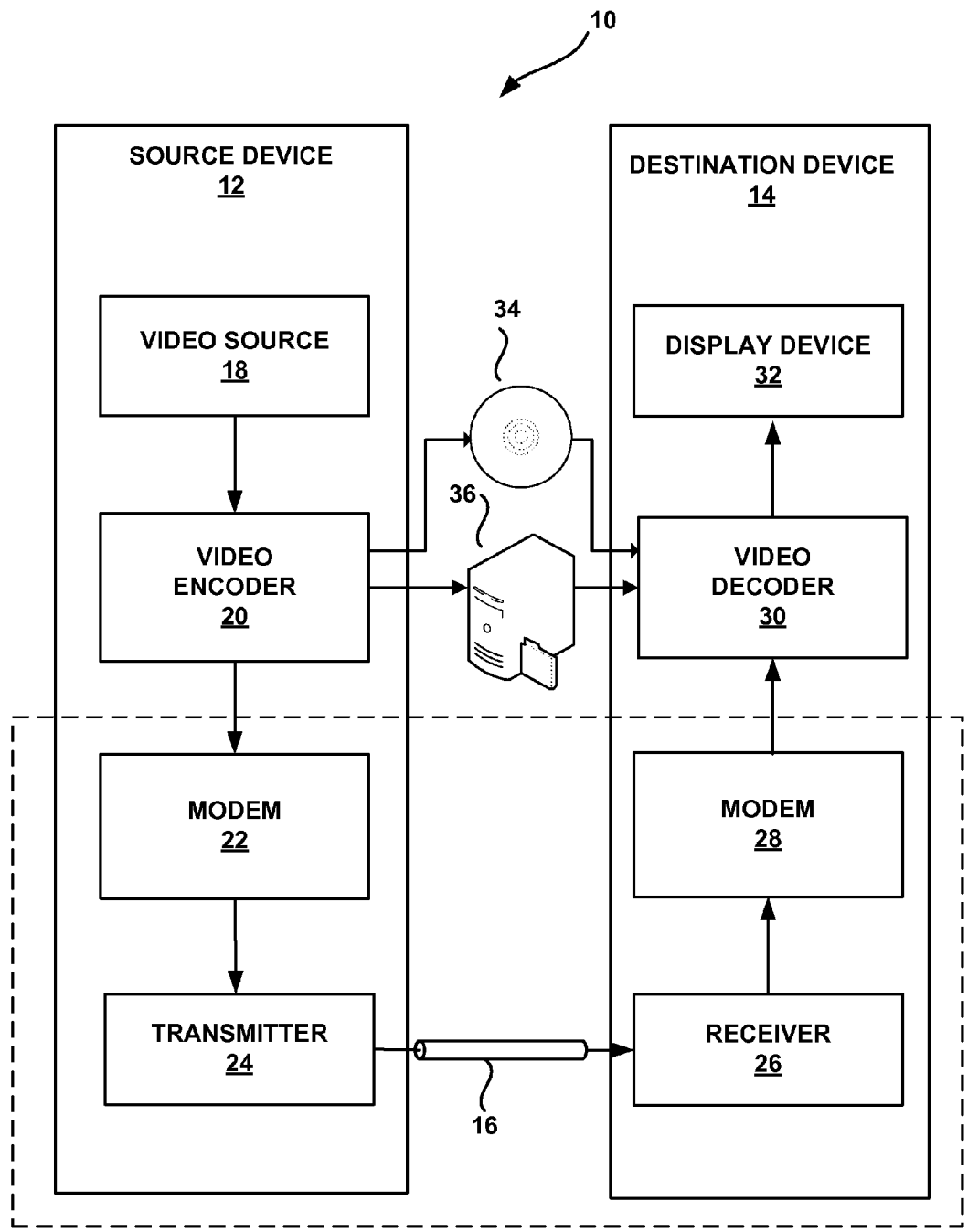
FIG. 4 is a block diagram illustrating an example video coding system.

FIG. 4 is a block diagram illustrating an example video encoding and decoding system 10 that may be configured to utilize techniques for coding transform coefficients in accordance with examples of this disclosure. As shown in FIG. 4, the system 10 includes a source device 12 that transmits encoded video to a destination device 14 via a communication channel 16. Encoded video may also be stored on a storage medium 34 or a file server 36 and may be accessed by the destination device 14 as desired. The source device 12 and the destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, the communication channel 16 may comprise a wireless channel, a wired channel, or a combination of wireless and wired channels suitable for transmission of encoded video data. Similarly, the file server 36 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for coding transform coefficients, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, and/or video telephony.

In the example of FIG. 4, the source device 12 includes a video source 18, a video encoder 20, a modulator/demodulator (modem) 22 and a transmitter 24. In the source device 12, the video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones. However, the techniques described in this disclosure may be applicable to video coding in general, and may be applied to wireless and/or wired applications.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

The destination device 14, in the example of FIG. 4, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on the storage medium 34 or the file server 36. Each of the video encoder 20 and the video decoder 30 may form part of a respective encoder-decoder (CODEC) that is capable of encoding or decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In the example of FIG. 4, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14.

The video encoder 20 and the video decoder 30 may operate according to a video compression standard, such as the High Efficiency Video Coding (HEVC) standard presently under development, and may conform to the HEVC Test Model (HM). Alternatively, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 4, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The video encoder 20 may implement any or all of the techniques of this disclosure to improve encoding of transform coefficients in a video coding process. Likewise, the video decoder 30 may implement any or all of these techniques to improve decoding of transform coefficients in a video coding process. A video coder, as described in this disclosure, may refer to a video encoder or a video decoder. Similarly, a video coding unit may refer to a video encoder or a video decoder. Likewise, video coding may refer to video encoding or video decoding.

In one example of the disclosure, a video coder (such as video encoder 20 or video decoder 30) may be configured to code a plurality of transform coefficients associated with residual video data in a video coding process. The video coder may be configured to code information indicating significant coefficients for the plurality of transform coefficients according to a scan order, and code information indicating levels of the plurality transform coefficients according to the scan order.

In another example of the disclosure, a video coder (such as video encoder 20 or video decoder 30) may be configured to code a plurality of transform coefficients associated with residual video data in a video coding process. The video coder may be configured to code information indicating the significant transform coefficients in a block of transform coefficients with a scan proceeding in an inverse scan direction from higher frequency coefficients in the block of transform coefficients to lower frequency coefficients in the block of transform coefficients.

In another example of the disclosure, a video coder (such as video encoder 20 or video decoder 30) may be configured to code a plurality of transform coefficients associated with residual video data in a video coding process. The video coder may be configured to arrange a block of transform coefficients into one or more sub-sets of transform coefficients based on a scan order, code a first portion of levels of transform coefficients in each sub-set, wherein the first portion of levels includes at least a significance of the transform coefficients in each sub-set, and code a second portion of levels of transform coefficients in each sub-set.

In another example of the disclosure, a video coder (such as video encoder 20 or video decoder 30) may be configured to code information indicating significant coefficients for the plurality of transform coefficients according to a scan order, divide the coded information into at least a first region and a second region, entropy code the coded information in the first region according to a first set of contexts using context derivation criteria, and entropy code the coded information in the second region according to a second set of contexts using the same context derivation criteria as the first region.

Figure 5:
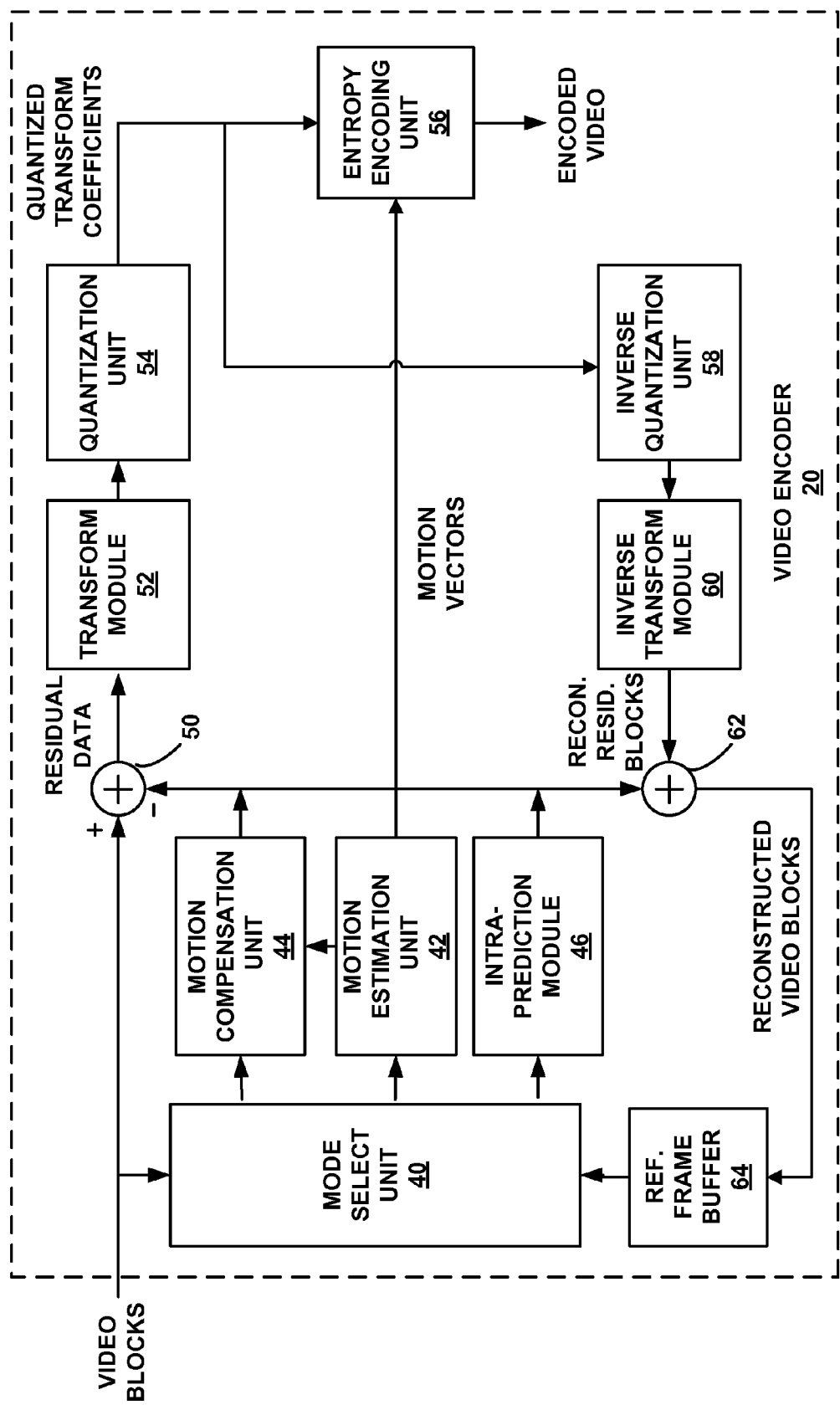
FIG. 5 is a block diagram illustrating an example video encoder.

FIG. 5 is a block diagram illustrating an example of a video encoder 20 that may use techniques for coding transform coefficients as described in this disclosure. The video encoder 20 will be described in the context of HEVC coding for purposes of illustration, but without limitation of this disclosure as to other coding standards or methods that may require scanning of transform coefficients. The video encoder 20 may perform intra- and inter-coding of CUs within video frames. Intra-coding relies on spatial prediction to reduce or remove spatial redundancy in video within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 5, the video encoder 20 receives a current video block within a video frame to be encoded. In the example of FIG. 5, the video encoder 20 includes a motion compensation unit 44, a motion estimation unit 42, an intra-prediction module 46, a reference frame buffer 64, a summer 50, a transform module 52, a quantization unit 54, and an entropy encoding unit 56. The transform module 52 illustrated in FIG. 5 is the module that applies the actual transform to a block of residual data, and is not to be confused with block of transform coefficients, which also may be referred to as a transform unit (TU) of a CU. For video block reconstruction, the video encoder 20 also includes an inverse quantization unit 58, an inverse transform module 60, and a summer 62. A deblocking filter (not shown in FIG. 5) may also be included to filter block boundaries to remove blockiness artifacts from reconstructed video. If desired, the deblocking filter would typically filter the output of the summer 62.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction module 46 may perform intra-predictive coding of the received video block relative to one or more neighboring blocks in the same frame or slice as the block to be coded to provide spatial compression.

The mode select unit 40 may select one of the coding modes, intra or inter, e.g., based on error (i.e., distortion) results for each mode, and provides the resulting intra- or inter-coded block to the summer 50 to generate residual block data and to the summer 62 to reconstruct the encoded block for use in a reference frame. Some video frames may be designated as I-frames, where all blocks in an I-frame are encoded in an intra-prediction mode. In some cases, the intra-prediction module 46 may perform intra-prediction encoding of a block in a P- or B-frame, e.g., when motion search performed by the motion estimation unit 42 does not result in a sufficient prediction of the block.

The motion estimation unit 42 and the motion compensation unit 44 may be highly integrated, but are illustrated separately for conceptual purposes. Motion estimation is the process of generating motion vectors, which estimate motion for video blocks. A motion vector, for example, may indicate the displacement of a prediction unit in a current frame relative to a reference sample of a reference frame. A reference sample may be a block that is found to closely match the portion of the CU including the PU being coded in terms of pixel difference, which may be determined by sum of absolute difference (SAD), sum of square difference (SSD), or other difference metrics. Motion compensation, performed by the motion compensation unit 44, may involve fetching or generating values for the prediction unit based on the motion vector determined by motion estimation. Again, the motion estimation unit 42 and the motion compensation unit 44 may be functionally integrated, in some examples.

The motion estimation unit 42 calculates a motion vector for a prediction unit of an inter-coded frame by comparing the prediction unit to reference samples of a reference frame stored in the reference frame buffer 64. In some examples, the video encoder 20 may calculate values for sub-integer pixel positions of reference frames stored in the reference frame buffer 64. For example, the video encoder 20 may calculate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision. The motion estimation unit 42 sends the calculated motion vector to the entropy encoding unit 56 and the motion compensation unit 44. The portion of the reference frame identified by a motion vector may be referred to as a reference sample. The motion compensation unit 44 may calculate a prediction value for a prediction unit of a current CU, e.g., by retrieving the reference sample identified by a motion vector for the PU.

The intra-prediction module 46 may intra-prediction encode the received block, as an alternative to inter-prediction performed by the motion estimation unit 42 and the motion compensation unit 44. The intra-prediction module 46 may encode the received block relative to neighboring, previously coded blocks, e.g., blocks above, above and to the right, above and to the left, or to the left of the current block, assuming a left-to-right, top-to-bottom encoding order for blocks. The intra-prediction module 46 may be configured with a variety of different intra-prediction modes. For example, the intra-prediction module 46 may be configured with a certain number of directional prediction modes, e.g., 33 directional prediction modes, based on the size of the CU being encoded.

The intra-prediction module 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction module 46 may calculate an error value for the prediction mode based on pixel differences between the PU and the received block to be encoded. The intra-prediction module 46 may continue testing intra-prediction modes until an intra-prediction mode that yields an acceptable error value is discovered. The intra-prediction module 46 may then send the PU to the summer 50.

The video encoder 20 forms a residual block by subtracting the prediction data calculated by the motion compensation unit 44 or the intra-prediction module 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform module 52 may form one or more transform units (TUs) from the residual block. The transform module 52 applies a transform, such as a discrete cosine transform (DCT), a directional transform, or a conceptually similar transform, to the TU, producing a video block comprising transform coefficients. In certain video coding modes such as transform skip mode, transform processing module 52 may send the residual block to quantization unit 54 directly, without performing transformation. In such instances, the residual values may still be referred to herein as "transform coefficients," despite no transform actually being applied to the residual values.

The transform module 52 may send the resulting transform coefficients to the quantization unit 54. The quantization unit 54 may then quantize the transform coefficients. The entropy encoding unit 56 may then perform a scan of the quantized transform coefficients in the matrix according to a specified scan order. This disclosure describes the entropy encoding unit 56 as performing the scan. However, it should be understood that, in other examples, other processing units, such as the quantization unit 54, could perform the scan.

As mentioned above, scanning of the transform coefficients may involve two scans. One scan identifies which of the coefficients are significant (i.e., nonzero) to form the significance map and another scan codes the levels of the transform coefficients. In one example, this disclosure proposes that the scan order used to code coefficient levels in a block be the same as the scan order used to code significant coefficients in the significance map for the block. In HEVC, the block may be a transform unit. As used herein, the term scan order may refer to either the direction of the scan and/or the pattern of the scan. As such, the scans for the significance map and the coefficient levels may be the same in scan pattern and/or scan direction. That is, as one example, if the scan order used to form the significance map is a horizontal scan pattern in the forward direction, then the scan order for coefficient levels should also be a horizontal scan pattern in the forward direction. Likewise, as another example, if the scan order for the significance map is a vertical scan pattern in the inverse direction, then the scan order for coefficient levels should also be a vertical scan pattern in the inverse direction. The same may apply for diagonal, zig-zag or other scan patterns.

Figure 6:
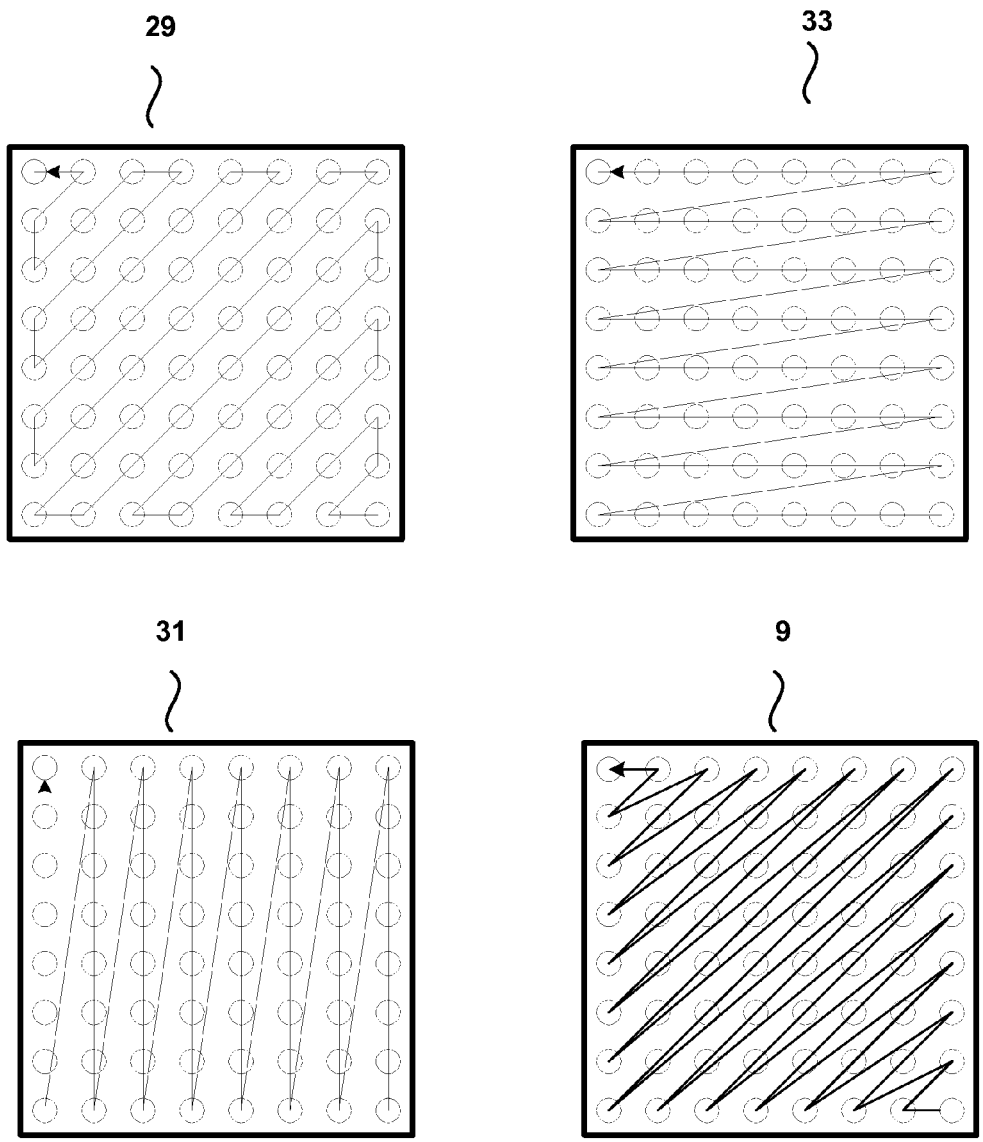
FIG. 6 is a conceptual diagram illustrating inverse scan orders for significance map and coefficient level coding.

FIG. 6 shows examples of inverse scan orders for a block of transform coefficients, i.e., a transform block. The transform block may be formed using a transform such as, for example, a discrete cosine transform (DCT). Note that each of the inverse diagonal pattern 9, inverse zig-zag pattern 29, the inverse vertical pattern 31, and the inverse horizontal pattern 33 proceed from the higher frequency coefficients in the lower right corner of the transform block to lower frequency coefficients in the upper left corner of the transform block. Hence, one aspect of the disclosure presents a unified scan order for coding of the significance map and coding of coefficient levels. The scan may be unified in the sense that the scans for coding of the significance map and the coding of the coefficient levels proceed in the same direction, e.g., in an inverse direction from the higher frequency coefficients to the lower frequency coefficients, and/or proceed in the same scan pattern. The proposed technique applies the scan order used for the significance map to the scan order used for coefficient level coding. In general, horizontal, vertical and diagonal scan patterns have been shown to work well, thus reducing the need for additional scan patterns. However, the general techniques of this disclosure are applicable for use with any scan pattern.

According to another aspect, this disclosure proposes that the significance scan be performed as an inverse scan, from the last significant coefficient in the transform unit to the first coefficient (i.e., the DC coefficient) in the transform unit. Examples of inverse scan orders are shown in FIG. 6. In particular, the significance scan proceeds from the last significant coefficient at a higher frequency position to significant coefficients at lower frequency positions, and ultimately to the DC coefficient position.

To facilitate the inverse scan, techniques for identifying the last significant coefficient may be used. A process for identifying the last significant coefficient is described in J. Sole, R. Joshi, I.-S. Chong, M. Coban, M. Karczewicz, "Parallel Context Processing for the significance map in high coding efficiency," JCTVC-D262, 4th JCT-VC Meeting, Daegu, KR, January 2011, and in U.S. provisional patent application No. 61/419,740, filed Dec. 3, 2010, to Joel Sole Rojals et al., entitled "Encoding of the position of the last significant transform coefficient in video coding." Once the last significant coefficient in the block is identified, then an inverse scan order can be applied for both significance map and coefficient level.

This disclosure also proposes that the significance scan and coefficient level scan are not inverse and forward, respectively, but instead have the same scan direction and, more particularly, only one direction in a block. Specifically, it is proposed that the significance scan and coefficient level scan both use an inverse scan order, e.g., from the last significant coefficient in a transform unit to the first coefficient. Hence, in one example, the significance scan is performed backwards (inverse scan relative to the some proposed scans for HEVC) from the last significant coefficient to the first coefficient (the DC coefficient). This aspect of the disclosure presents a unified, uni-directional scan order for coding of the significance map and coding of coefficient levels. In particular, the unified, uni-directional scan order may be a unified inverse scan order. The scan orders for significance and coefficient level scans according to a unified inverse scan pattern could be inverse diagonal, inverse zig-zag, inverse horizontal or inverse vertical as shown in FIG. 6. However, any scan pattern could be used.

Instead of defining sets of coefficients in two-dimensional sub-blocks as shown in FIG. 3 for the goal of CABAC context derivation, this disclosure proposes defining sets of coefficients as several coefficients that are consecutively scanned according to the scan order. In particular, each set of coefficients may comprise consecutive coefficients in the scan order over the entire block. Any size of the set can be considered, although a size of 16 coefficients in a scan set has been found to work well. The set size might be fixed or adaptive. This definition allows for sets to be 2-D blocks (if a sub-block scanning method is used), rectangles (if horizontal or vertical scans are used), or diagonal shaped (if zig-zag or diagonal scans are used). The diagonal shaped sets of coefficients may be part of a diagonal shape, consecutive diagonal shapes, or parts of consecutive diagonal shapes.

Figure 7:
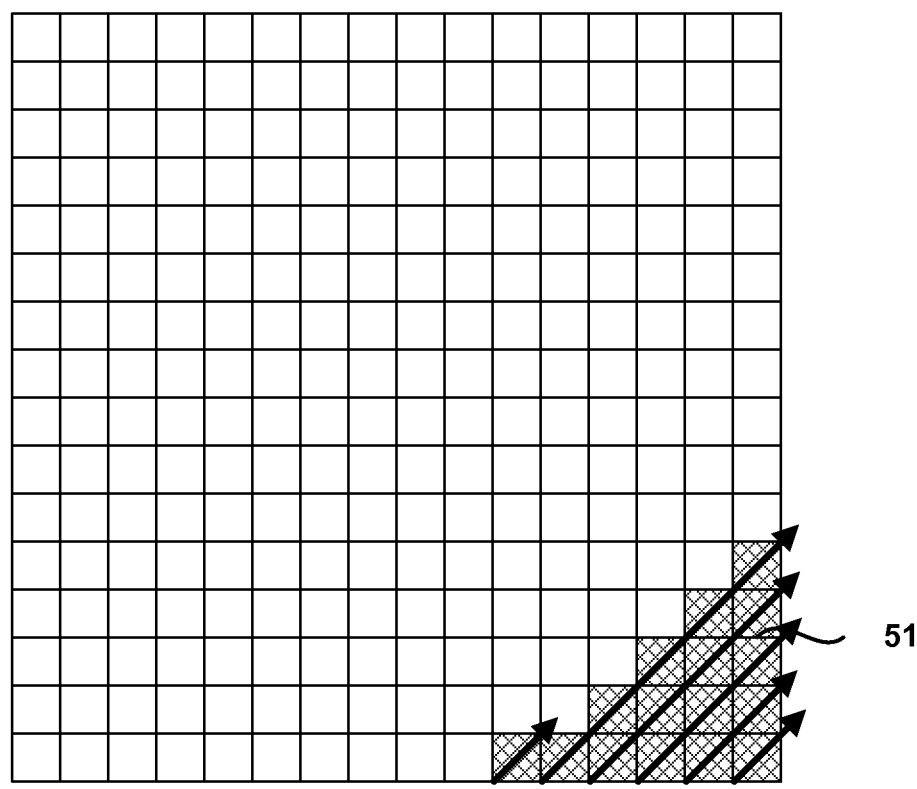
FIG. 7 is a conceptual diagram illustrating a first sub-set of transform coefficients scanned according to an inverse diagonal scan order.
Figure 8:
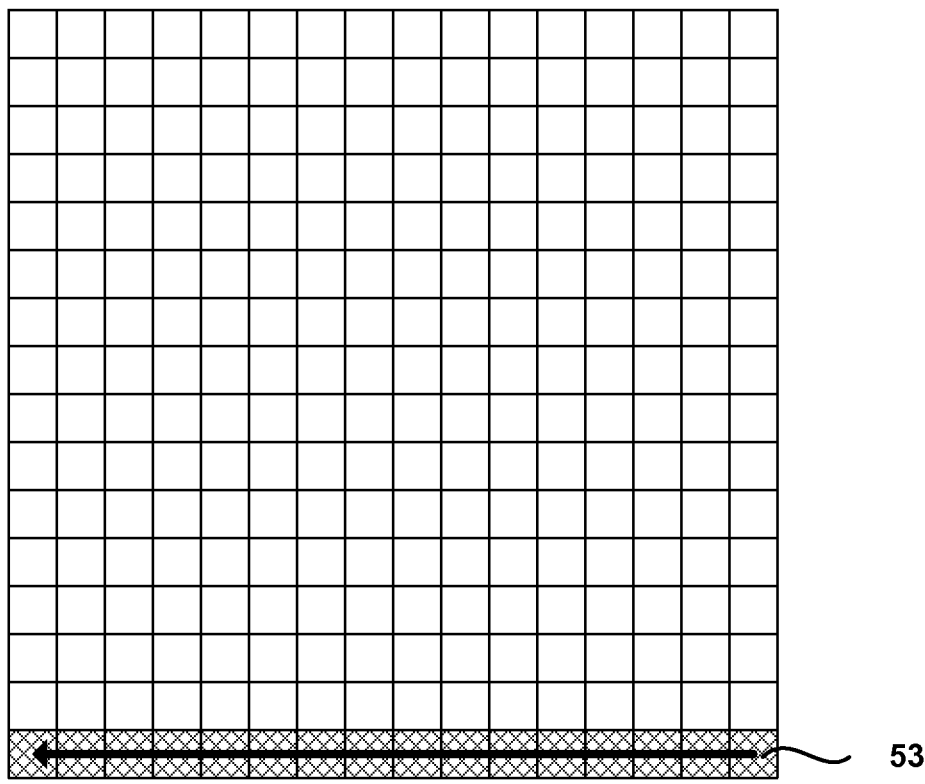
FIG. 8 is a conceptual diagram illustrating a first sub-set of transform coefficients scanned according to an inverse horizontal scan order.
Figure 9:
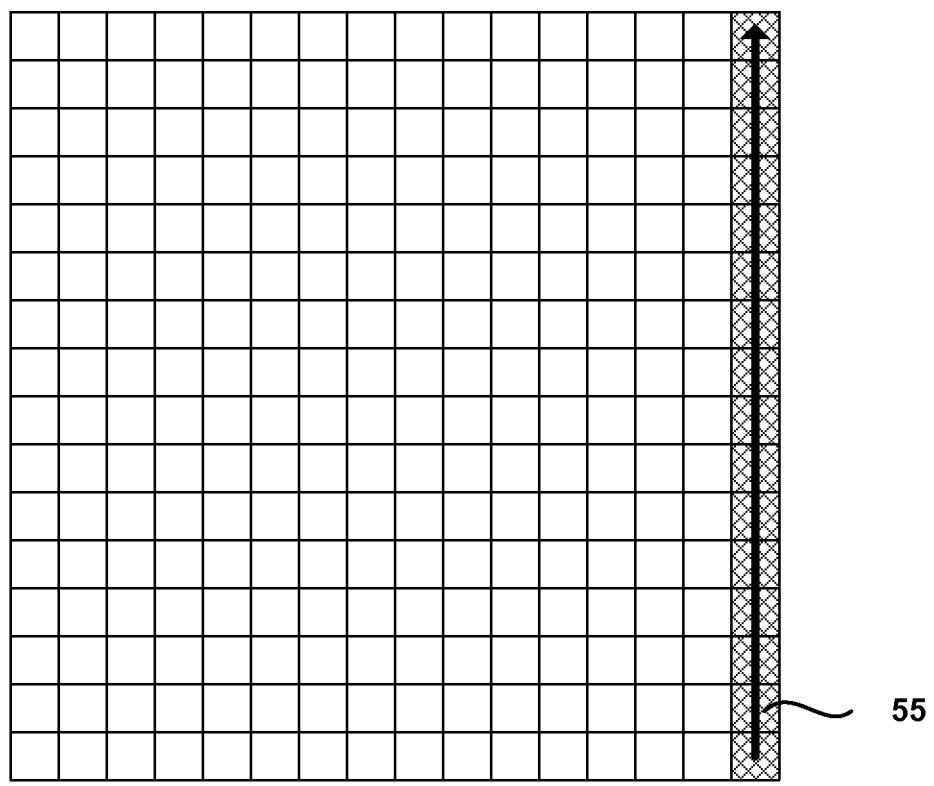
FIG. 9 is a conceptual diagram illustrating a first sub-set of transform coefficients scanned according to an inverse vertical scan order.

FIGS. 7-9 show examples of coefficients arranged into 16 coefficient sub-sets according to specific scan orders beyond being arranged in fixed 4×4 blocks. FIG. 7 depicts a 16 coefficient sub-set 51 that consists of the first 16 coefficients in an inverse diagonal scan order. The next sub-set, in this example, would simply consist of the next 16 consecutive coefficients along the inverse diagonal scan order. Similarly, FIG. 8 depicts the 16 coefficient sub-set 53 for the first 16 coefficients an inverse horizontal scan order. FIG. 9 depicts the 16 coefficient sub-set 55 for the first 16 coefficients in an inverse vertical scan order.

This technique is compatible with a scan order for the coefficient levels that is the same as the scan order for the significance map. In this case, there is no need for a different (and sometimes cumbersome) scan order for the coefficients levels, such as that shown in FIG. 3. The coefficient level scan may be formed as a forward scan that proceeds from the position of the last significant coefficient in a transform unit to the DC coefficient position.

In some proposed processes for HEVC, for entropy coding using CABAC, transform coefficients are encoded in the following way. First, there is one pass (in the significance map scan order) on the full transform unit to encode the significance map. Then, there are three passes (in the coefficient level scan order) to encode bin 1 of the level (1st pass), the rest of the coefficient level (2nd pass) and the sign of the coefficient level (3rd pass). These three passes for coefficient level coding are not done for the full transform unit. Instead, each pass is done in 4×4 sub-blocks, as shown in FIG. 3. When the three passes have been completed in one sub-block, the next sub-block is processed by sequentially performing the same three encoding passes. This approach facilitates the parallelization of the encoding.

As described above, this disclosure proposes to scan transform coefficients in a more harmonized manner, such that the scan order for the coefficient levels is the same as the scan order of significant coefficients to form the significance map. In addition, it is proposed that the scans for coefficient level and significant coefficients be performed in an inverse direction that proceeds from the last significant coefficient in the block to the first coefficient (the DC component) in the block. This inverse scan is the opposite of the scan used for significant coefficients according some proposals for HEVC.

As previously described with reference to FIGS. 7-9, this disclosure further proposes, in one example, that the contexts for the coefficient levels (including the significance map) are divided into sub-sets. That is, a context is determined for each sub-set of coefficients. Hence, in this example, the same context is not necessarily used for an entire scan of coefficients. Instead, different sub-sets of coefficients within a transform block may have different contexts that are individually determined for each sub-set. Each sub-set may comprise a one-dimensional array of consecutively scanned coefficients in the scan order. Therefore, the coefficient level scan goes from the last significant coefficient to the first coefficient (DC component), where the scan is conceptually partitioned in different sub-sets of consecutively scanned coefficients according to the scan order. For example, each sub-set may include n consecutively scanned coefficients, for a particular scan order. Grouping coefficients in sub-sets according to their scan order may provide for a better correlation between coefficients, and thus more efficient entropy coding.

This disclosure further proposes to increase the parallelization of the CABAC-based entropy coding of the transform coefficients by extending the concept of the several passes of the coefficient level to include an additional pass for the significance map. Thus, an example with four passes may include: (1) coding of significant coefficient flag values for the transform coefficients, e.g., to form the significance map, (2) coding of bin 1 of level values for transform coefficients, (3) coding of remaining bins of the coefficient level values, and (4) coding of the signs of the coefficient levels, all in the same scan order. Using the techniques described in this disclosure, the four-pass coding outlined above can be facilitated. That is, scanning significant coefficients and levels for transform coefficients in the same scan order, where the scan order proceeds in an inverse direction from a high frequency coefficient to a low frequency coefficient, supports the performance of the several-pass coding technique described above.

In another example, a five pass scan technique may include: (1) coding of significant coefficient flag values for the transform coefficients, e.g., to form the significance map, (2) coding of bin 1 of level values for transform coefficients, (3) coding of bin 2 of level values for transform coefficients, (4) coding the signs of the coefficient levels (e.g., in bypass mode), and (5) coding of remaining bins of the coefficient level values (e.g., in bypass mode), all passes using the same scan order.

An example with fewer passes may also be employed. For example, a two pass scan where level and sign information are processed in parallel may include: (1) coding regular pass bins in pass (e.g., significance, bin 1 level, and bin 2 level), and (2) coding bypass bins in another (e.g., remaining levels and sign), each pass using the same scan order. Regular bins are bins encoded with CABAC using updated context determined by context derivation criteria. For example, as will be explained in more detail below, the context derivation criteria may include the coded level information of causal neighbor coefficient relative to a current transform coefficient. Bypass bins may be bins encoded with CABAC having a fixed context. In some examples, bypass bins may be coded using Golomb-Rice coding and exponential Golomb codes.

The examples of the several scan passes described above may be generalized as including a first scan pass of the first portion of the coefficients levels, wherein the first portion includes the significance pass, and a second scan pass of a second portion of the coefficient levels.

In each of the examples given above, the passes may be performed sequentially in each sub-set. Although the use of one-dimensional sub-sets comprising consecutively scanned coefficients may be desirable, the several pass method also may be applied to sub-blocks, such as 4×4 sub-blocks. Example two-pass and four-pass processes for consecutively scanned sub-sets are outlined in more detail below.

In a simplified two-pass process, for each sub-set of a transform unit, the first pass codes the significance of the coefficients in the sub-set following the scan order, and the second pass codes the coefficient level of the coefficients in the sub-set following the same scan order. The scanning order may be characterized by a scan direction (forward or inverse) and a scan pattern (e.g., horizontal, vertical, or diagonal). The algorithm may be more amenable to parallel processing if both passes in each sub-set follow the same scan order, as described above.

In a more refined four-pass process, for each sub-set of a transform unit, the first pass codes the significance of the coefficients in the sub-set, the second pass codes bin 1 of the coefficient level of the coefficients in the sub-set, the third pass codes the remaining bins of the coefficient level of the coefficients in the sub-set, and the fourth pass codes the sign of the coefficient level of the coefficients in the sub-set. Again, to be more amenable to parallel processing, all passes in each sub-set should have the same scan order. As is described above, a scan order with an inverse direction has been shown to work well. It should be noted that the fourth pass (i.e., the coding of the sign of the coefficient levels) may be done immediately after the first pass (i.e., the coding of the significance map) or right before the remaining values of the coefficient level pass.

For some transform sizes, the sub-set can be the entire transform unit. In this case, there is a single sub-set corresponding to all of the significant coefficients for an entire transform unit, and the significance scan and level scan proceed in the same scan order. In this case, instead of limited number of n (e.g., n=16) coefficients in a sub-set, the sub-set could be a single sub-set for a transform unit, wherein the single sub-set includes all significant coefficients.

Returning to FIG. 5, once the transform coefficients are scanned, the entropy encoding unit 56 may apply entropy coding such as CAVLC or CABAC to the coefficients. In addition, the entropy encoding unit 56 may encode motion vector (MV) information and any of a variety of syntax elements useful in decoding the video data at the video decoder 30. The syntax elements may include a significance map with significant coefficient flags that indicate whether particular coefficients are significant (e.g., non-zero) and a last significant coefficient flag that indicates whether a particular coefficient is the last significant coefficient. The video decoder 30 may use these syntax elements to reconstruct the encoded video data. Following the entropy coding by the entropy encoding unit 56, the resulting encoded video may be transmitted to another device, such as the video decoder 30, or archived for later transmission or retrieval.

To entropy encode the syntax elements, the entropy encoding unit 56 may perform CABAC and select context models based on, for example, the number of significant coefficients in the previously scanned N coefficients, where N is an integer value that may be related to the size of the block being scanned. The entropy encoding unit 56 may also select the context model based on a prediction mode used to calculate residual data that was transformed into the block of transform coefficients, and a type of transform used to transform the residual data into the block of transform coefficients. When the corresponding prediction data was predicted using an intra-prediction mode, the entropy encoding unit 56 may further base the selection of the context model on the direction of the intra-prediction mode.

Further, according to another aspect of this disclosure, it is proposed that the contexts for CABAC be divided into sub-sets of coefficients (e.g., the sub-sets shown in FIGS. 7-9. It is proposed that each sub-set is composed of consecutive coefficients in the scanning order over the entire block. Any size of the sub-set can be considered, although a size of 16 coefficients in a scan sub-set has been found to work well. In this example, a sub-set may be 16 consecutive coefficients in the scan order, which may be in any scan pattern, including sub-block, diagonal, zig-zag, horizontal, and vertical scan patterns. According to this proposal, the coefficient level scan proceeds from the last significant coefficient in a block. Therefore, the coefficient level scan goes from the last significant coefficient to the first coefficient (DC component) in the block, where the scan is conceptually partitioned in different sub-sets of coefficients in order to derive the contexts to apply. For example, the scan is arranged in sub-sets of n consecutive coefficients in the scan order. The last significant coefficient is the first significant coefficient encountered in an inverse scan from the highest frequency coefficient of the block (typically found near the lower right corner of the block) toward the DC coefficient of the block (upper left corner of the block).

In another aspect of the disclosure, it is proposed that CABAC context derivation criteria be harmonized for all block sizes. In other words, instead of having different context derivations based on block size as discussed above, every block size will rely on the same derivation of CABAC contexts. In this way, there is no need to take into account the specific block size in order to derive the CABAC context for the block. Context derivation is also the same for both significance coding and coefficient level coding.

It is also proposed that CABAC context sets depend on whether the sub-set is sub-set 0 (defined as the sub-set with the coefficients for the lowest frequencies, i.e., containing the DC coefficient and adjacent low frequency coefficients) or not (i.e., the context derivation criteria). See Tables 3a and 3b below.

TABLE 3a

Context sets table. To be compared with Table 2. There is a dependency on the sub-set, whether it is sub-set 0 (lowest frequencies) or not.
Context Set

| | | |
|---|---|---|
| 0 | Lowest freq | 0 LargerT1 in previous sub-set |
| 1 | Lowest freq | 1 LargerT1 in previous sub-set |
| 2 | Lowest freq | >1 LargerT1 in previous sub-set |
| 3 | Higher freq | 0 LargerT1 in previous sub-set |

TABLE 3a-continued

Context sets table. To be compared with Table 2. There is a
dependency on the sub-set, whether it is sub-set 0 (lowest frequencies)
or not.

| | | Context Set |
|---|---|---|
| 4 | Higher freq | 1 LargerT1 in previous sub-set |
| 5 | Higher freq | >1 LargerT1 in previous sub-set |

Per Table 3a above, sets 0-2 of context models are used for the lowest frequency scan sub-set (i.e., set of n consecutive coefficients) if, respectively, there are zero coefficients larger than one in the previously coded sub-set, there is one coefficient larger than one in the previously coded sub-set, or there are more than one coefficient larger than one in the previously coded sub-set. Sets 3-5 of context models are used for all sub-sets higher than the lowest frequency sub-set if, respectively, there are zero coefficients larger than one in the previously coded sub-set, there is one coefficient larger than one in the previously coded sub-set, or there are more than one coefficient larger than one in the previously coded sub-set.

TABLE 3b

Context set table.

| | | Context Set |
|---|---|---|
| 0 | Lowest freq | 0 LargerT1 in previous sub-set |
| 1 | Lowest freq | 1-3 LargerT1 in previous sub-set |
| 2 | Lowest freq | >3 LargerT1 in previous sub-set |
| 3 | Higher freq | 0 LargerT1 in previous sub-set |
| 4 | Higher freq | 1-3 LargerT1 in previous sub-set |
| 5 | Higher freq | >3 LargerT1 in previous sub-set |

Table 3b shows a context set table that has showed good performance as it accounts for a more precise count of the number of larger than one coefficients in the previous sub-set. Table 3b may be used as an alternative to Table 3a above.

Table 3c shows a simplified context set table with context derivation criteria that may also be alternatively used.

TABLE 3c

Context set table.

| | | Context Set |
|---|---|---|
| 0 | Lowest freq | 0 LargerT1 in previous sub-set |
| 1 | Lowest freq | 1 LargerT1 in previous sub-set |
| 2 | Higher freq | 0 LargerT1 in previous sub-set |
| 3 | Higher freq | 1 LargerT1 in previous sub-set |

In addition, a sub-set containing the last significant coefficient in the transform unit may utilize a unique context set.

This disclosure also proposes that the context for a sub-set still depends on the number of coefficients larger than 1 in previous sub-sets. For example, if the number of coefficients in previous sub-sets is a sliding window, let this number be uiNumOne. Once this value is checked to decide the context for the current sub-scan set, then the value is not set to zero. Instead, this value is normalized (e.g., use uiNumOne=uiNumOne/4 which is equivalent to uiNumOne>>=2, or uiNumOne=uiNumOne/2 which is equivalent to uiNumOne>>=1). By doing this, values of sub-sets prior to the immediately previous sub-set can still be considered, but given smaller weight in the CABAC context decision for the currently coded sub-set. In particular, the CABAC context decision for a given sub-set takes into account not only the number of coefficients greater than one in the immediately preceding sub-set, but also a weighted number of coefficients greater than one in previously coded sub-sets.

Additionally, the context set can depend on the following: (1) the number of significant coefficients in the currently scanned sub-set, and (2) whether the current sub-set is the last sub-set with a significant coefficient (i.e., using the inverse scan order, this refers to whether the sub-set is the first scanned for the coefficients levels or not). Additionally, the context model for a coefficient level can depend on whether the current coefficient is the last coefficient.

Figure 10:
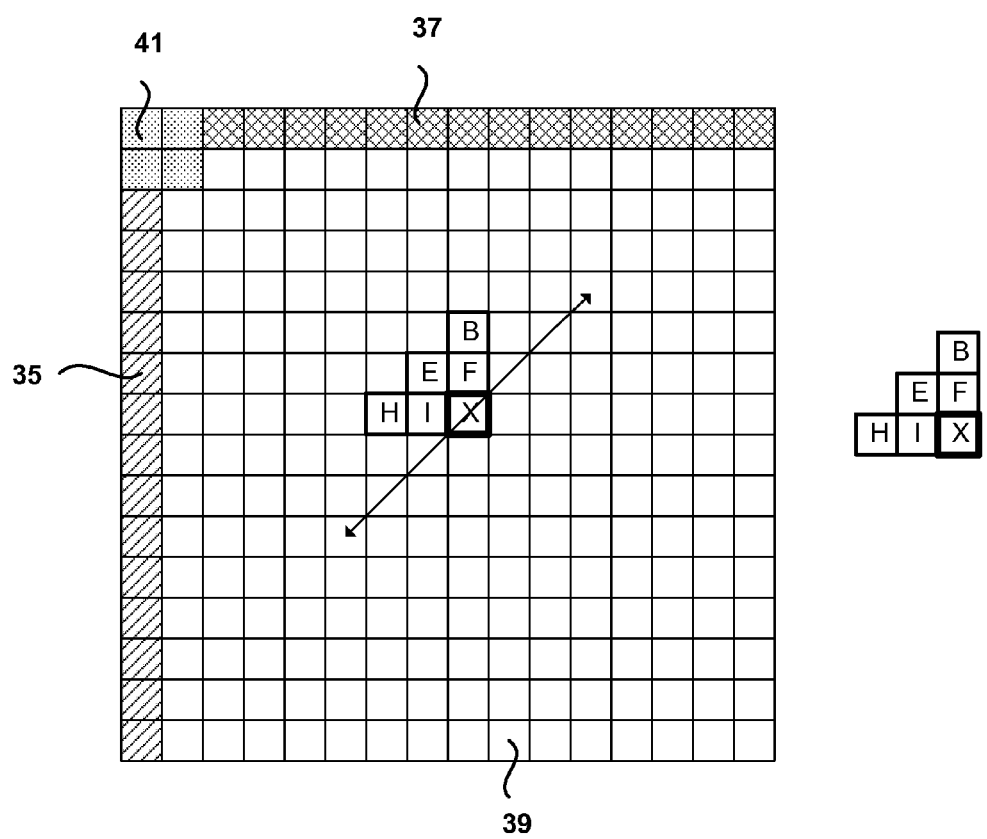
FIG. 10 is a conceptual diagram illustrating context regions for significance map coding.

A highly adaptive context selection approach has previously been proposed for significance map coding of 16×16 and 32×32 blocks of transform coefficients in HEVC. It should be noted that this context selection approach may be extended to all block sizes. As shown in FIG. 10, this approach divides a 16×16 block into four regions, where each coefficient in the lower frequency region 41 (the four coefficients at the top left corner in x, y coordinate positions [0,0], [0,1], [1,0], [1,1] in the example of a 16×16 block, where [0,0] indicates the upper left corner, DC coefficient) has its own context, the coefficients in the top region 37 (coefficients in the top row from x, y coordinate positions [2,0] to [15,0] in the example of a 16×16 block) share 3 contexts, the coefficients in the left region 35 (coefficients in the left column from x, y coordinate positions [0,2] to [0,15] in the example of a 16×16 block) share another 3 contexts, and the coefficients in the remaining region 39 (remaining coefficients in the 16×16 block) share 5 contexts. Context selection for transform coefficient X in region 39, as an example, is based on the sum of the significance of a maximum of the 5 transform coefficients B, E, F, H, and I. Since X is independent of other positions on the same diagonal line of X along the scan direction (in this example a zig-zag or diagonal scan pattern), the context of the significance of the transform coefficients along a diagonal line in scan order could be computed in parallel from the previous diagonal lines in scan order.

The proposed contexts for the significance map, as shown in FIG. 10, are only valid if the scan order is forward because the context becomes non-causal at the decoder if an inverse scan is used. That is, the decoder has not yet decoded coefficients B, E, F, H and I as shown in FIG. 10 if the inverse scan is used. As a result, the bitstream is not decodable.

However, this disclosure proposes the use of an inverse scan direction. As such, the significance map has relevant correlation among coefficients when the scan order is in an inverse direction, as shown in FIG. 6. Therefore, using an inverse scan for the significance map, as described above, offers desirable coding efficiency. Also, the use of an inverse scan for the significance map serves to harmonize the scanning used for coding of coefficient level and the significance map. To support inverse scanning of the significant coefficients, the contexts need to be changed so that they are compatible with an inverse scan. It is proposed that coding of significant coefficients make use of contexts that are causal with respect to the inverse scan.

Figure 11:
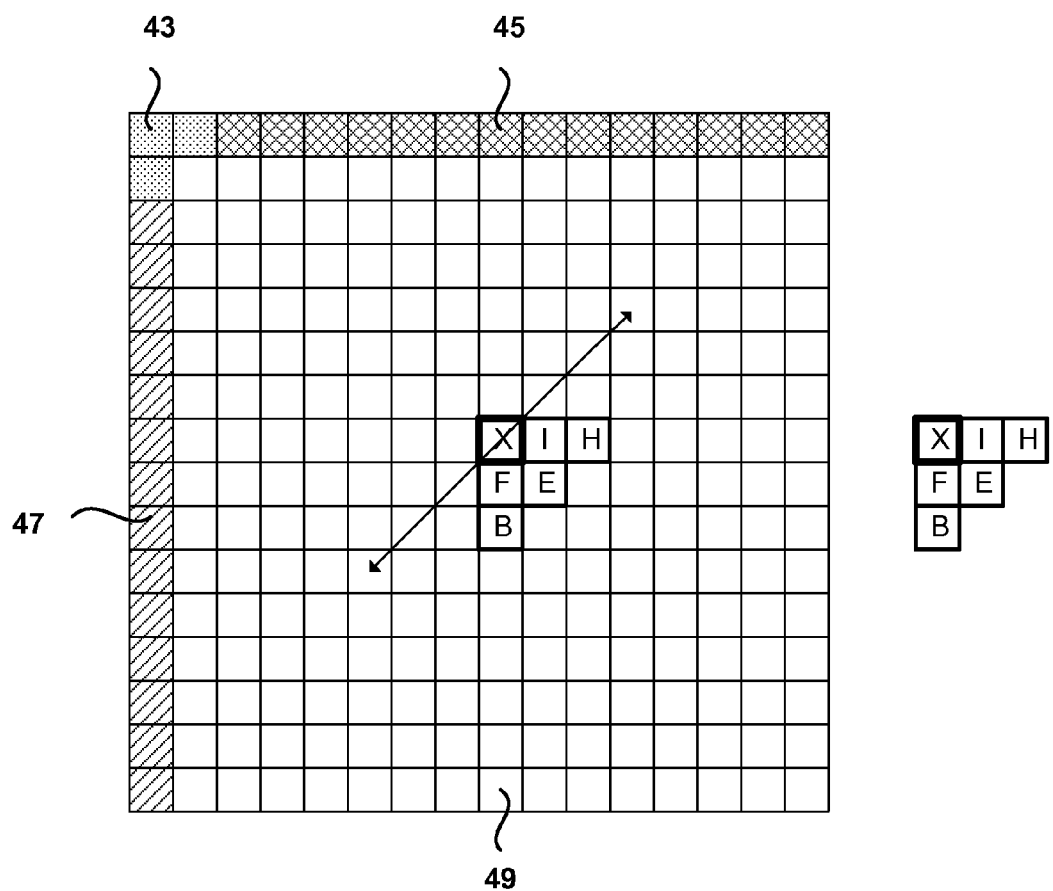
FIG. 11 is a conceptual diagram illustrating example context regions for significance map coding using an inverse scan order.

This disclosure further proposes, in one example, a technique for significance map coding that makes use of the contexts depicted in FIG. 11. Each coefficient in the lower frequency region 43 (the three coefficients at the top left corner in x, y coordinate positions [0,0], [0,1], [1,0] in the example of a 16×16 block, where [0,0] indicates the upper left corner, DC coefficient) has its own context derivation. The coefficients in the top region 45 (coefficients in the top row from x, y coordinate positions [2,0] to [15,0] in the example of a 16×16 block) have a context dependent on the significance of the two previous coefficients in the top region 45 (e.g., two coefficients immediately to the right of the coefficient to be coded, where such coefficients are causal neighbors for decoding purposes given the inverse scan).

The coefficients in the left region 47 (coefficients in the left column from x, y coordinate positions [0,2] to [0,15] in the example of a 16×16 block) have a context dependent on the significance of the two previous coefficients (e.g., two coefficients immediately below the coefficient to be coded, where such coefficients are causal neighbors for decoding purposes given the inverse scan orientation). Note that these contexts in the top region 45 and the left region 47 in FIG. 11 are the inverse of the contexts shown in FIG. 10 (e.g., where the coefficients in the top region 37 have a context dependent on coefficients to the left and the coefficients in the left region 35 have a context dependent on coefficients above). Returning to FIG. 11, the contexts for the coefficients in the remaining region 49 (i.e., the remaining coefficients outside of lower frequency region 43, top region 45, and left region 47) depend on the sum (or any other function) of the significance of the coefficients in the positions marked with I, H, F, E, and B.

In another example, the coefficients in top region 45 and left region 47 may use exactly the same context derivation as the coefficients in region 49. In the inverse scan, that is possible because the neighboring positions marked with I, H, F, E, and B are available for the coefficients in the top region 45 and the left region 47. At the end of the rows/columns, the positions for causal coefficients I, H, F, E and B might be outside the block. In that case, it is assumed that the value of such coefficients is zero (i.e., non-significant).

There are many options in choosing the contexts. The basic idea is to use the significance of coefficients that have already been coded according to the scan order. In the example shown in FIG. 10, the context of the coefficient at position X is derived based on the sum of the significance of coefficients at positions B, E, F, H and I. These context coefficients come before the current coefficient in the inverse scan order proposed in this disclosure for the significance map. The contexts that were causal in the forward scan become non-causal (not available) in the inverse scan order. A way to address this problem is to mirror the contexts of the conventional case in FIG. 10 to those shown in FIG. 11 for the inverse scan. For a significance scan that proceeds in an inverse direction from a last significant coefficient to a DC coefficient position, the context neighborhood for coefficient X is composed of coefficients B, E, F, H, I, which are associated with higher frequency positions, relative to the position of coefficient X, and which have already been processed by the encoder or decoder, in the inverse scan, prior to coding of coefficient X.

As discussed above, contexts and context models illustrated in Tables 1 and 2 attempt to exploit the local correlation of coefficient levels among 4×4 sub-blocks. However, the dependency might be too far. That is to say, there may be a low dependency between coefficients which are separated from one another by several coefficients, for example, from one sub-block to another. Also, within each sub-block, the dependency between coefficients might be weak. This disclosure describes techniques for addressing these issues by the creation of a set of contexts for the coefficient levels that exploit a more local context neighborhood.

Figure 13:
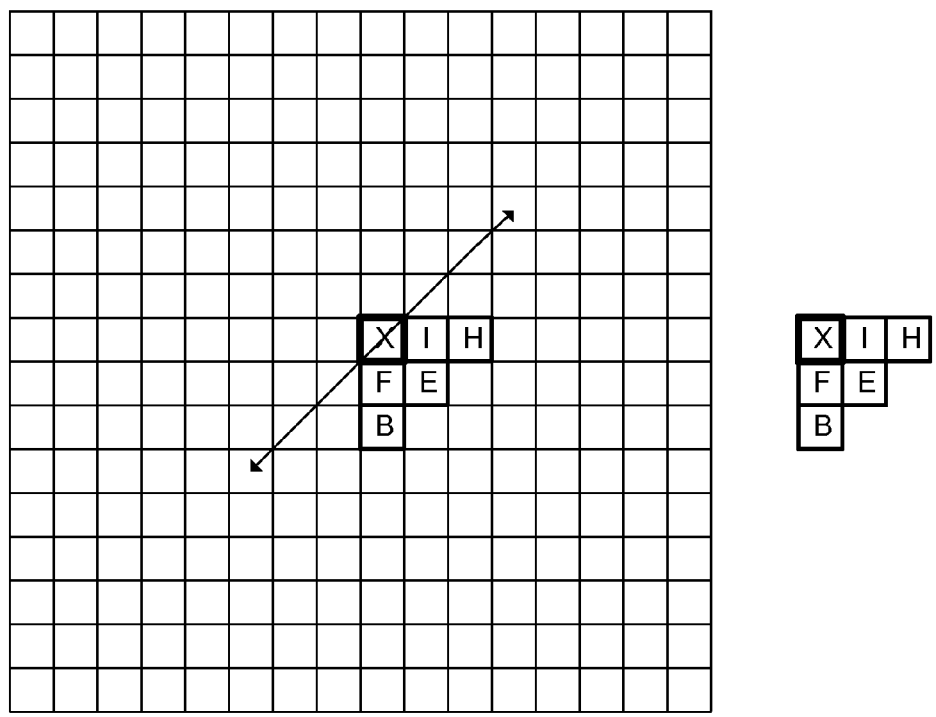
FIG. 13 is a conceptual diagram illustrating example causal neighbors for entropy coding using an inverse scan order.

This disclosure proposes to use a local neighborhood for the derivation of the context of the transform coefficient levels, e.g., in video coding according to HEVC or other standards. This neighborhood is composed of coefficients already encoded (or decoded) that have high correlation with the level of the current coefficient. The coefficients may spatially neighbor the coefficient to be coded, and may include both coefficients that bound the coefficient to be coded and other nearby coefficients, such as shown in FIG. 11 or FIG. 13. Notably, the coefficients used for context derivation are not constrained to a sub-block or previous sub-block. Instead, the local neighborhood may comprise coefficients that are spatially located close to the coefficient to be coded, but would not necessarily reside in the same sub-block as the coefficient to be coded, or in the same sub-block as one another, if the coefficients were arranged in sub-blocks. Rather than relying on coefficients located in a fixed sub-block, this disclosure proposes using neighboring coefficients that are available (i.e., have already been coded) given the specific scan order used.

Figure 12:
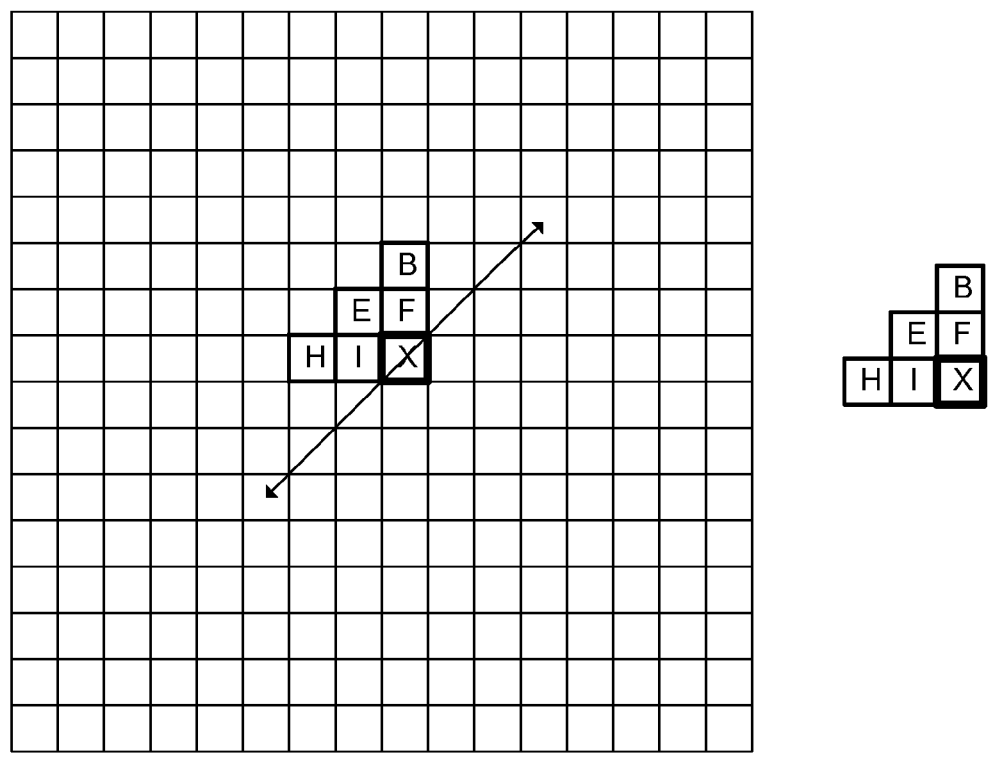
FIG. 12 is a conceptual diagram illustrating example causal neighbors for entropy coding using a forward scan order.

Different CABAC context sets may be specified for different sub-sets of coefficients, e.g., based on previously coded sub-sets of coefficients. Within a given sub-set of coefficients, contexts are derived based on a local neighborhood of coefficients, sometimes called a context neighborhood. In accordance with this disclosure, an example of a context neighborhood is shown in FIG. 12. The coefficients in the context neighborhood may be spatially located near the coefficient to be coded.

As shown in FIG. 12, for a forward scan, the context of the level for the transform coefficient X depends on the values of the coefficients B, E, F, H, and I. In a forward scan, coefficients B, E, F, H, and I are associated with lower frequency positions relative to the position and coefficient X, and which have already been processed by the encoder or decoder prior to coding of coefficient X.

For encoding bin 1 for CABAC, the context depends on the sum of the number of significant coefficients in this context neighborhood (i.e., in this example, coefficients B, E, F, H and I). If a coefficient in the context neighborhood falls out of the block, i.e., due to data loss, it can be considered that the value is 0 for purposes of determining the context of coefficient X. For encoding the rest of the bins for CABAC, the context depends on the sum of the number of coefficients in the neighborhood that are equal to 1 as well as on the sum of the number of coefficients in the neighborhood that are larger than 1. In another example, the context for bin 1 may depend on the sum of the bin 1 values of the coefficients in the local context neighborhood. In another example, the context for bin 1 may depend on a combination of the sum of the significance coefficients and bin 1 values in this context neighborhood.

There are many possibilities for the selection of a context neighborhood. However, the context neighborhood should be composed of coefficients such that encoder and decoder both have access to the same information. In particular, the coefficients B, F, E, I, and H in the neighborhood should be causal neighbors in the sense that they have been previously encoded or decoded and are available for reference in determining the context for coefficient X.

The contexts described above with reference to FIG. 12 are one of many possibilities. Such contexts can be applied to any of the three scans currently proposed for use in HEVC: diagonal, horizontal and vertical. This disclosure proposes that the context neighborhood used to derive the context for the coefficient level may be the same as the context neighborhood used for deriving contexts for the significance map. For example, the context neighborhood used to derive the context for the coefficient level may be a local neighborhood, as is the case for the coding of the significance map.

As described in more detail above, this disclosure proposes the use of an inverse scan order for the scanning of significant coefficients to form the significance map. The inverse scan order may be an inverse zig-zag pattern, vertical pattern or horizontal pattern as shown in FIG. 6. If the scan order for the coefficient level scan is also in an inverse pattern, then the context neighborhood shown in FIG. 12 would become non-causal. This disclosure proposes to reverse the position of the context neighborhood so that they are causal with reference to an inverse scan order. FIG. 13 shows an example of a context neighborhood for an inverse scan order.

As shown in FIG. 13, for a level scan that proceeds in an inverse direction from a last significant coefficient to a DC coefficient position, the context neighborhood for coefficient X is composed of coefficients B, E, F, H, and I, which are associated with higher frequency positions relative to the position of coefficient X. Given the inverse scan, coefficients B, E, F, H, and I have already been processed by the encoder or decoder, prior to coding of coefficient X, and are therefore causal in the sense that they are available. Similarly, this context neighborhood can be applied to the coefficient levels.

This disclosure further proposes, in one example, another technique for significance map coding that makes use of the contexts selected to support an inverse scan. As discussed above, a highly adaptive context selection approach has been proposed for HEVC for significance map coding of 16×16 and 32×32 blocks of transform coefficients. For instance, as was described in reference to FIG. 10 above, this approach divides a 16×16 block into four regions, where each position in the region 41 has its own set of contexts, region 37 has contexts, region 35 has another 3 contexts, and region 39 has 5 contexts. Context selection for transform coefficient X, as an example, is based on the sum of the significance of a maximum of the 5 positions B, E, F, H, I. Since X is independent of other positions on the same diagonal line of X along the scan direction, the context of the significance of the transform coefficients along a diagonal line in scan order could be computed in parallel from the previous diagonal lines in scan order.

In at least one approach proposed approach for HEVC, context derivations has several drawbacks. One issue is the number of contexts per block. Having more contexts implies more memory and more processing each time the contexts are refreshed. Therefore, it would be beneficial to have an algorithm that has few contexts and also, few ways to generate the contexts (e.g., less than the four ways, i.e., four patterns, in the previous example).

One way to address such drawbacks is the coding of the significance map in inverse order, that is, from the last significant coefficient (higher frequency) to the DC component (lowest frequency). A consequence of this process in inverse order is that the contexts for the forward scanning are no longer valid. The techniques described above include a method for determining the contexts for context adaptive binary arithmetic coding (CABAC) of the information indicating a current one of the significant coefficients based on previously coded significant coefficients in the inverse scan direction. In an example of inverse zig-zag scan, the previously coded significant coefficients reside at positions to the right of a scan line on which the current one of the significant coefficients resides.

The context generation might be different for different positions of the transform blocks based on, at least, the distance from the boundaries and the distance from the DC component. In the example technique described above, it was proposed that the significance map coding makes use of the sets of contexts depicted in FIG. 11.

This disclosure proposes a set of contexts for inverse significance map scan that may lead to higher performance through the reduction of the number of contexts per block. Referring back to FIG. 11, a reduction in the number of context per block may be accomplished by allowing the left region 47 and top region 45 to use the same context derivation as the remaining region 49. In the inverse scan, that is possible because the neighboring positions marked with I, H, F, E, and B are available for the coefficients at the regions 47 and 45.

Figure 14:
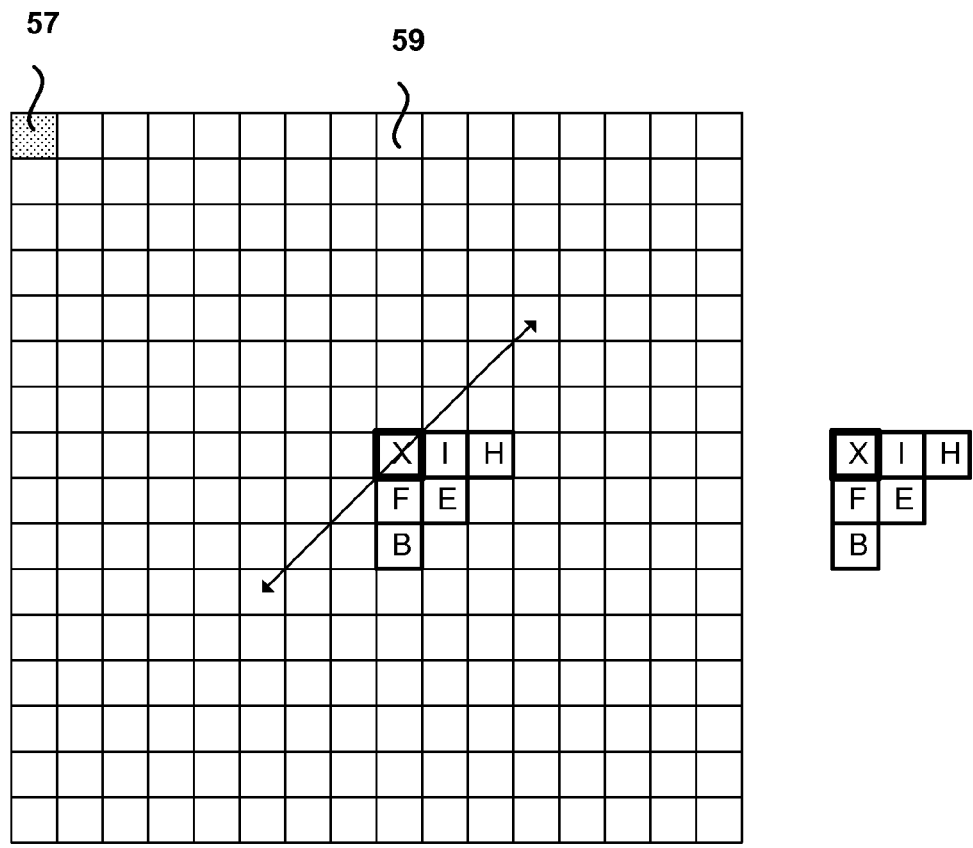
FIG. 14 is a conceptual diagram illustrating example context regions for entropy coding using an inverse scan order.

FIG. 14 shows an example of a context derivation according to this example. In this example there are only two context regions: a low frequency region 57 for the DC coefficient and the remaining region 59 for all other coefficients. As such, this example proposes just two ways to derive the context. In the low frequency region 57 (the DC coefficient at x, y position [0,0]), the context is derived based on the position, i.e., the DC coefficient has a context of its own. In the remaining region 57, the context is derived based on the significance of the neighbor coefficients in the local neighborhood for each coefficient to be coded. In this example, it is derived depending on the sum of the significance of the 5 neighbors denoted by I, H, F, E and B in FIG. 14.

Therefore, the number of ways to derive the context within a block is reduced from 4 to 2. Also, the number of contexts is reduced by 8 with respect to the previous example in FIG. 11 (2 lower frequency region 43 and 3 for each of upper region 45 and left region 47). In another example, the DC coefficient may use the same method as the rest of the block, so the number of ways to derive the context within a block is reduced to 1.

Figure 15:
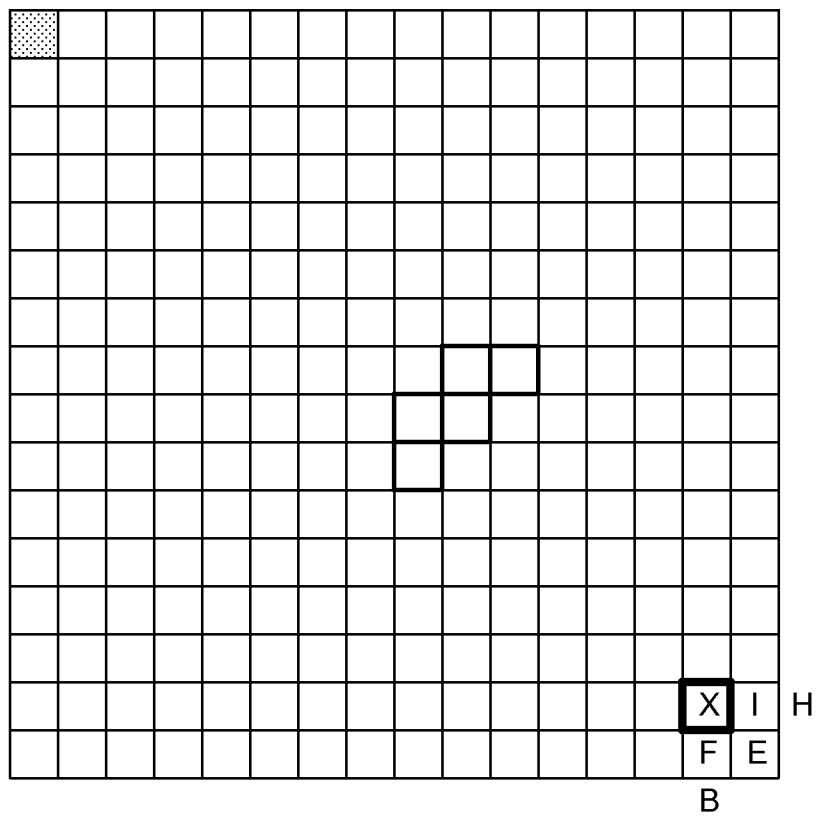
FIG. 15 is a conceptual diagram illustrating example causal neighbors for entropy coding using an inverse scan order.

FIG. 15 shows an example where the current position of coefficient X causes some of the neighbor coefficients (in this case H and B) to be outside of the current block. If any of the neighbors of the current coefficient are outside the block it may be assumed that such neighbor coefficients have 0 significance (i.e., they are zero-valued and therefore non-significant). Alternatively, one or more special contexts may be specified for one or more coefficients at the lower right. In this way, higher frequency coefficients may have contexts depending on position, in a similar way as the DC coefficient. However, assuming the neighbors to be zero may provide sufficient results, particularly because the lower right coefficients will ordinarily have a low probability of having significant coefficients, or at least significant coefficients with large values.

The reduction of the number contexts in the example of FIG. 14 is good for implementation. However, it may result in a small drop in performance. This disclosure proposes a further technique to improve the performance while still reducing the number of contexts. In particular, it is proposed to have a second set of contexts that is also based on neighbor coefficients. The context derivation algorithm is exactly the same, but two sets of contexts with different probability models are used. The set of contexts that are used depends on the position of the coefficient to be coded within the transform unit.

More specifically, increased performance has been shown when using a context model for higher frequency coefficients (e.g., lower right x, y coordinate positions of coefficients) that is different from the context model for coefficients at lower frequencies (e.g., upper left x, y coordinate positions of coefficients). One way to separate the lower frequency coefficients from the higher frequency coefficients, and thus the context model used for each, is to compute the x+y value for a coefficient, where x is the horizontal position and y is the vertical position of the coefficient. If this value is smaller than some threshold (e.g., 4 has been shown to work well), then context set 1 is used. If the value is equal to or larger than the threshold, then context set 2 is selected. Again, context sets 1 and 2 have different probability models.

Figure 16:
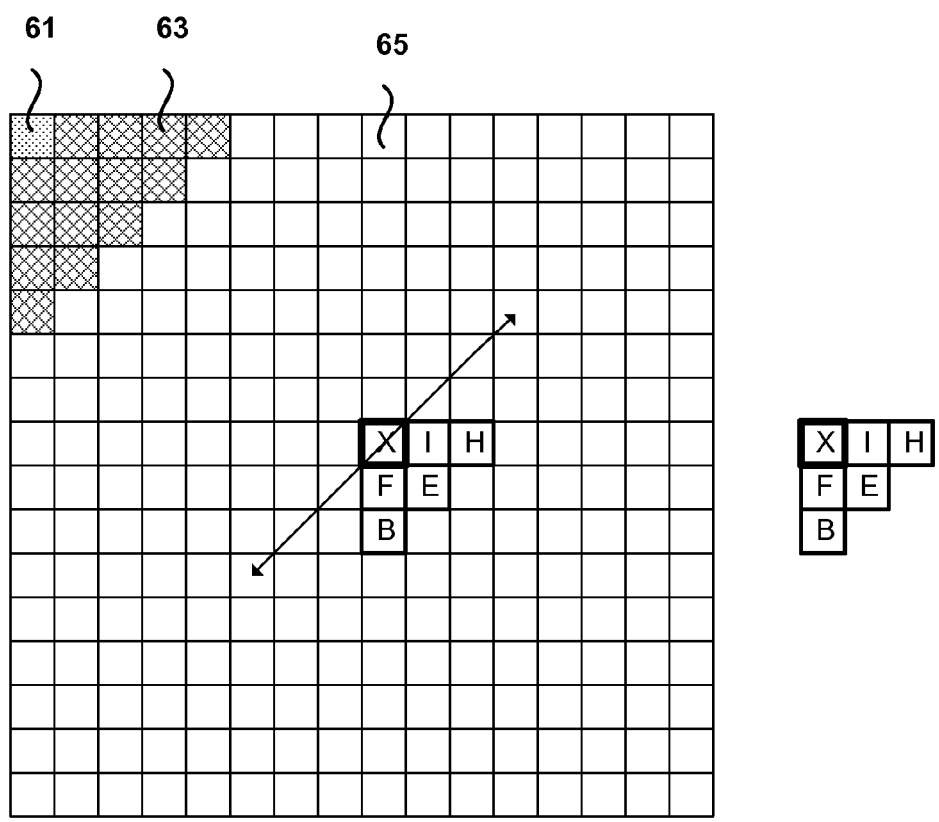
FIG. 16 is a conceptual diagram illustrating another example of context regions for CABAC using an inverse scan order.

FIG. 16 shows an example of the context regions for this example. Again, the DC coefficient at position (0,0) has its own context region 61. The lower frequency context region 63 consists of transform coefficients at an x+y position equal to or less than a threshold of 4 (not including the DC coefficient). The higher frequency context region 65 consists of transform coefficients at an x+y position greater than a threshold of 4. The threshold of 4 is used an example and may be adjusted to any number that provides for better performance. In another example, the threshold may depend on the TU size.

The context derivation for the lower frequency context region 63 and the higher frequency context region 65 is exactly the same in terms of the manner in which the neighbors are used to select context, but the employed probabilities (i.e., contexts) are different. In particular, the same criteria for context selection based on neighbors may be used, but the application of such criteria leads to selection of a different context for different coefficient positions, because different coefficient positions may be associated with different sets of contexts. In this way, the knowledge that lower and high frequency coefficients have different statistics is incorporated in the algorithm, so that different context sets for different coefficient may be used.

Figure 17:
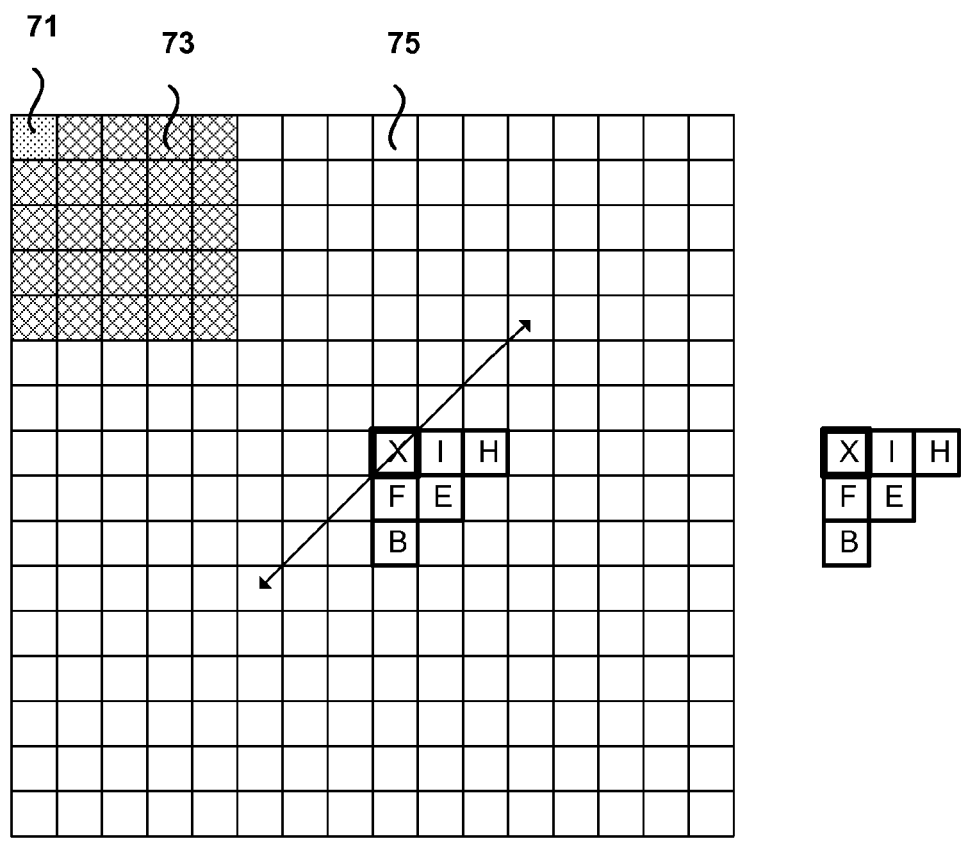
FIG. 17 is a conceptual diagram illustrating another example of context regions for CABAC using an inverse scan order.

In other examples, the x+y function can be changed to other functions depending on the position of the coefficient. For instance, an option is to give the same set of contexts to all the coefficients with x<T and y<T, T being a threshold. FIG. 17 shows an example of a block of transform coefficients with these context regions. Again, the DC coefficient at position (0,0) may have its own context region 61. The lower frequency context region 73 consists of all transform coefficients whose X or Y position is less than or equal to a threshold of 4 (not including the DC coefficient). The higher frequency context region consists of all transform coefficients whose X or Y position is greater than a threshold of 4. Again, the threshold of 4 is used as an example and may be adjusted to any number that provides for better performance. In one example, the threshold may depend on the TU size.

The above described techniques shown in FIGS. 16 and 17 have two sets of 5 contexts, which is still a lesser number of contexts than the number of contexts shown in FIG. 10, and exhibits higher performance. This is achieved by separating the block into different areas, and specifying different context sets for the coefficients in the different areas, but still applying the same context derivation criteria to each area.

Figure 18:
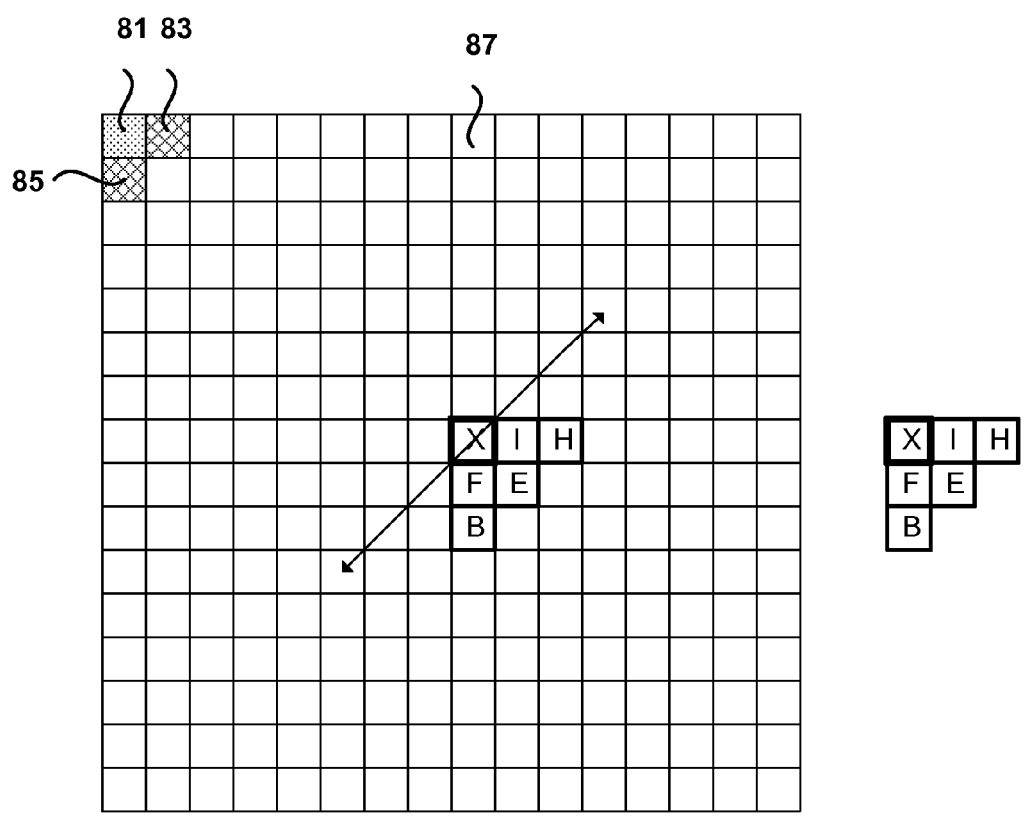
FIG. 18 is a conceptual diagram illustrating another example of context regions for CABAC using an inverse scan order.

FIG. 18 shows another example of a block of transform coefficients with context regions. In this example, the DC coefficient in region 81 and the coefficients at x, y positions (1, 0) and (0, 1), in regions 83 and 85, each have their own context. The remaining region 87 has yet another context. In a variation of the example shown in FIG. 18, regions 83 and 85 share a context.

In general, the above-described techniques may include scanning significant coefficients in a block of transform coefficients in an inverse direction from higher frequency coefficients in the block of the transform coefficients to lower frequency coefficients in the block of transform coefficients to form a significance map, and determining contexts for context adaptive binary arithmetic coding (CABAC) of the significant coefficients of the significance map based on a local neighborhood of previously scanned coefficients in the block. The contexts may be determined for each of the significant coefficients based on previously scanned transform coefficients in the local neighborhood having higher frequencies than the respective transform coefficient. In some examples, the contexts may be determined based on a sum of the number of significant coefficients in previously scanned coefficients of a context neighborhood. The local neighborhood for each of the significant coefficients to be coded may comprise a plurality of transform coefficients that spatially neighbor the respective coefficient in the block.

A context for a significant coefficient at a DC (e.g., upper left-most) position of the block of transform coefficients may be determined based on an individual context specified for the significant coefficient at the DC position. Also, a context may be determined for coefficients at a left edge and top edge of the block using criteria substantially similar or identical to criteria used to determine context for coefficients that are not at the left edge and top edge of the block. In some examples, context for a coefficient at lower right-most position of the block may be determined using criteria that assumes that neighboring coefficients outside of the block are zero-valued coefficients. Also, in some examples, determining a context may comprise determining a context for coefficients using substantially similar or identical criteria for selection of contexts within a context set, but different context sets, based on positions of the coefficients within the block of transform coefficients.

Reference to upper, lower, right, left, and the like in this disclosure is used generally for convenience to refer to relative positions of higher frequency and lower frequency coefficients in a block of transform coefficients that is arranged, in a conventional manner, to have lower frequency coefficients toward the upper left and higher frequency coefficients toward the lower right of the block, and should not be considered limiting for cases in which the higher and lower frequency coefficients may be arranged in a different, unconventional manner.

Returning to FIG. 5, in some examples, the transform module 52 may be configured to zero out certain transform coefficients (that is, transform coefficients in certain locations). For example, the transform module 52 may be configured to zero out all transform coefficients outside of the upper-left quadrant of the TU following the transform. As another example, the entropy encoding unit 56 may be configured to zero out transform coefficients in the array following a certain position in the array. In any case, the video encoder 20 may be configured to zero out a certain portion of the transform coefficients, e.g., before or after the scan. The phrase "zero out" is used to mean setting the value of the coefficient equal to zero, but not necessarily skipping or discarding the coefficient. In some examples, this setting of coefficients to zero may be in addition to the zeroing out that may result from quantization.

The inverse quantization unit 58 and the inverse transform module 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the reference frame buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block for storage in the reference frame buffer 64. The reconstructed video block may be used by the motion estimation unit 42 and the motion compensation unit 44 as a reference block to inter-code a block in a subsequent video frame.

Figure 19:
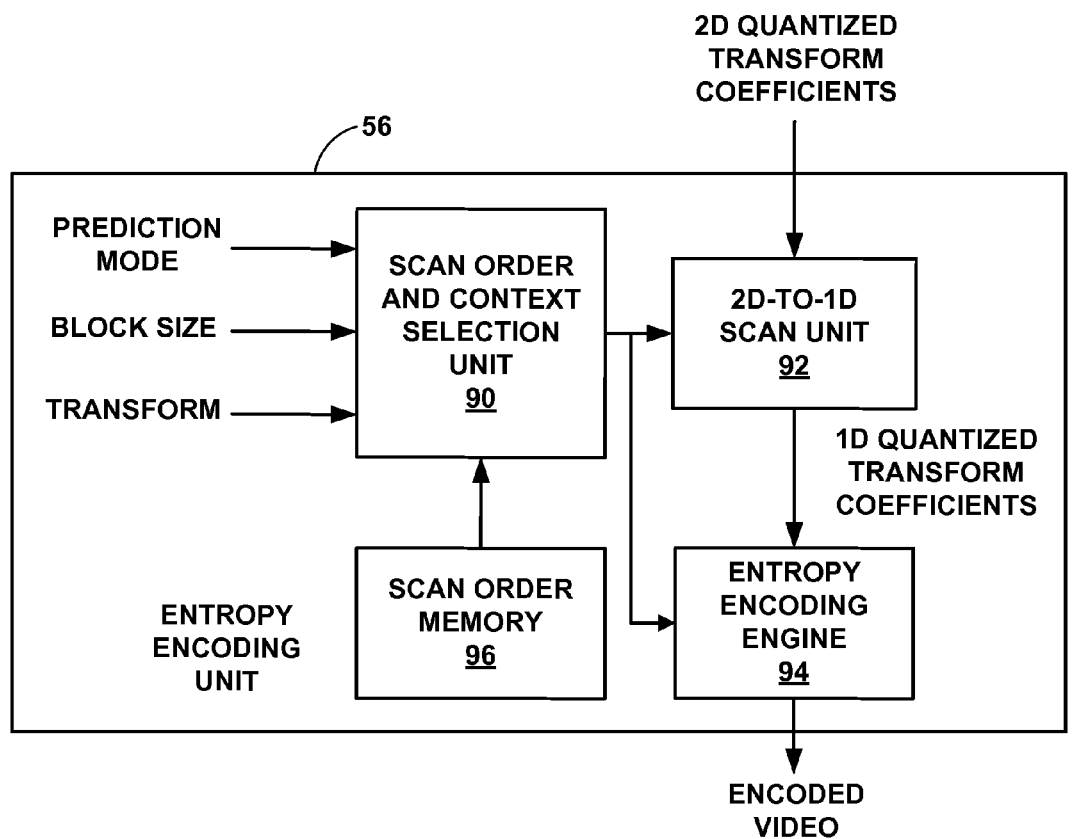
FIG. 19 is a block diagram illustrating an example entropy coding unit.

FIG. 19 is a block diagram illustrating an example of an entropy encoding unit 56 for use in the video encoder of FIG. 5. FIG. 19 illustrates various functional aspects of the entropy encoding unit 56 for selecting a scan order and corresponding context set used in CABAC entropy coding. The entropy encoding unit 56 may include a scan order and context selection unit 90, a 2D-to-1D scan unit 92, an entropy encoding engine 94, and a scan order memory 96.

The scan order and context selection unit 90 selects the scan order to be used by the 2D-to-1D scan unit 92 for the significance map scan and the coefficient level scan. As discussed above, the scan order consists of both a scan pattern and a scan direction. The scan memory 96 may store instructions and/or data that defines what scan order to use for particular situations. As examples, the prediction mode of a frame or slice, the block size, the transform, or other characteristics of the video data used may be used to select the scan order. In one proposal for HEVC, each of the intra prediction modes is assigned to a particular scan order (sub-block diagonal, horizontal or vertical). The decoder parses the intra prediction mode, and determines the scan order to apply using look-up-table. Adaptive methods may be used to track the statistics of the most frequent significant coefficients. In another example, a scan may be based on the most frequently used coefficients first in scan order. As another example, the scan order and context selection unit 90 may use a predetermined scan order for all situations. As described above, the scan order and context selection unit 90 may select a scan order for both a significance map and a coefficient level scan. In accordance with techniques of this disclosure, the two scans may have the same scan order, and in particular, may both be in an inverse direction.

Based on the selected scan order, the scan order and context selection unit 90 also selects the contexts to be used for CABAC in the entropy encoding engine 94, such as the contexts described above with reference to FIG. 11 and FIGS. 13-18.

The 2D-to-1D scan unit 92 applies the selected scans to the two-dimensional array of transform coefficients. In particular, the 2D-to-1D scan unit 92 may scan the transform coefficients in sub-sets, as is described above with reference to FIGS. 7-9. In particular, transform coefficients are scanned in a sub-set consisting of a number of consecutive coefficients according to the scan order. Such sub-sets are applicable for both the significance map scan as well as the coefficient level scan. Additionally, the 2D-to-1D scan unit 92 may perform significance map and coefficient level scans as consecutive scans and according to the same scan order. The consecutive scans may consist of several scans, as described above. In one example, the first scan is the significance map scan, the second scan is of bin one of the levels of transform coefficients in each sub-set, the third scan is of the remaining bins of the levels of transform coefficients, and the fourth scan is of the sign of the levels of transform coefficients.

The entropy encoding engine 94 applies an entropy encoding process to the scanned coefficients using the selected context from the scan order and context selection unit 90. In some examples the context used for CABAC may be predetermined for all cases, and as such, there may be no need for a process or unit to select the contexts. The entropy encoding process may be applied to the coefficients after they are fully scanned into the 1D vector, or as each coefficient is added to the 1D vector. In other examples, the coefficients are processed directly in the 2D array using the scan order. In some cases, the entropy encoding engine 94 may be configured to encode different sections of the 1D vector in parallel to promote parallelization of the entropy encoding process for increased speed and efficiency. The entropy encoding engine 94 produces a bitstream carrying the encoded video. The bitstream may be transmitted to another device or stored in a data storage archive for later retrieval. In addition to the residual transform coefficient data, the bitstream may carry motion vector data and various syntax elements useful in decoding the encoded video in the bitstream.

In addition, the entropy encoding unit 56 may provide signaling in the encoded video bitstream to indicate the scan order and/or contexts used in the CABAC process. The scan order and/or contexts may be signaled, for example, as syntax elements at various levels, such as the frame, slice, LCU, CU level or TU level. If a predetermined scan order and/or context are set, there may be no need to provide signaling in the encoded bitstream. Also, in some examples, it may be possible for the video decoder 30 to infer some of the parameter values without signaling. To permit definition of different scan orders for different TU's, it may be desirable to signal such syntax elements at the TU level, e.g., in a TU quadtree header. Although signaling in the encoded video bitstream is described for purposes of illustration, information indicating the parameter values or function could be signaled out-of-band in side information.

In this context, signaling the scan order and/or contexts in the encoded bitstream does not require real-time transmission of such elements from the encoder to a decoder, but rather means that such syntax elements are encoded into the bitstream and are made accessible to the decoder in any fashion. This may include real-time transmission (e.g., in video conferencing) as well as storing the encoded bitstream on a computer-readable medium for future use by a decoder (e.g., in streaming, downloading, disk access, card access, DVD, Blu-ray, etc.).

It should be noted that, although shown as separate functional units for ease of illustration, the structure and functionality of the scan order and context selection unit 90, the 2D-to-1D scan unit 92, the entropy encoding engine 94, and the scan order memory 96 may be highly integrated with one another.

Figure 20:
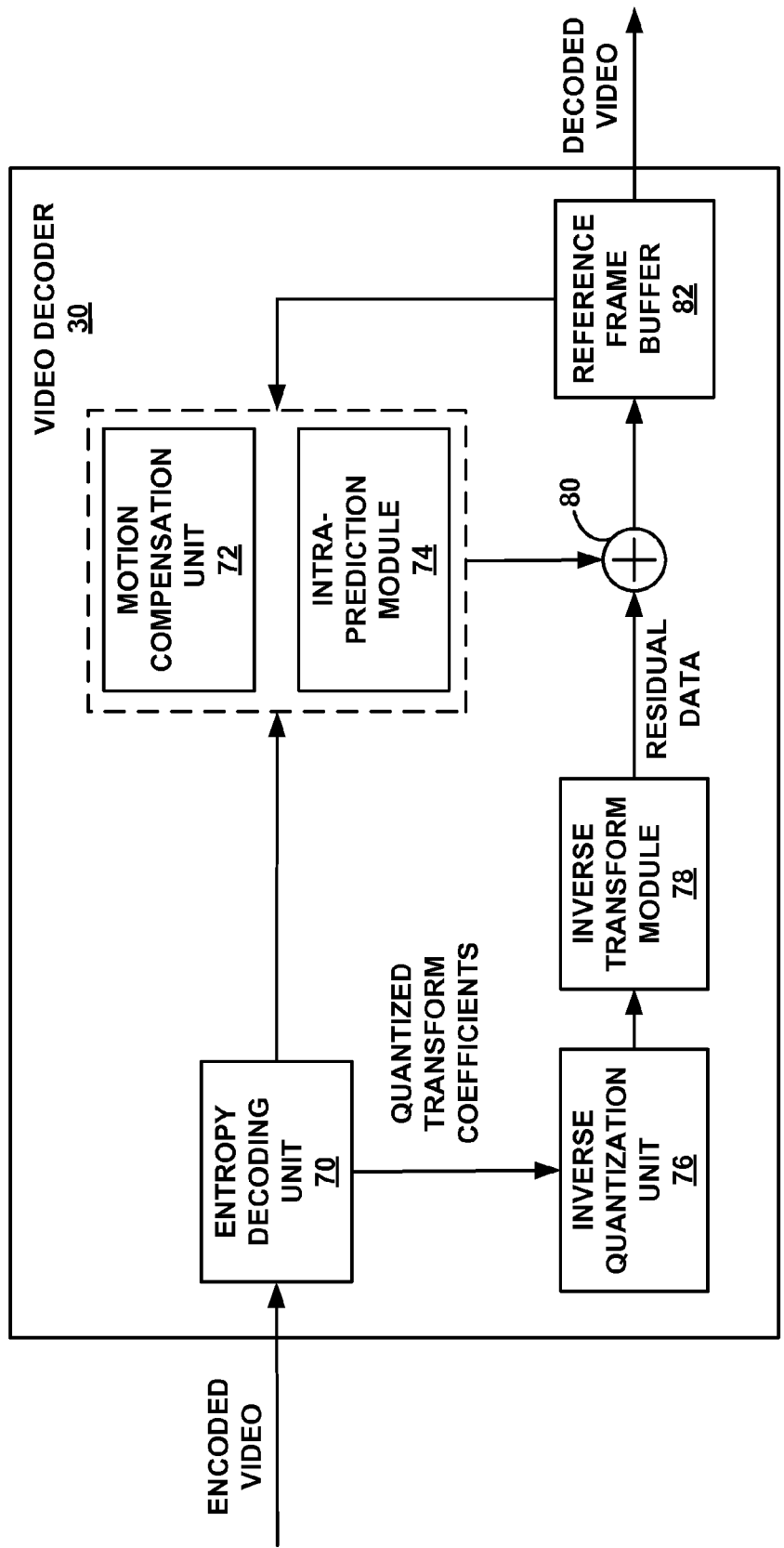
FIG. 20 is a block diagram illustrating an example video decoder.

FIG. 20 is a block diagram illustrating an example of a video decoder 30, which decodes an encoded video sequence. In the example of FIG. 20, the video decoder 30 includes an entropy decoding unit 70, a motion compensation unit 72, an intra-prediction module 74, an inverse quantization unit 76, an inverse transformation unit 78, a reference frame buffer 82 and a summer 80. The video decoder 30 may, in some examples, perform a decoding pass generally reciprocal to the encoding pass described with respect to the video encoder 20 (FIG. 5).

The entropy decoding 70 entropy decodes the encoded video in a process that is the inverse of that used by entropy encoding unit 56 of FIG. 5. The motion compensation unit 72 may generate prediction data based on motion vectors received from the entropy decoding unit 70. The intra-prediction module 74 may generate prediction data for a current block of a current frame based on a signaled intra-prediction mode and data from previously decoded blocks of the current frame.

In some examples, the entropy decoding unit 70 (or the inverse quantization unit 76) may scan the received values using a scan mirroring the scan order used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

In accordance with the techniques of this disclosure, the video decoder 30 may scan both the significance map of the transform coefficients as well as levels of the transform coefficients according to the same scan order. That is to say, the scan order for the significance map and the level coding should have the same pattern and direction. In addition, the video encoder 30 may use a scan order for the significance map that is in the inverse direction. As another example, the video encoder 30 may use a scan order for the significance map the level coding that is harmonized in an inverse direction.

In another aspect of this disclosure, the video decoder 30 may scan transform coefficients in sub-sets. In particular, transform coefficients are scanned in a sub-set consisting of a number of consecutive coefficients according to the scan order. Such sub-sets are applicable for both the significance map scan as well as the coefficient level scan. Additionally, the video decoder 30 may perform the significance map scan and the coefficient level scan as consecutive scans according to the same scan order. In one aspect, the scan order is an inverse scan order. The consecutive scans may consist of several scans. In one example, the first scan is the significance map scan, the second scan is of bin one of the levels of transform coefficients in each sub-set, the third scan is of the remaining bins of the levels of transform coefficients, and the fourth scan is of the sign of the levels of transform coefficients.

The video decoder 30 may receive, from encoded bitstream, signaling that identifies the scan order and/or contexts used for CABAC by the video encoder 20. Additionally, or alternatively, the scan order and contexts may be inferred by the video decoder 30 based on characteristics of the coded video such as prediction mode, block size, or other characteristics. As another example, the video encoder 20 and the video decoder 30 may use predetermined scan orders and contexts for all use cases, and as such, no signaling in the encoded bitstream would be needed.

No matter how the scan order is determined, the entropy decoding unit 70 uses the inverse of the scan order to scan the 1D vector into the 2D array. The 2D array of transform coefficients produced by the entropy decoding unit 70 may be quantized and may generally match the 2D array of transform coefficients scanned by the entropy encoding unit 56 of the video encoder 20 to produce the 1D vector of transform coefficients.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a 1D vector to a 2D array.

The inverse transform module 78 applies an inverse transform, e.g., an inverse DCT, an inverse integer transform, an inverse KLT, an inverse rotational transform, an inverse directional transform, or another inverse transform. In some examples, the inverse transform module 78 may determine an inverse transform based on signaling from the video encoder 20, or by inferring the transform from one or more coding characteristics such as block size, coding mode, or the like. In some examples, the inverse transform module 78 may determine a transform to apply to the current block based on a signaled transform at the root node of a quadtree for an LCU including the current block. In some examples, the inverse transform module 78 may apply a cascaded inverse transform.

The motion compensation unit 72 produces motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

The motion compensation unit 72 and the intra-prediction module 74, in an HEVC example, may use some of the syntax information (e.g., provided by a quadtree) to determine sizes of LCUs used to encode frame(s) of the encoded video sequence. The motion compensation unit 72 and the intra-prediction module 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction module 74 to form decoded blocks. If desired, a deblocking filter may also be applied to filter the decoded blocks in order to remove blockiness artifacts. The decoded video blocks are then stored in the reference frame buffer 82, which provides reference blocks for subsequent motion compensation and also produces decoded video for presentation on a display device (such as the display device 32 of FIG. 4).

As mentioned above, the techniques for scanning transform coefficients presented in this disclosure are applicable for both an encoder and a decoder. A video encoder may apply the scan order to scan transform coefficients from the two-dimensional array to the one-dimensional array, whereas a video decoder may apply the scan order, e.g., in an inverse manner to the encoder, to scan transform coefficients from the one-dimensional array to the two-dimensional array. Alternatively, a video decoder may apply the scan order to scan transform coefficients from the one-dimensional array to the two-dimensional array, and a video encoder may apply the scan order, in an inverse manner to the decoder, to scan transform coefficients from the two-dimensional array to the one-dimensional array. Hence, scanning by a coder may refer to 2D-to-1D scanning by an encoder or 1D-to-2D scanning by a decoder. In addition, scanning according to a scan order may refer to scanning in the scan order for 2D-to-1D scanning, scanning in the scan order for 1D-to-2D scanning, scanning in the inverse of the scan order for 1D-to-2D scanning, or scanning in the inverse of the scan order for 2D-to-1D scanning. Hence, the scan order may be established for scanning by the encoder or scanning by the decoder.

The video decoder 30 may operate in a manner essentially symmetrical to that of the video encoder 20. For example, the video decoder 30 may receive entropy encoded data representative of an encoded CU, including encoded PU and TU data. The video decoder 30 may inverse entropy encode the received data, forming encoded quantization coefficients. When the video encoder 20 entropy encodes data using an arithmetic coding algorithm (e.g., CABAC), the video decoder 30 may use a context model to decode the data, which corresponds to the same context model used by the video encoder 20 to encode the data.

The video decoder 30 may also inverse scan the decoded coefficients, using an inverse scan that mirrors the scan used by the video encoder 20. To inverse scan the coefficients, the video decoder 30 selects the same scan order used by the video encoder 20, which may be stored at the decoder or signaled by the encoder in the encoded bitstream. Using this scan order, the video decoder 30 thereby forms a two-dimensional matrix from the one-dimensional vector of quantized transform coefficients resulting from the entropy decoding process. In particular, video decoder 30 inverse scans the coefficients from the one-dimensional array into a two-dimensional array according to the scan order used by video encoder 20.

Next, the video decoder 30 may inverse quantize the coefficients in the two-dimensional matrix produced by the inverse scan performed according to the scan order. The video decoder 30 may then apply one or more inverse transforms to the two-dimensional matrix. The inverse transforms may correspond to the transforms applied by the video encoder 20. The video decoder 30 may determine the inverse transforms to apply based on, for example, information signaled at the root of a quadtree corresponding to the CU currently being decoded, or by reference to other information indicative of the appropriate inverse transforms. Upon application of the inverse transform(s), the video decoder 30 recovers the residual video data in the pixel domain and applies intra-predictive or inter-predictive decoding, as applicable, to reconstruct the original video data.

Figure 21:
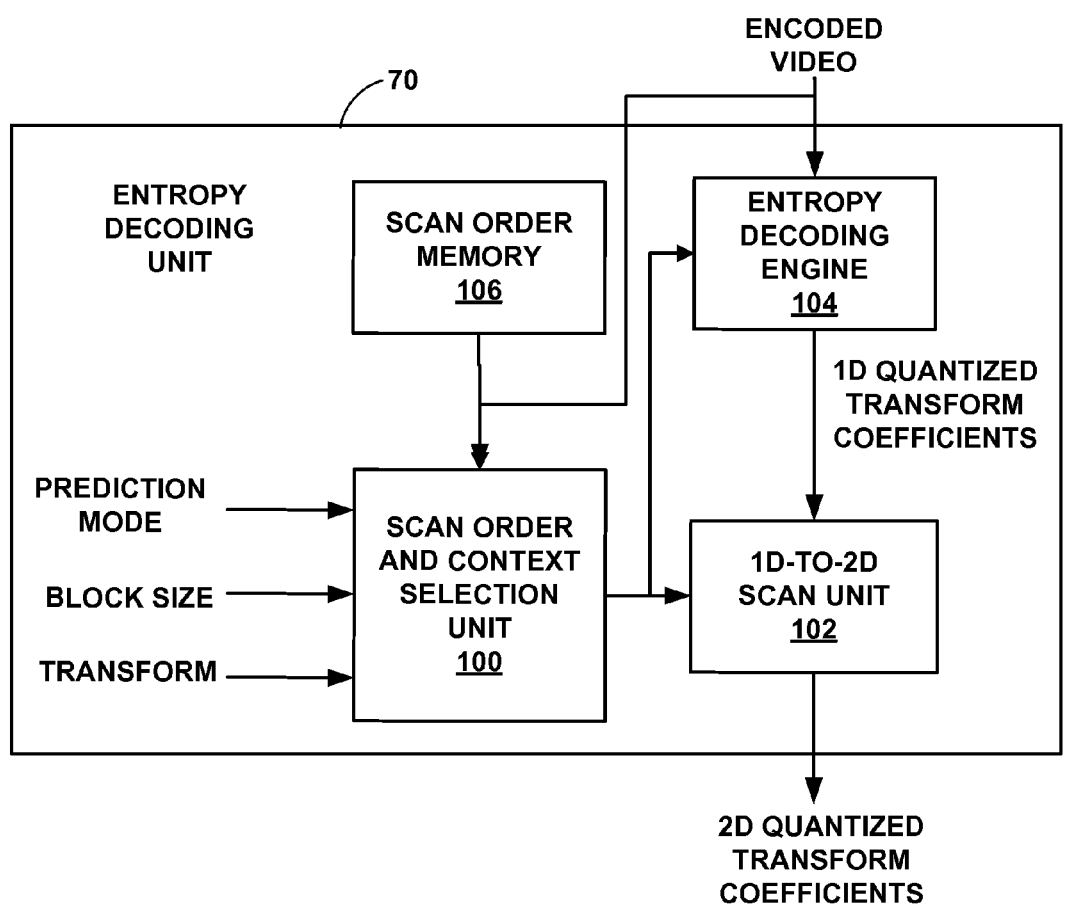
FIG. 21 is a block diagram illustrating an example entropy decoding unit.

FIG. 21 is a block diagram illustrating an example of an entropy decoding unit 70 for use in the video decoder of FIG. 20. FIG. 21 illustrates various functional aspects of the entropy decoding unit 70 for selecting a scan order and contexts used for CABAC decoding in a video decoding process. As shown in FIG. 21, the entropy encoding unit 70 may include a scan order and context selection unit 100, a 1D-to-2D scan unit 102, an entropy decoding engine 104, and a scan order memory 106.

The entropy decoding engine 104 entropy decodes encoded video transmitted to the video decoder 30 or retrieved by the video decoder 30 from a storage device. For example, the entropy decoding engine 104 may apply an entropy decoding process, e.g., CAVLC, CABAC or another process, to the bitstream carrying the encoded video to recover the 1D vector of transform coefficients. In addition to the residual transform coefficient data, the entropy decoding engine 104 may apply entropy decoding to reproduce motion vector data and various syntax elements useful in decoding the encoded video in the bitstream. The entropy decoding engine 104 may determine which entropy decoding process, e.g., CAVLC, CABAC or another process, to select based on signaling in the encoded video bitstream or by inferring the appropriate process from other information in the bitstream.

In accordance with the techniques of this disclosure, the entropy decoding engine 104 may entropy decode the encoded video using CABAC in accordance with two different context regions. The scan order and context selection unit 100 may provide the context derivation to the entropy decoding engine 104. According to examples of this disclosure, the context derivation for a first context region depends on the position of the transform coefficients while the context derivation for the second region depends on causal neighbors of the transform coefficients. In another example, the second context region can use two different context models depending on the location of the transform coefficients.

The scan order and context selection unit 100 may also determine the scan order, and/or an indication of the scan order, based on signaling in the encoded video bitstream. For example, entropy decoding unit 70 may receive syntax elements that explicitly signal the scan order. Again, although signaling in the encoded video bitstream is described for purposes of illustration, the scan order could be received by entropy decoding unit 70 as out-of-band in side information. Also, in some examples, it may be possible for the scan order and context selection unit 100 to infer the scan order without signaling. The scan order may be based on prediction mode, block size, transform, or other characteristics of the encoded video. Like the memory 96 of FIG. 19, the scan order memory 106 of FIG. 21 may store instructions and/or data defining the scan order.

The 1D-to-2D scan unit 102 receives the scan order from scan order and context selection unit 100 and applies the scan order, either directly or in an inverse manner, to control the scanning of coefficients. In accordance with techniques of this disclosure, the same scan order may be used for both the significance map scan and the coefficient level. In another aspect of the disclosure, the significance map scan may be in an inverse direction. In another aspect of the disclosure, both the significance map scan and the coefficient level scan may be in the inverse direction.

According to another aspect of the disclosure, the 1D-to-2D scan unit 102 may scan the one-dimensional array of transform coefficients into one or more sub-sets of transform coefficients, coding significance of transform coefficients in each sub-set, and coding levels of transform coefficients in each sub-set. In another aspect of the disclosure, the significance map and the coefficient level scan are performed in consecutive scans according to the same scan order. In one aspect, the scan order is an inverse scan order. The consecutive scans may consist of several scans where the first scan is the significance map scan, the second scan is of bin one of the levels of transform coefficients in each sub-set, the third scan is of the remaining bins of the levels of transform coefficients, and the fourth scan is of the sign of the levels of transform coefficients.

On the encoder side, coding of the transform coefficients may comprise encoding the transform coefficients according to the scan order to form the one-dimensional array of the transform coefficients. On the decoder side, coding the transform coefficient may comprise decoding the transform coefficients according to the scan order to reconstruct a two-dimensional array of the transform coefficients in the transform block.

It should be noted that, although shown as separate functional units for ease of illustration, the structure and functionality of the scan order and context selection unit 100, the 1D-to-2D scan unit 102, the entropy decoding engine 104, and the scan order memory 106 may be highly integrated with one another.

Figure 22:
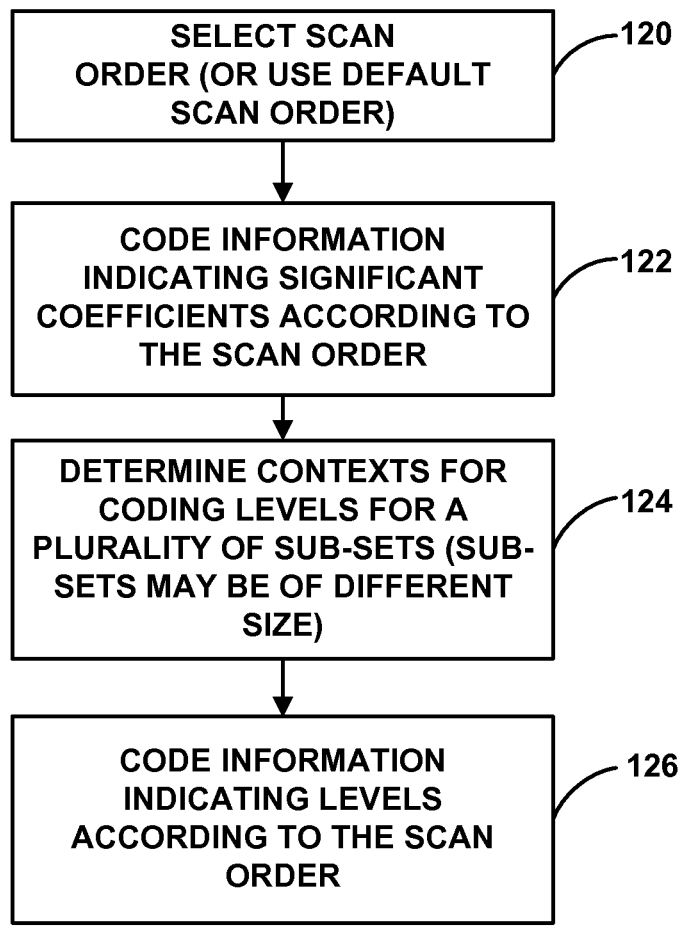
FIG. 22 is a flowchart illustrating an example process for significance map and coefficients level scanning with a harmonized scan order.

FIG. 22 is a flowchart illustrating an example process for significance map and coefficients level scanning with a harmonized scan order. A method of coding a plurality of transform coefficients associated with residual video data in a video coding process is proposed. The method may be performed by a video coder, such as video encoder 20 or video decoder 30 of FIG. 4. The video coder may be configured to select a scan order (120). The scan order may be selected based on prediction mode, block size, transform, or other video characteristics. In addition, the scan order may be a default scan order. The scan order defines both a scan pattern and a scan direction. In one example, the scan direction is an inverse scan direction proceeding from higher frequency coefficients in the plurality of transform coefficients to lower frequency coefficients in the plurality of transform coefficients. The scan pattern may include one of a zig-zag pattern, a diagonal pattern, a horizontal pattern or a vertical pattern.

The video coder may be further configured to code information indicating significant coefficients for the plurality of transform coefficients according to a scan order (122) and determine contexts for coding the levels of the significant coefficients for a plurality of sub-sets of the significant coefficients, wherein each of the plurality of sub-sets comprises one or more significant coefficients scanned according to the scan order (124). The video coder also codes information indicating levels of the plurality of transform coefficients according to the scan order (126). The sub-sets may be of different sizes. It should be noted that steps 122, 124 and 126 may be interleaved, as the determination of contexts for level information depends on the previously coded neighbor coefficients.

Figure 23:
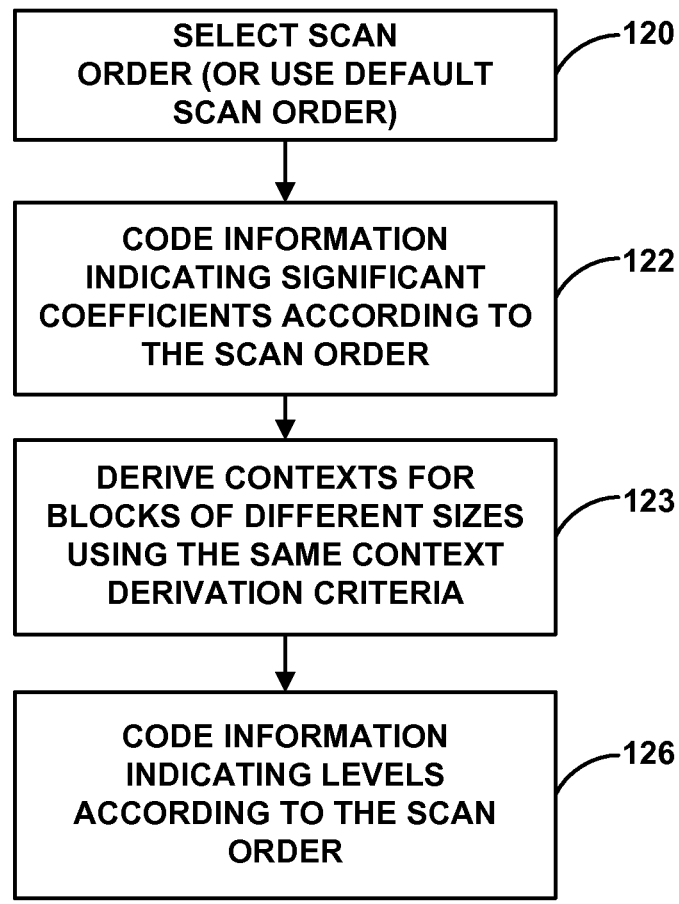
FIG. 23 is a flowchart illustrating an example process for significance map and coefficients level scanning and entropy coding context derivation.

FIG. 23 is a flowchart illustrating another example process for significance map and coefficients level scanning and CABAC context derivation. The method of FIG. 23 slightly differs from that shown in FIG. 22, as contexts of blocks of different sizes may use the same context derivation criteria. As one example, the video coder may derive a first context for a first block of the transform coefficients, the first block having a first size, according to context derivation criteria, and derive a second context for a second block of the transform coefficients, the second block having a second, different size, according to the same context derivation criteria as the first block (123). Like FIG. 22, steps 122, 123 and 126 may be interleaved, as the determination of contexts for level information depends on the previously coded neighbor coefficients.

Figure 24:
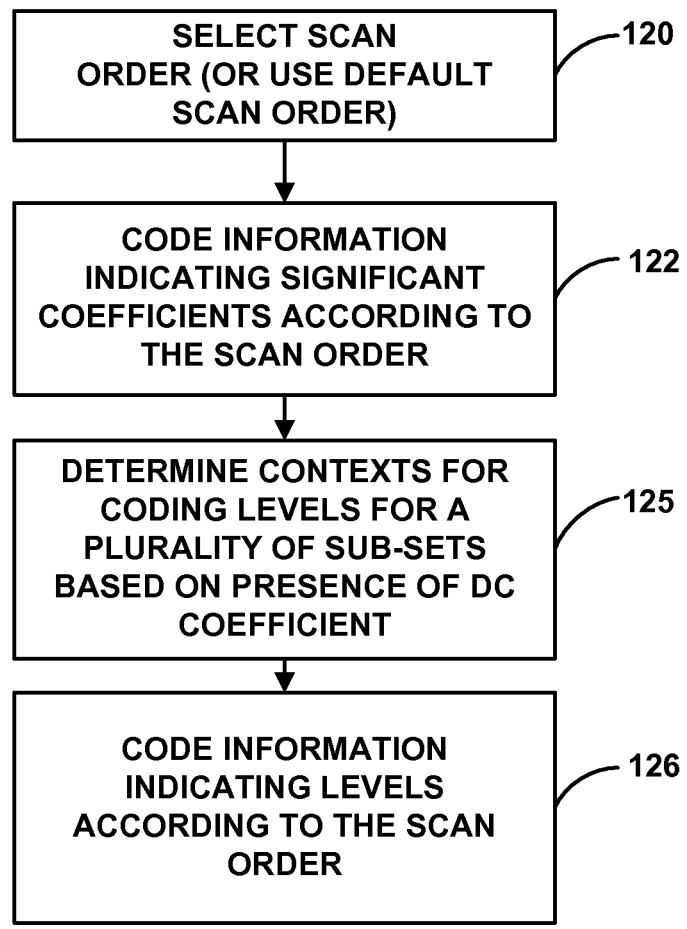
FIG. 24 is a flowchart illustrating another example process for significance map and coefficients level scanning and entropy coding context derivation.

FIG. 24 is a flowchart illustrating another example process for significance map and coefficients level scanning and CABAC context derivation. The method of FIG. 24 slightly differs from that shown in FIG. 22, as contexts for the sub-sets are determined based on the presence of the DC coefficient in the sub-sets. As one example, the video coder may determine different sets of contexts for different sub-sets of the coefficients based on whether the respective sub-sets contain a DC coefficient of the transform coefficients (125). Like FIG. 22, steps 122, 125 and 126 may be interleaved, as the determination of contexts for level information depends on the previously coded neighbor coefficients.

Figure 25:
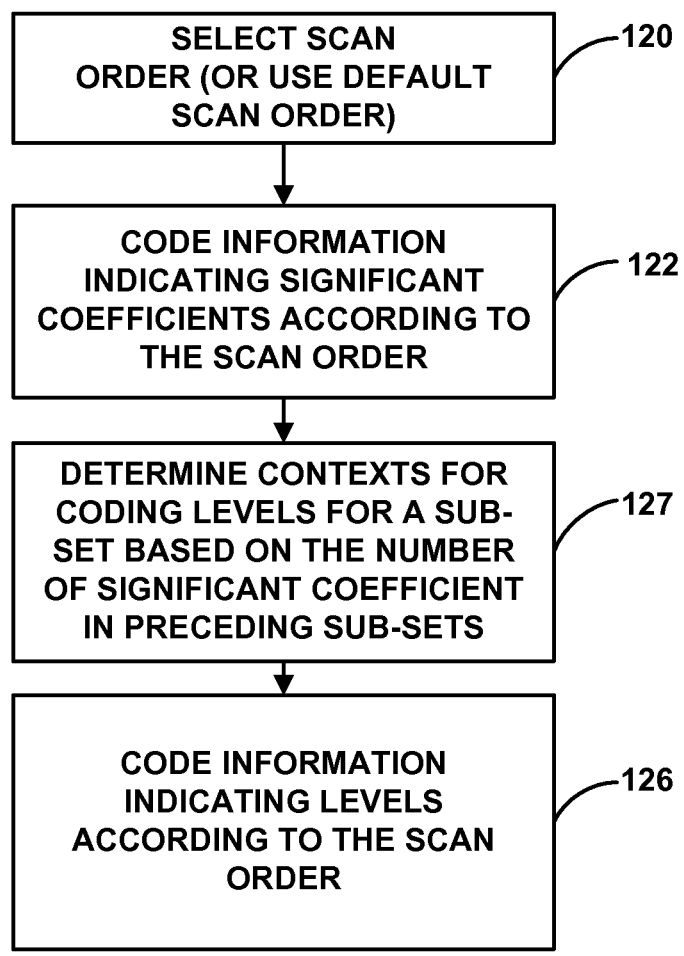
FIG. 25 is a flowchart illustrating another example process for significance map and coefficients level scanning and entropy coding context derivation.

FIG. 25 is a flowchart illustrating another example process for significance map and coefficients level scanning and CABAC context derivation. The method of FIG. 25 slightly differs from that shown in FIG. 22, as contexts are determined based on a weighted number of significant coefficients in other preceding sub-sets. As one example, the video coder may determine different sets of contexts for different sub-sets of the coefficients based a number of significant coefficients in an immediately preceding sub-set of the coefficients and a weighted number of significant coefficients in other preceding sub-sets of the coefficients (127). Like FIG. 22, steps 122, 127 and 126 may be interleaved, as the determination of contexts for level information depends on the previously coded neighbor coefficients.

Figure 26:
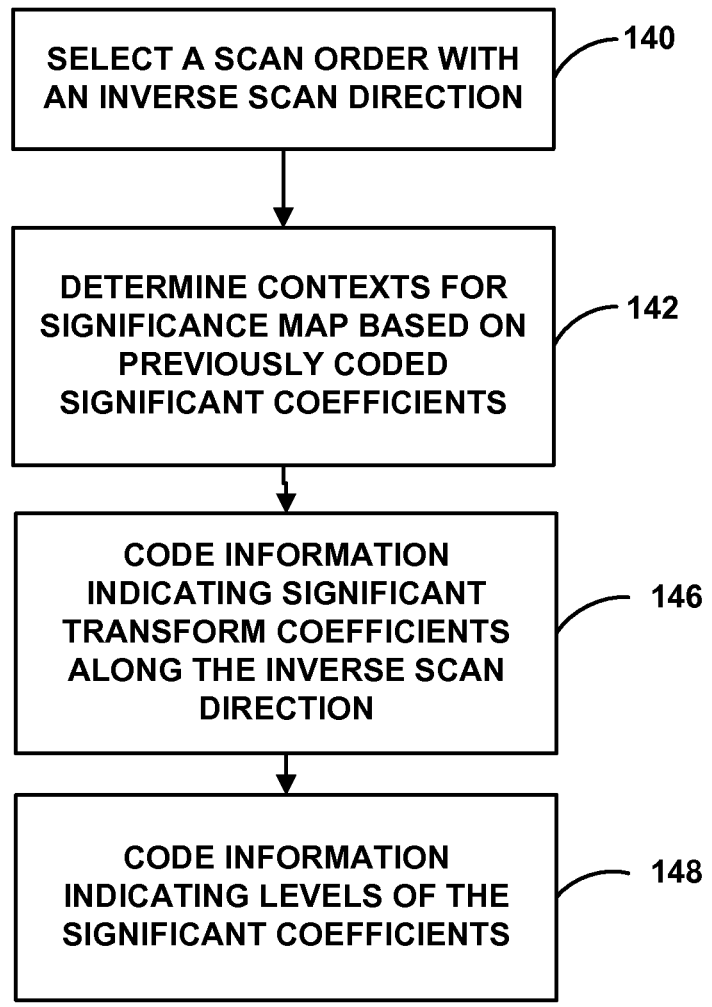
FIG. 26 is a flowchart illustrating an example process for significance map coding using an inverse scan direction.

FIG. 26 is a flowchart illustrating an example process for significance map coding using an inverse scan direction. A method of coding transform coefficients associated with residual video data in a video coding process is proposed. The method may be performed by a video coder, such as video encoder 20 or video decoder 30 of FIG. 4. The video coder may be configured to select a scan order with an inverse direction (140) and to determine contexts for context adaptive binary arithmetic coding (CABAC) of the information indicating a current one of the significant coefficients based on previously coded significant coefficients in the inverse scan direction (142). The video coder may further be configured code information indicating the significant transform coefficients along the inverse scan direction to form a significance map (146).

In one example, the scan has a diagonal pattern and the previously coded significant coefficients reside at positions to the right of a scan line on which a current one of the significant coefficients resides. In another example, the scan has a horizontal pattern and the previously coded significant coefficients reside at positions below a scan line on which a current one of the significant coefficients resides. In another example, the scan has a vertical pattern and the previously coded significant coefficients reside at positions to the right of a scan line on which a current one of the significant coefficients resides.

The video coder may further be configured to code information indicating levels of the significant transform coefficients (148). The step of coding information indicating levels of the significant transform coefficients may proceed in an inverse scan direction from higher frequency coefficients in the block of transform coefficients to lower frequency coefficients in the block of transform coefficients. Like FIG. 22, steps 142, 146 and 148 may be interleaved, as the determination of contexts for level information depends on the previously coded neighbor coefficients.

Figure 27:
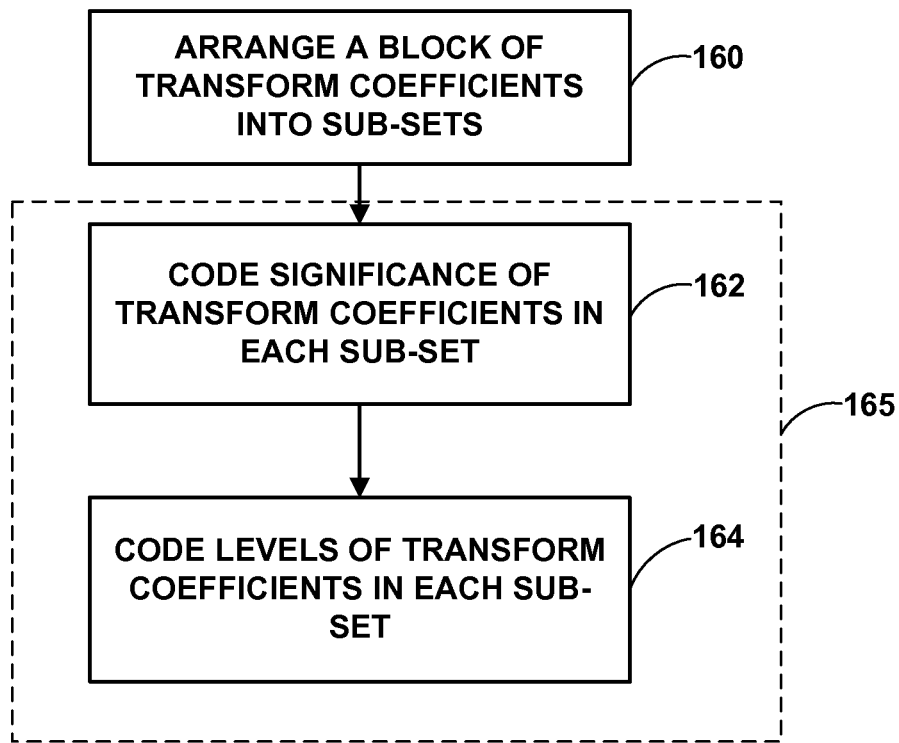
FIG. 27 is a flowchart illustrating an example process for significance map and coefficient level scanning according to sub-sets of transform coefficients.

FIG. 27 is a flowchart illustrating an example process for significance map and coefficient level scanning according to sub-sets of transform coefficients. A method of coding transform coefficients associated with residual video data in a video coding process is proposed. The method may be performed by a video coder, such as video encoder 20 or video decoder 30 of FIG. 4. The video coder may be configured to arrange a block of transform coefficients into one or more sub-sets of transform coefficients (160), code significance of transform coefficients in each sub-set (162), and code levels of transform coefficients in each sub-set (164). In one example, arranging the block of transform coefficients may include arranging the block of transform coefficients into a single set of transform coefficients corresponding to an entire transform unit. In another example, arranging the block of transform coefficients may include arranging the block of transform coefficients into one or more sub-sets of transform coefficients based on a scan order.

The video coder may be configured to code the significance of transform coefficients in each sub-set according to a scan order, and code the levels of transform coefficients according to the scan order. Coding the significance map (162) and the levels (164) may be performed together in two or more consecutive scan passes on the sub-set (165).

Figure 28:
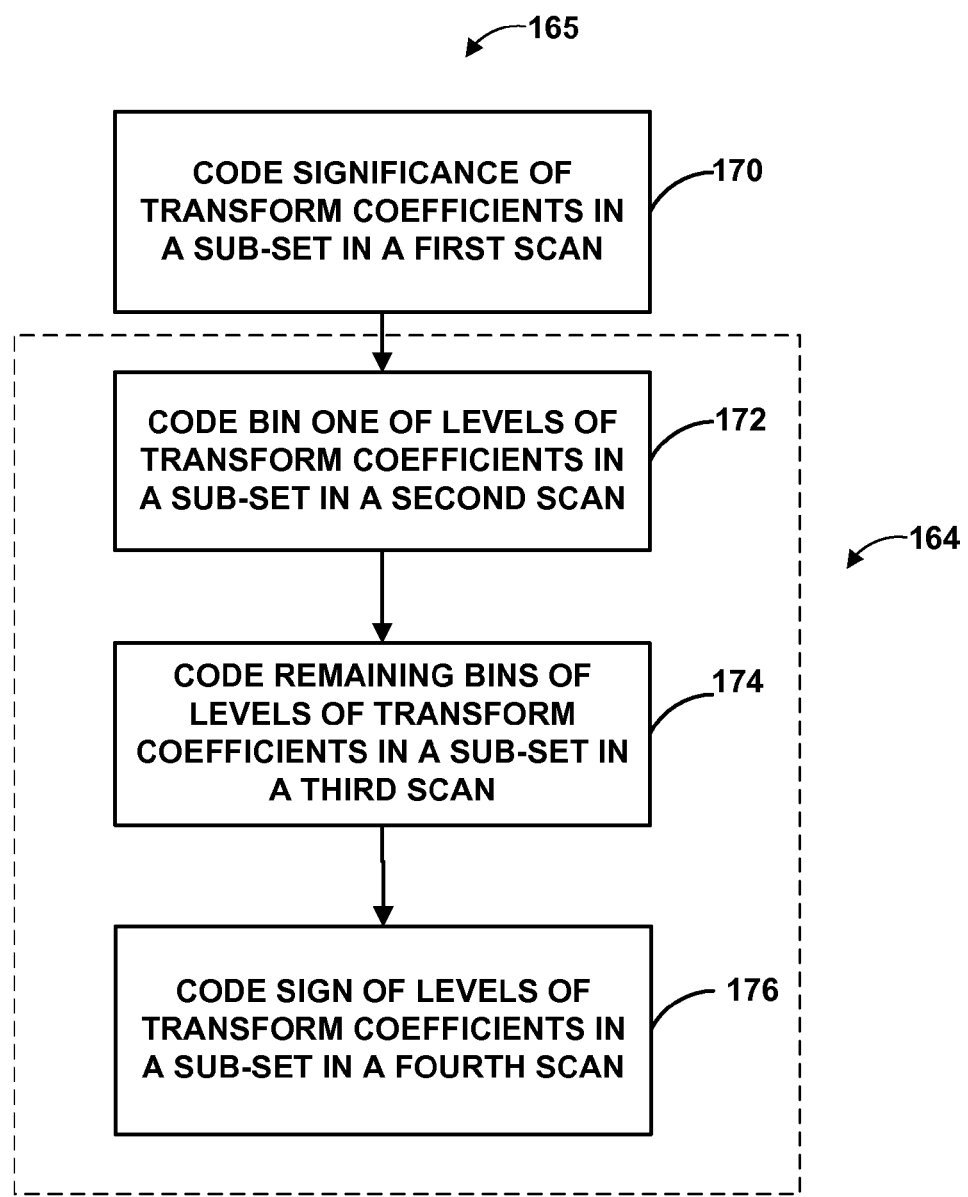
FIG. 28 is a flowchart illustrating another example process for significance map and coefficient level scanning according to sub-sets of transform coefficients.

FIG. 28 is a flowchart illustrating another example process for significance map and coefficient level scanning according to sub-sets of transform coefficients. The video encoder may perform the consecutive scans (165) by first coding the significance of transform coefficients in a sub-set in a first scan of transform coefficients in the respective sub-set (170).

Coding of the coefficient levels (164) in each sub-set includes at least a second scan of transform coefficients in the respective sub-set. The second scan may include coding bin one of the levels of transform coefficients in a sub-set in a second scan of transform coefficients in the respective sub-set (172), coding remaining bins of the levels of transform coefficients in a sub-set in a third scan of transform coefficients in the respective sub-set (174), and coding a sign of the levels of transform coefficients in a sub-set in a fourth scan of transform coefficients in the respective sub-set (176).

Figure 29:
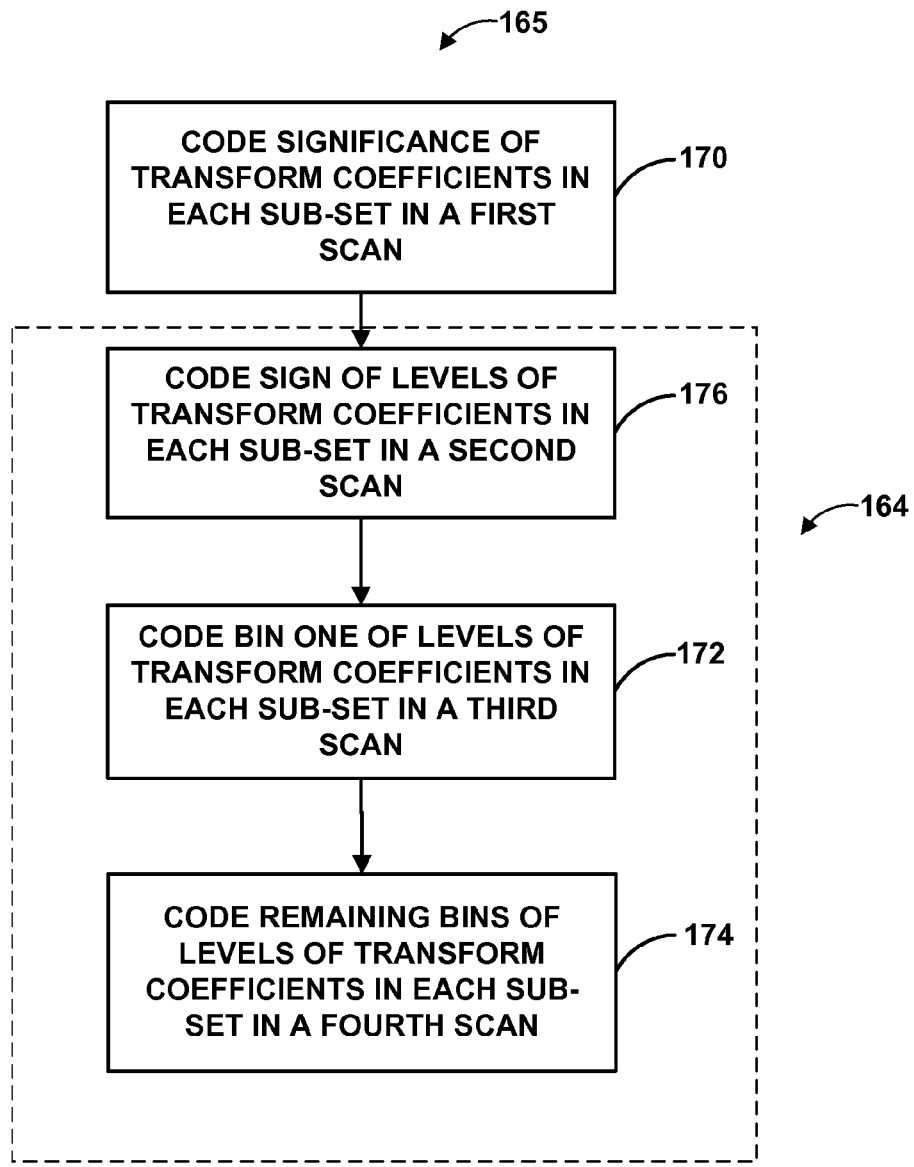
FIG. 29 is a flowchart illustrating another example process for significance map and coefficient level scanning according to sub-sets of transform coefficients.

FIG. 29 is a flowchart illustrating another example process for significance map and coefficient level scanning according to sub-sets of transform coefficients. In this example, coding of the sign of the levels of the transform coefficients (176) is performed before the coding the levels (172, 174).

Figure 30:
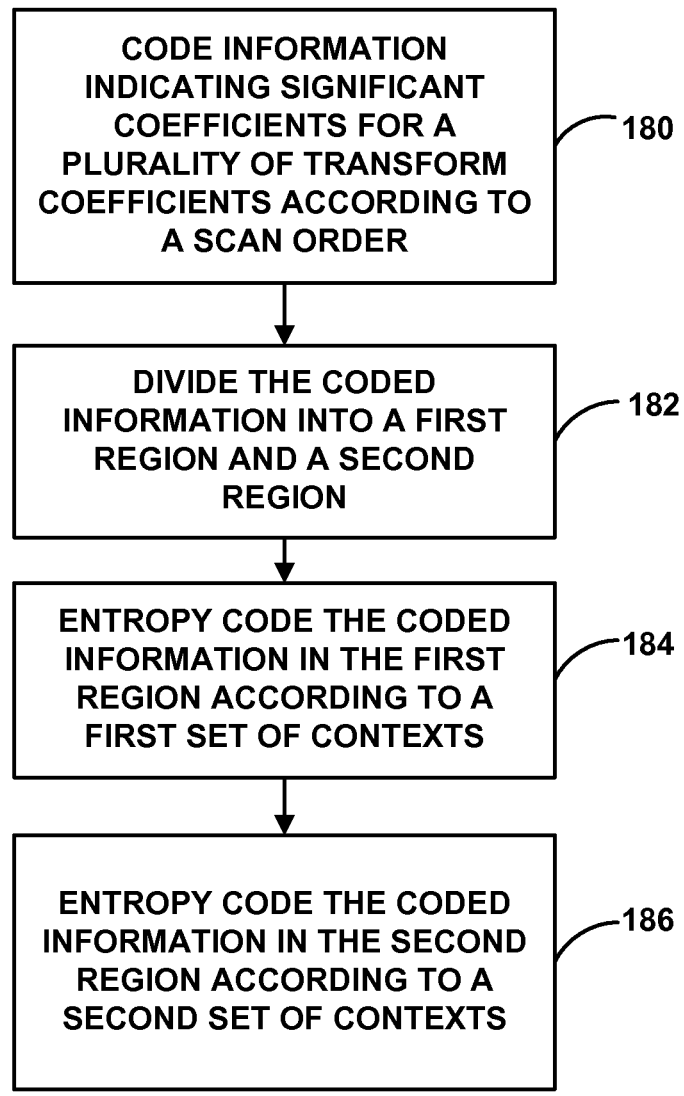
FIG. 30 is a flowchart illustrating an example process for entropy coding using multiple regions.

FIG. 30 is a flowchart illustrating an example process for entropy coding using multiple regions. A method of coding a plurality of transform coefficients associated with residual video data in a video coding process is proposed. The method may be performed by a video coder, such as video encoder 20 or video decoder 30 of FIG. 4. The video coder may be configured to code information indicating significant coefficients for the plurality of transform coefficients according to a scan order (180), divide the coded information into a first region and a second region (182), entropy code the coded information in the first region according to a first set of contexts using context adaptive binary arithmetic coding (184), and entropy code the coded information in the second region according to a second set of contexts using context adaptive binary arithmetic coding (186). In one example, the scan order has an inverse direction and a diagonal scan pattern. This method may also be applied to more than two regions, wherein each region has a set of contexts.

The first and second regions may be divided in several ways. In one example, the first region contains at least the DC component of the plurality of transform coefficients, and the second region contains the remaining plurality of transform coefficients not in the first region.

In another example, the first region contains all transform coefficients within a region defined by $x+y<T$, where x is the horizontal position of the transform coefficient, y is the vertical position of the transform coefficient, and T is a threshold. The first region may contain the DC coefficient. The second region contains the remaining plurality of transform coefficients not in the first region.

In another example, the first region contains all transform coefficients within a region defined by $x<T$ and $y<T$, where x is the horizontal position of the transform coefficient, y is the vertical position of the transform coefficient, and T is a threshold.

The second region contains the remaining plurality of transform coefficients not in the first region.

In another example, the first region contains the DC coefficient, the second region contains all transform coefficients (excluding the DC coefficient) within a region defined by $x<T$ and $y<T$, where x is the horizontal position of the transform coefficient, y is the vertical position of the transform coefficient, and T is a threshold, and the third regions contains the remaining plurality of transform coefficients not in the first region or the second region. In another example, the second and third regions described above may use the same method to derive contexts, but different context sets for each region are used.

In another example, the first region includes the DC component and the transform coefficients at positions (1,0) and (0,1). The second region contains the remaining plurality of transform coefficients not in the first region.

In another example, the first region contains only the DC component of the plurality of transform coefficients, and the second region contains the remaining plurality of transform coefficients.

In general, the first context for each transform coefficient in the first region is based on the position of each transform coefficient in the first region, while the second context for each transform coefficient in the second region is based on the coded information of causal neighbors of each transform coefficient. In some examples, the second context is further based on the position of each transform coefficient in the second region. In another example, the second context for each transform coefficient in the second region is based on the coded information of five causal neighbors of each transform coefficient.

Figure 31:
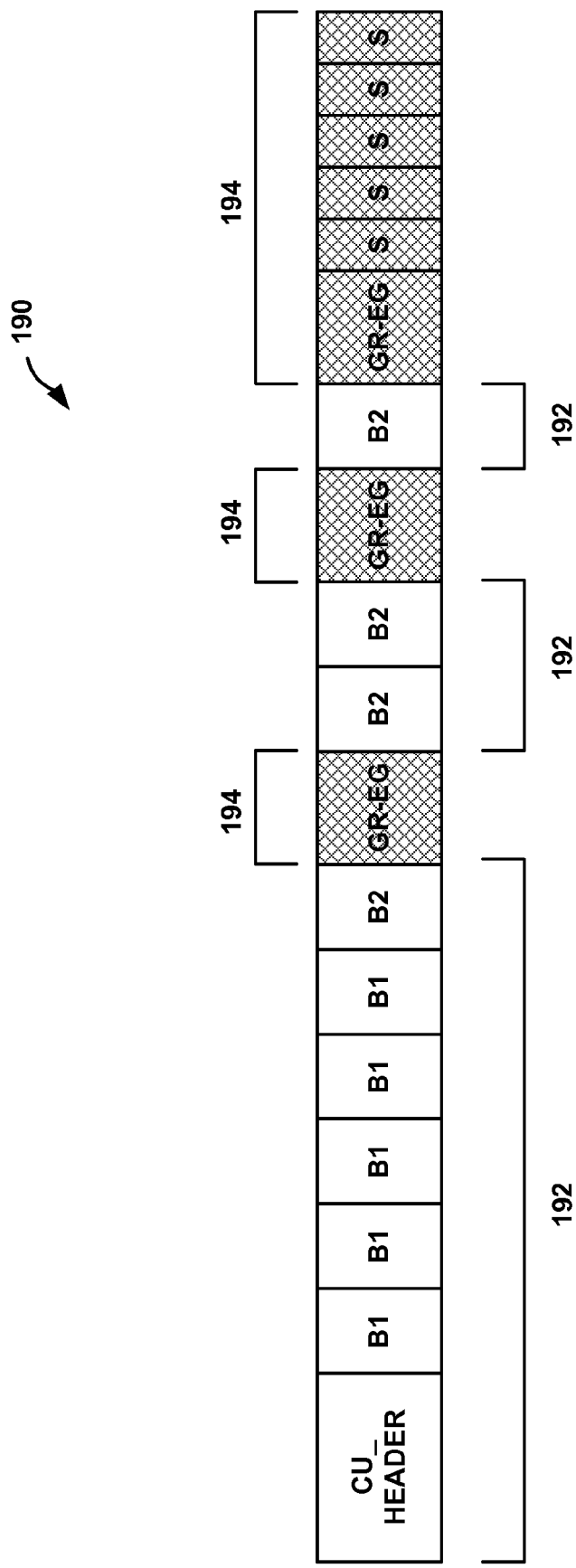
FIG. 31 is a conceptual diagram illustrating an example ordering of bins for coding transform coefficients associated with residual video data.

FIG. 31 illustrates an example ordering of bins 190 for coding transform coefficients associated with residual video data. A video coder (such as video encoder 20 or video decoder 30) may code bins 190 using two different coding modes. For example, the video coder may determine whether to code bins 190 using a context-adaptive coding mode, e.g., CABAC or another context-adaptive process (each of which is referred to herein as a "regular" mode), or a bypass coding mode (referred to as bypass mode). In the example shown in FIG. 31, the video coder may code bins 192 (un-shaded blocks) in a regular mode and may code bins 194 (shaded blocks) in a bypass mode. Bins 192 coded in regular mode may be referred to as "regular bins 192," while bins 194 coded in bypass mode may be referred to as "bypass bins 194."

To code bins 192 in a regular coding mode, the video coder may use a context adaptive probability model, as described above, e.g., by using a normal CABAC coding engine. That is, the regular mode of the CABAC process may use an adaptive context model, as discussed above, for example, with respect to entropy encoding unit 56 or entropy decoding unit 70. In contrast, to code bins 194 in a bypass mode, the video coder may use a simplified arithmetic coding process having a fixed probability. For example, the video coder may code bypass bins 194 with CABAC having a fixed context as a bypass mode. In some examples, the video coder may code bypass bins 194 using Golomb-Rice coding and/or exponential Golomb codes as a bypass coding mode. The video coder may determine whether to use the regular mode or the bypass mode based on, for example, how uniformly the bins are distributed in a block of transform coefficients. In some examples, the video coder may be preconfigured to code certain bins in a regular mode and other bins in a bypass mode.

In the example shown in FIG. 31, bins 190 include B1 (bin 1), B2 (bin 2), GR-EG (Golomb Rice-Exponential Golomb) bypass coded bin, S (sign), and cu_header, all of which may be provided in a CU. Bins 190 may correspond to the following syntax elements: B1 may correspond to coeff_abs_level_greater1_flag, B2 may correspond to coeff_abs_level_greater2_flag, GR-EG may correspond to coeff_abs_level_minus3, S may correspond to coeff_sign_flag, and cu_header may correspond to all other syntax elements in the CU. That is, in general, bin 1 for a particular transform coefficient may identify whether the particular transform coefficient has a value that is greater than 1. Likewise, bin 2 for a particular transform coefficient may identify whether the particular transform coefficient has a value that is greater than 2. In other examples, more or fewer syntax elements may be represented with bins 190.

As noted above, in one example and as proposed for use with the HEVC standard, a video coder may code transform coefficients in multiple coding passes, which may be referred to as scans. For example, the video coder may perform a first pass in a significance map scanning order on a full TU to code the significance of transform coefficients in the TU. The video coder may then perform three additional passes for sub-sets of transform coefficients in a coefficient level scanning order. These three passes may include: a first pass for a first bin (bin 1) of the absolute value of the coefficient level, a second pass for a second bin (bin 2) of the absolute value of the coefficient level, and a third pass for the remaining value of the coefficient level and the sign of the coefficient level. Again, in some examples, each of the three coefficient level passes may be performed in sub-sets of n (e.g., n=16) consecutive coefficients in scan order, as described above. When the three passes have been completed in one sub-set, the video coder may sequentially process the next sub-set by performing the same three coding passes. This sub-set coding approach may facilitate the parallelization of coding for the levels of the transform coefficients.

According to aspects of this disclosure, as noted above, the video coder may further enhance the parallelization and throughput of the residual data coding (e.g., using a context adaptive coding process, such as CABAC) through additional improvements in the reordering of data. For example, as described above, the video coder may perform one or more passes to code the significance of transform coefficients in a sub-set (e.g., following a scanning order). The video coder may then perform one or more additional passes to code the coefficient level of the coefficients in the sub-set (e.g., following the same scanning order). The scanning order may be characterized by a scan direction (forward or reverse) and scan pattern (e.g., horizontal, vertical, diagonal, zig-zag, or the like). In general, a pass may refer to a scan of the coefficients in a sub-set or an entire transform unit according to the scanning order. In examples in which sub-sets are used, the video coder may perform the passes on a sub-set by sub-set basis, with a sub-set containing any set of n transform coefficients (e.g., n=16 consecutive coefficients in a continuous scan order). In addition, the video coder may perform the passes sequentially within each sub-set. Although the use of one-dimensional sub-sets comprising consecutively scanned coefficients may be used in some instances, the coding process may also be applied to sub-blocks, such as 4×4 sub-blocks.

In an example, in addition to the three coding passes described above, the video coder may perform a fourth coding pass for significance information. That is, in addition to performing three coding passes described above for coefficient levels, the video coder may perform an additional coding pass to code significance information. Accordingly, in one example, the video coder may perform the following four passes: (1) code significant coefficient flag values for the transform coefficients, e.g., associated with a significance map, (2) code bin 1 and bin 2 of level values for transform coefficients, (3) code remaining bins of the coefficient level values, and (4) code the signs of the coefficient levels, all in the same scanning order. The video coder may scan significant coefficient flags and levels for the transform coefficients in the same scanning order, where the scanning order proceeds from a high frequency coefficient to a low frequency coefficient.

When the video coder performs the above-described three or four coding passes, however, the video coder may code some regular bins 192 with bypass bins 194 during the final coding pass. That is, in the example shown in FIG. 31, regular bins B2 are interleaved with bypass bins GR-EG and S in the bin string. Accordingly, the video coder must switch between regular mode and bypass mode during the final coding pass. Switching between coding modes may, in certain instances, negatively impact coding performance.

Figure 32:
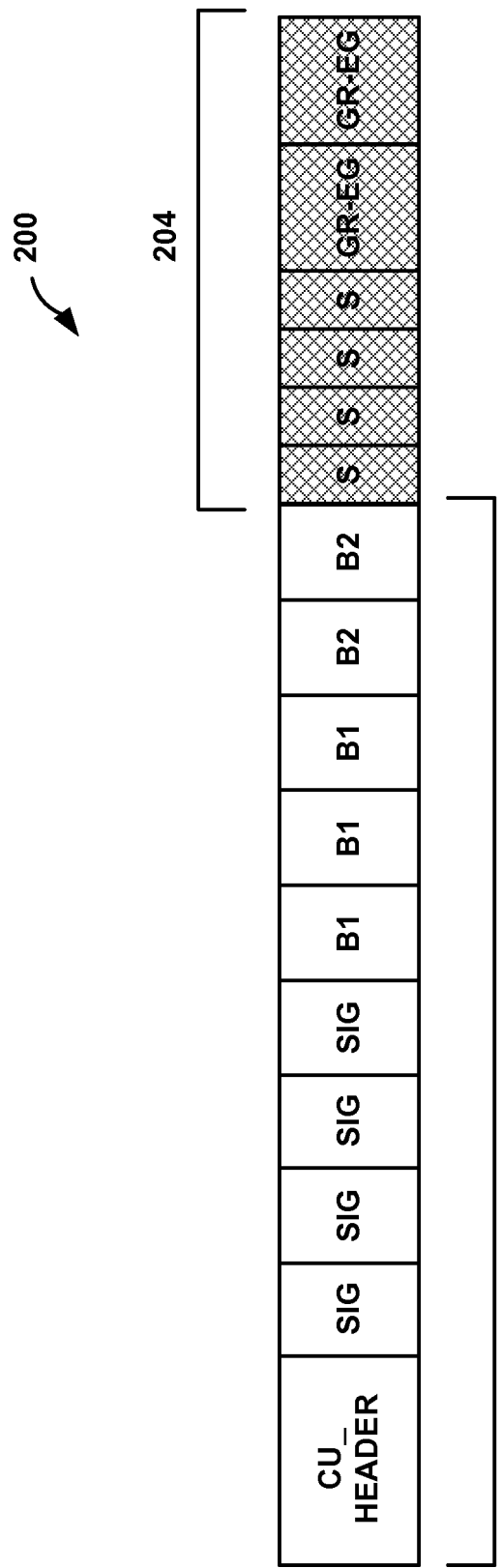
FIG. 32 is a conceptual diagram illustrating an example ordering and grouping of bins for coding transform coefficients associated with residual video data.

FIG. 32 illustrates an example ordering of bins 200 for coding transform coefficients associated with residual video data. As described with respect to the example shown in FIG. 31, a video coder (such as video encoder 20 or video decoder 30) may code bins 200 using two different coding modes, including a regular mode (e.g., CABAC or other context-adaptive mode) and a bypass mode. The bypass mode may be a mode that is not context-adaptive. For example, the bypass mode may be a fixed context binary arithmetic coding mode, a Golomb Rice coding mode, an Exponential Golomb coding mode, or any combination thereof. In the example shown in FIG. 32, the video coder may code bins 202 (un-shaded blocks) in a regular mode and may code bins 204 (shaded blocks) in a bypass mode. Bins 202 coded in regular mode may be referred to as "regular bins 202," while bins 204 coded in bypass mode may be referred to as "bypass bins 204."

In the example shown in FIG. 32, bins 200 include significance information, B1 (bin 1), B2 (bin 2), GR-EG (Golomb Rice-Exponential Golomb), S (sign), and cu_header, all of which may be provided in a coding unit (CU). Bins 200 may correspond to the following syntax elements: SIG may correspond to significance flags, B1 may correspond to coeff_abs_level_greater1_flag, B2 may correspond to coeff_abs_level_greater2_flag, GR-EG may correspond to coeff_abs_level_minus3, S may correspond to coeff_sign_flag, and cu_header may correspond to all other syntax elements in the CU. In other examples, more or fewer syntax elements may be represented with bins 200.

In the example shown in FIG. 32, the video coder may perform coding passes in a manner that groups regular bins 202 (i.e., bins coded in regular mode) and bypass bins 204 (i.e., bins coded in bypass mode). That is, the video coder may perform passes to code significance (SIG), a first bin (bin 1) and a second bin (bin 2) of coefficient levels, which are both coded in a regular mode, prior performing passes to code sign (S) and the remaining level (GR-EG), which are both coded in bypass mode. In this manner, the bypass coded elements, such as the bins for the sign and remaining level can be grouped together. That is, the bypass bins may be in a consecutive coding order that is not separated by bins coded in a regular mode. In some examples, as described with respect to the example of FIG. 31, the video coder may perform the coding passes on bins 200 in sub-sets of n (e.g., n=16) consecutive coefficients in scan order, as described above. When the video coder has completed coding one sub-set of transform coefficients, the video coder may sequentially process the next sub-set by performing the same coding passes.

Grouping bypass bins 204 together during coding may maximize throughput, because bypass bins 204 do not require context fetching and adaptation. In addition, the video coder does not have to switch between regular mode and bypass mode. As a result, many bypass bins 204 can be coded in a single cycle.

According to aspects of this disclosure, the video coder may perform the significance information and coefficient level coding passes, as described above, as well as group regular coded bins and bypass coded bins. That is, for example, the video coder may first code the significance of transform coefficients in a sub-set (e.g., following a scanning order), followed by the coefficient level of the coefficients in the sub-set (e.g., following the same scanning order) as described with respect to FIG. 31. In addition, the video coder may group regular coded bins and bypass coded bins, as shown in FIG. 32.

In an example, for each sub-set in a block of transform coefficients, the video coder may perform the following passes: (1) code the significance of the coefficients in the sub-set according to a scanning order, (2) code bin 1 of the coefficient level of the coefficients in the sub-set according to the scanning order, (3) code bin 2 of the coefficient level of the coefficients in the sub-set according to the scanning order, and (4) code bins that use bypass mode (e.g., the remaining of the absolute value of the coefficient level and the sign of the coefficient level of the coefficients) in the sub-set according to the scanning order.

In the above example, significance information is coded for transform coefficients in a set of transform coefficients according to a scan order in a first pass. A first set of one or more bins (e.g., bin 1 and bin 2) of information for the transform coefficients is coded according to the scan order in one or more second passes different from the first pass. The one or more bins (bin 1 and bin 2) in the first set are coded in a first mode, e.g., a regular mode, of a coding process (e.g., a CABAC process). A second set of one or more bins of information (e.g., remaining absolute value and sign of the coefficient level of the coefficients) for the transform coefficients are coded according to the scan order in one or more third passes different from the first and second passes. The second set of one or more bins are coded in a second mode, e.g., a bypass mode, of the coding process.

In another example, as described above with respect to FIGS. 7-9 above, the fourth pass described above may be split into two separate passes (e.g., one for the remaining portion of the level and one for the sign of the level). That is, the video coder may perform the following passes: (1) code of significant coefficient flag values for the transform coefficients (2) code bin 1 of level values for transform coefficients, (3) code bin 2 of level values for transform coefficients, (4) code the signs of the coefficient levels (e.g., in bypass mode), and (5) code remaining bins of the coefficient level values (e.g., in bypass mode), all passes using the same scanning order.

In still other examples, the video coder may use fewer passes to code the transform coefficients. For example, the video coder may perform a two pass scan where level and sign information are processed in parallel. In this example, the video coder may perform the following passes: (1) code regular bins (e.g., significance, bin 1 level, and bin 2 level), and (2) code bypass bins (e.g., remaining levels and sign), each pass using the same scanning order.

In these examples, the bypass bins are grouped together. That is, the bypass bins are coded without being separated by any regular bins in the bin string. In other examples, different bins may be context coded or bypass coded. In such examples, the video coder may perform similar coding passes in which regular bins are coded prior to the bypass bins, or vice versa, such that bypass bins are grouped. In some examples, as noted above, the video coder may begin the scan from the last significant coefficient in the block.

The processing of all transform coefficient data in sub-sets (e.g., sub-sets of 16 transform coefficients in scanning order) may benefit coding parallelization. That is, while one sub-set is being coded, the video coder may also pre-compute the CABAC contexts for the next sub-set. Accordingly, the video coder may be ready to begin coding the next sub-set when the previous sub-set is finished being coded. Also, the data fetching is limited to the size of the sub-set (e.g., 16 coefficients at a time), which may have benefits in some hardware architectures.

The scans described above, however, are not limited to being performed on sub-sets of transform coefficients in a TU. For example, each coding pass described above may be performed for a set of transform coefficients that includes the whole TU (i.e., all of the transform coefficients of the TU). In this example, each scan may extend across the entire TU. Accordingly, in an example, the video coder may perform the following passes: (1) code the significance of the coefficients in the TU according to the scanning order, (2) code bin 1 of the coefficient level of the coefficients in the TU according to the scanning order, (3) code bin 2 of the coefficient level of the coefficients in the TU according to the scanning order, and (4) code bins that use bypass mode (e.g., the remaining of the absolute value of the coefficient level and the sign of the coefficient level of the coefficients) in the TU according to the scanning order. In another example, as described above, the video coder may split the fourth pass into two separate passes (e.g., one for remaining of the level and one for the sign of the level). In this example, the bypass bins are still be grouped together.

In examples in which the coding passes are performed on the entire TU, the video coder essentially makes the sub-set size equal to the TU size. This approach may lose some of the parallelization capabilities described above for relatively small sub-sets (of n coefficients, where n may be, e.g., 16). However, performing the coding passes on the entire TU may have other benefits that might outweigh the loss of parallelization. For example, grouping all of the bypass bins in a TU together at the end of residual data coding may increase throughput, as described above, because many bypass bins can be coded in a single cycle. That is, the video coder may code all of the bins that are coded in a regular mode prior to coding the bins that are coded in a bypass mode.

In addition, when the video coder performs the coding passes on the entire TU, each syntax element is coded separately from the rest of syntax elements within the TU. For example, first, the video coder codes all of the significance information for the coefficients. The video coder then codes all of bin 1 of the coefficient level, followed by all of bin 2 of the coefficients level, followed by the bypass bins (e.g., remaining coefficient level and sign, which may be separated into two passes or coded in the same pass). Hence, the syntax elements for a TU may be included together in a bin string, separately from other syntax elements, rather than in an interleaved manner with other syntax elements. Avoiding the interleaving of syntax elements may benefit a speculative coding process. That is, in some instances, the video coder may perform speculative coding (for parallel coding). In such instances, the video coder may estimate certain bin values in order to pre-compute values. The video coder may benefit from knowing a syntax element to be processed in advance, because fewer estimates for the following (uncoded) bins are required. The separation reaches its maximum in a TU when each syntax element is separated for the whole TU from the rest of the syntax elements. In such instances, the video coder may perform speculative coding and maximize the number of bins that may be coded in parallel.

Figure 33:
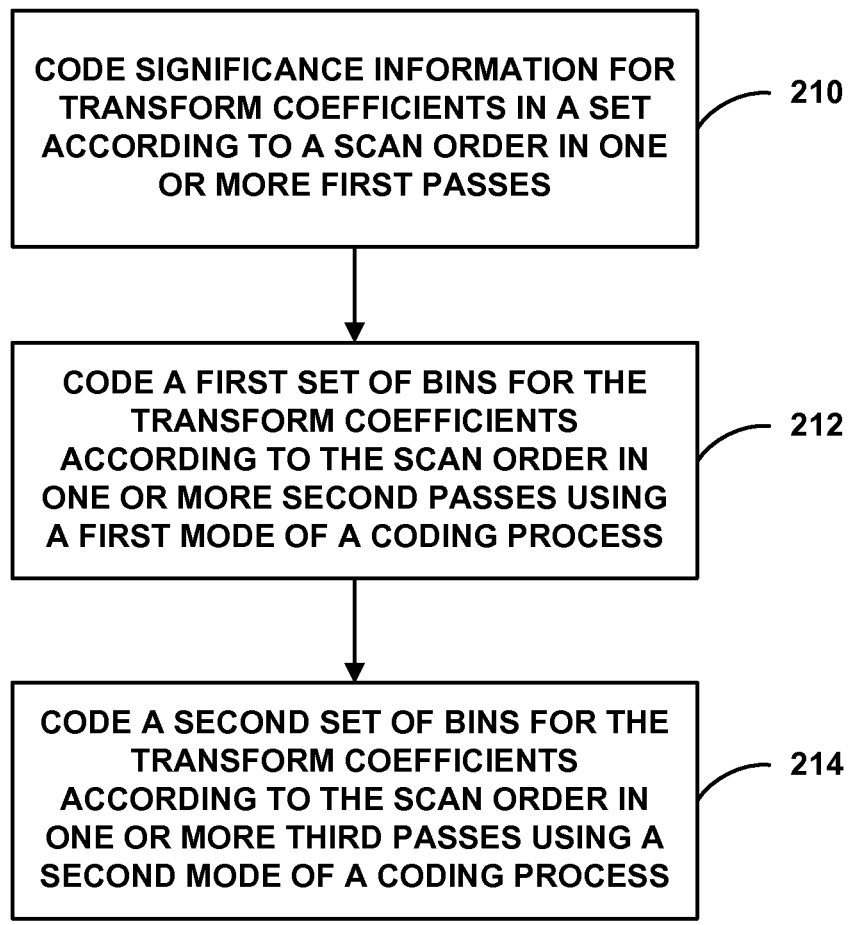
FIG. 33 is a flowchart illustrating an example video coding process for coding transform coefficients associated with residual video data.

FIG. 33 is a flowchart illustrating an example video coding process for coding transform coefficients associated with residual video data. While the example shown in FIG. 33 is described generally with respect to a video coder (such as video encoder 20 and/or video decoder 30), it should be understood that the techniques may be performed by a variety of other processors, processing units, hardware-based coding units such as encoder/decoders (CODECs), and the like. In addition, while the example shown in FIG. 33 generally refers to "transform coefficients," it should be understood that in some instances, a video coder may not perform transformation on residual data, and instead perform quantization directly on residual values (e.g., when performing a "transform skip mode"). Accordingly, "transform coefficients" may generally include transformed as well as non-transformed residual video data.

In the example shown in FIG. 33, a video coder codes significance information (e.g., a significance map) for transform coefficients in a set of transform coefficients associated with residual video data according to a scan order in one or more first passes (210). In some examples, the set of transform coefficients may correspond to a sub-set of transform coefficients that includes less than all of the transform coefficients in a TU. For example, the sub-set may include n coefficients, where n is smaller than the number of transform coefficients in the TU. In an example, n may be 16 transform coefficients. In other examples, the set of transform coefficients may correspond to an entire set of transform coefficients in a TU (i.e., all of the transform coefficients in the TU).

The video coder may also code a first set of one or more bins of information for the transform coefficients according to the scan order in one or more second passes, where the one or more second passes are different from the one or more first passes, and where the first set of one or more bins are coded in a first mode of a coding process (212). For example, the first set of one or more bins of information may include level information associated with the transform coefficients. In addition, the first mode of the coding process may be a regular mode of a context adaptive coding process, such as CABAC. Accordingly, the video coder may code certain level information associated with the transform coefficients in the same scan order as the significance information, and in the regular mode. In some examples, the regular coding mode may also be used to code the significance information.

In addition, the video coder may code a second set of one or more bins of information for the transform coefficients according to the scan order in one or more third passes, where the one or more third passes are different from the one or more first and second passes, and where the second set of one or more bins are coded in a second mode of the coding process (214). For example, the second set of one or more bins of information may include remaining level information associated with the transform coefficients that is not included in the first set of one or more bins. In addition, the second mode of the coding process may be a bypass mode of a context adaptive coding process, such as CABAC. The bypass mode may use a fixed context. In some examples, bypass bins may be coded using Golomb-Rice coding and/or exponential Golomb codes. Accordingly, the video coder may code certain remaining level information associated with the transform coefficients in the same scan order as the significance information and the first set of one or more bins, but in the bypass mode. That is, the bins coded using bypass mode may be grouped in coding order, without being separated by bins coded in a regular mode.

Accordingly, in at least one example, the video coder may perform a four pass coding process to code transform coefficients associated with a block of residual video data. For example, as described above with respect to FIGS. 7-9, the video coder may perform the following for passes:
1. Code the significance of the coefficients in the sub-set.
2. Code bin 1 of the coefficient level of the coefficients in the sub-set.
3. Code bin 2 of the coefficient level of the coefficients in the sub-set.
4. Code bins that use bypass mode (e.g., the remaining of the absolute value of the coefficient level and sign of the coefficient level of the coefficients) in the sub-set.

In this example, the first set of one or more bins may include bin 1 and bin 2, which the video coder may code using a regular mode (e.g., using CABAC, CAVLC, PIPE, or the like), while coding the remaining bins in bypass mode. In addition, the second set of one or more bins may include the bins that use bypass mode. That is, the video coder may group bin 3 through bin n (with bin n representing the final bin) together and code the bins in a single pass. In other examples, the video coder may use more or fewer passes to code the transform coefficients. For example, the video coder may code the first set of one or more bins in a single, first pass and the second set of one or more bins in a second pass. In another example, the fourth pass described above can be split in two separated passes (for sign and remaining level).

Grouping bins coded using the second coding mode (e.g., bypass bins) may increase coding efficiency and throughput. For example, rather than having to wait for a context model to be updated after each bin is encoded (e.g., as is needed for context adaptive coding), bypass bins can be immediately coded in succession (e.g., due to the fixed probability used for bypass encoding). In addition, while one set of bypass bins is being coded, the video coder may pre-compute the contexts for the next set of bypass bins. Accordingly, the video coder is ready to begin the coding process when the previous bins are finished.

As noted above, the set of transform coefficients may correspond to a sub-set of transform coefficients that includes less than all of the transform coefficients in a TU. In such examples, there may be a benefit for some hardware architectures. For example, coding transform coefficients in sub-sets may be more efficient in terms of memory utilization, because less data must be stored and accessed during coding. In addition, the video coder may code one or more of the sub-sets in parallel.

In other examples, the set of transform coefficients may correspond to an entire set of transform coefficients in a TU (i.e., all of the transform coefficients in the TU). Coding the transform coefficients for an entire TU may result in the loss of some parallelization compatibility. There may be some benefits, however, to coding the transform coefficients for a TU. For example, grouping all of the bypass bins for an entire TU together at the end of the residual data coding may increase throughput, as described above. In addition, the video coder may perform speculative coding of certain syntax elements, as described above.

It should be understood that the steps shown and described with respect to FIG. 33 are provided as merely one example. That is, the steps of the method of FIG. 33 need not necessarily be performed in the order shown in FIG. 33, and fewer, additional, or alternative steps may be performed.

In one or more examples, the functions described in this disclosure may be implemented in hardware, software, firmware, or any combination thereof. If implemented in software, the functions may be performed by a hardware-based processing unit, such as one or more processors, that execute the software in the form of computer-readable instructions or code. Such instructions or code may be stored on or transmitted over a computer-readable medium and executed by a hardware-based processing unit. Computer-readable media may include computer-readable storage media, which corresponds to a tangible, non-transitory medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, Flash memory, CD-ROM or any other solid state, optical or magnetic data storage media, including optical disk storage, magnetic disk storage, or other magnetic storage devices, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that tangible computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be performed by a wide variety of devices or apparatuses, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. In addition, such techniques may be implemented by an integrated circuit (IC) or a set of ICs (e.g., a chip set). A device configured to perform the techniques of the this disclosure may include any of the devices mentioned above and, in some cases, may be a video encoder or video decoder, or combined video encoder-decoder, i.e., a video CODEC, which may be formed by a combination of hardware, software, and firmware. Various components, modules, or units may be described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding transform coefficients associated with residual video data in a video coding process, the method comprising:
   coding a sub-set of transform coefficients associated with the residual video data that comprises fewer than all transform coefficients of a block using a plurality of passes, wherein each pass of the plurality of passes comprises a scan of the sub-set of transform coefficients in a scan order, wherein the scan order comprises an order in which the sub-set of transform coefficients are processed during coding, and wherein coding the sub-set of transform coefficients comprises:
   coding significance information for the sub-set of transform coefficients using a first mode of a coding process in one or more first passes;
   coding a first bin and a second bin of levels of the transform coefficients for the sub-set of transform coefficients using the first mode of the coding process in one or more second passes, wherein the one or more second passes are separate from the one or more first passes; and
   coding remaining bins of the levels of the transform coefficients and a sign of the levels of the transform coefficients for the sub-set of transform coefficients using a second mode of the coding process in one or more third passes, wherein the one or more third passes are separate from the one or more first and second passes.

2. The method of claim 1, wherein the first mode is a regular mode of a Context Adaptive Binary Arithmetic Coding (CABAC) process and the second mode is a bypass mode of the CABAC process.

3. The method of claim 2, wherein the regular mode of the CABAC process uses an adaptive context model to code bins and the bypass mode of the CABAC process uses fixed probabilities to code bins.

4. The method of claim 1, further comprising repeating the coding for each of a plurality of sub-sets of transform coefficients in the block, wherein each sub-set comprises less than all of the entire set of transform coefficients in the block.

5. The method of claim 1, wherein each of the sub-sets comprises sixteen consecutive coefficients in the scan order.

6. The method of claim 1, wherein each of the sub-sets comprises a sub-block of transform coefficients in the scan order.

7. The method of claim 1, wherein the significance information of the one or more first passes and the first bin and the second bin of the levels of the one or more second passes are grouped together for coding for the sub-set.

8. The method of claim 1, wherein coding comprises encoding, and wherein encoding comprises including information representing the significance information, the first bin and the second bin of the levels of the transform coefficients, the remaining bins of the levels of the transform coefficients and the sign of the levels of the transform coefficients in an encoded bitstream.

9. The method of claim 1, wherein coding comprises decoding, and wherein decoding comprises receiving information representing the significance information, the first bin and the second bin of the levels of the transform coefficients, the remaining bins of the levels of the transform coefficients and the sign of the levels of the transform coefficients in an encoded bitstream.

10. The method of claim 9, wherein decoding further comprises:
   determining transform coefficients for a block of video data from the information representing the significance information, the first bin and the second bin of the levels of the transform coefficients, the remaining bins of the levels of the transform coefficients and the sign of the levels of the transform coefficients;

applying an inverse transform to the determined transform coefficients to generate a block of residual video data; and combining the block of residual video data with a predictive block of video data to form a reconstructed block of video data.

11. An apparatus for coding transform coefficients associated with residual video data, the apparatus comprising:
a memory configured to store the residual video data; and
one or more processors configured to code a sub-set of transform coefficients associated with the residual video data that comprises fewer than all transform coefficients of a block using a plurality of passes, wherein each pass of the plurality of passes comprises a scan of the sub-set of transform coefficients in a scan order, wherein the scan order comprises an order in which the sub-set of transform coefficients are processed during coding, and wherein to code the sub-set of transform coefficients, the one or more processors are configured to:
code significance information for the sub-set of transform coefficients using a first mode of a coding process in one or more first passes;
code a first bin and a second bin of levels of the transform coefficients for the sub-set of transform coefficients using the first mode of the coding process in one or more second passes, wherein the one or more second passes are separate from the one or more first passes, and wherein the first set of one or more bins are coded in a first mode of a coding process; and
code remaining bins of the levels of the transform coefficients and a sign of the levels of the transform coefficients for the sub-set of transform coefficients using a second mode of the coding process in one or more third passes, wherein the one or more third passes are separate from the one or more first and second passes.

12. The apparatus of claim 11, wherein the first mode is a regular mode of a Context Adaptive Binary Arithmetic Coding (CABAC) process and the second mode is a bypass mode of the CABAC process.

13. The apparatus of claim 12, wherein the regular mode of the CABAC process uses an adaptive context model to code bins and the bypass mode of the CABAC process uses fixed probabilities to code bins.

14. The apparatus of claim 11, wherein the one or more processors are further configured to repeat the coding for each of a plurality of sub-sets of transform coefficients in the block, wherein each sub-set comprises less than all of the entire set of transform coefficients in the block.

15. The apparatus of claim 11, wherein each of the sub-sets comprises sixteen consecutive coefficients in the scan order.

16. The apparatus of claim 11, wherein each of the sub-sets comprises a sub-block of transform coefficients in the scan order.

17. The apparatus of claim 11, wherein the significance information of the one or more first passes and the first bin and the second bin of the levels of the one or more second passes are grouped together for coding for the sub-set.

18. The apparatus of claim 11, wherein to code the one or more processors are configured to encode, and wherein encoding comprises including information representing the significance information, the first bin and the second bin of the levels of the transform coefficients, the remaining bins of the levels of the transform coefficients and the sign of the levels of the transform coefficients in an encoded bitstream.

19. The apparatus of claim 11, wherein to code the one or more processors are configured to decode, and wherein decoding comprises receiving information representing the significance information, the first bin and the second bin of the levels of the transform coefficients, the remaining bins of the levels of the transform coefficients and the sign of the levels of the transform coefficients.

20. The apparatus of claim 19, wherein to decode the one or more processors are further configured to:
determine transform coefficients for a block of video data from the information representing the significance information, the first bin and the second bin of the levels of the transform coefficients, the remaining bins of the levels of the transform coefficients and the sign of the levels of the transform coefficients;
apply an inverse transform to the determined transform coefficients to generate a block of residual video data; and
combine the block of residual video data with a predictive block of video data to form a reconstructed block of video data.

21. An apparatus for coding transform coefficients associated with residual video data, the apparatus comprising:
means for coding a sub-set of transform coefficients associated with the residual video data that comprises fewer than all transform coefficients of a block using a plurality of passes, wherein each pass of the plurality of passes comprises a scan of the sub-set of transform coefficients in a scan order, wherein the scan order comprises an order in which the sub-set of transform coefficients are processed during coding, and wherein the means for coding the sub-set of transform coefficients comprises:
means for coding significance information for the sub-set of transform coefficients using a first mode of a coding process in one or more first passes;
means for coding a first bin and a second bin of levels of the transform coefficients for the sub-set of transform coefficients using the first mode of the coding process in one or more second passes, wherein the one or more second passes are separate from the one or more first passes; and
means for coding remaining bins of the levels of the transform coefficients and a sign of the levels of the transform coefficients for the sub-set of transform coefficients using a second mode of the coding process in one or more third passes, wherein the one or more third passes are separate from the one or more first and second passes.

22. The apparatus of claim 21, wherein the first mode is a regular mode of a Context Adaptive Binary Arithmetic Coding (CABAC) process and the second mode is a bypass mode of the CABAC process.

23. The apparatus of claim 22, wherein the regular mode of the CABAC process uses an adaptive context model to code bins and the bypass mode of the CABAC process uses fixed probabilities to code bins.

24. The apparatus of claim 21, further comprising means for repeating the coding for each of a plurality of sub-sets of transform coefficients in the block, wherein each sub-set comprises less than all of the entire set of transform coefficients in the block.

25. The apparatus of claim 21, wherein each of the sub-sets comprises sixteen consecutive coefficients in the scan order.

26. The apparatus of claim 21, wherein each of the sub-sets comprises a sub-block of transform coefficients in the scan order.

27. The apparatus of claim 21, wherein the significance information of the one or more first passes and the first bin and the second bin of the levels of the one or more second passes are grouped together for coding for the sub-set.

28. The apparatus of claim 21, wherein means for coding comprises means for encoding, and wherein means for encoding comprises means for including information representing the significance information, the first bin and the second bin of the levels of the transform coefficients, the remaining bins of the levels of the transform coefficients and the sign of the levels of the transform coefficients in an encoded bitstream.

29. The apparatus of claim 21, wherein means for coding comprises means for decoding, and wherein means for decoding comprises means for receiving information representing the significance information, the first bin and the second bin of the levels of the transform coefficients, the remaining bins of the levels of the transform coefficients and the sign of the levels of the transform coefficients in an encoded bitstream.

30. The apparatus of claim 29, wherein means for decoding further comprises:
  means for determining transform coefficients for a block of video data from the information representing the significance information, the first bin and the second bin of the levels of the transform coefficients, the remaining bins of the levels of the transform coefficients and the sign of the levels of the transform coefficients;
  means for applying an inverse transform to the determined transform coefficients to generate a block of residual video data; and
  means for combining the block of residual video data with a predictive block of video data to form a reconstructed block of video data.

31. A non-transitory computer readable storage medium having instructions stored thereon that, when executed, cause one or more processors to:
  code a sub-set of transform coefficients associated with the residual video data that comprises fewer than all transform coefficients of a transform block using a plurality of passes, wherein each pass of the plurality of passes comprises a scan of the sub-set of transform coefficients in a scan order, wherein the scan order comprises an order in which the sub-set of transform coefficients are processed during coding, and wherein to code the sub-set of transform coefficients, the instructions cause the one or more processors to:
    code significance information for the sub-set of transform coefficients using a first mode of a coding process in one or more first passes;
    code a first bin and a second bin of levels of the transform coefficients for the sub-set of transform coefficients using the first mode of the coding process in one or more second passes, wherein the one or more second passes are separate from the one or more first passes; and
    code remaining bins of the levels of the transform coefficients and a sign of the levels of the transform coefficients for the sub-set of transform coefficients using a second mode of the coding process in one or more third passes, wherein the one or more third passes are separate from the one or more first and second passes.

32. The non-transitory computer readable storage medium of claim 31, wherein the first mode is a regular mode of a Context Adaptive Binary Arithmetic Coding (CABAC) process and the second mode is a bypass mode of the CABAC process.

33. The non-transitory computer readable storage medium of claim 32, wherein the regular mode of the CABAC process uses an adaptive context model to code bins and the bypass mode of the CABAC process uses fixed probabilities to code bins.

34. The non-transitory computer readable storage medium of claim 31, further comprising instructions that cause the one or more processors to repeat the coding for each of a plurality of sub-sets of transform coefficients in the block, wherein each sub-set comprises less than all of the entire set of transform coefficients in the block.

35. The non-transitory computer readable storage medium of claim 31, wherein each of the sub-sets comprises sixteen consecutive coefficients in the scan order.

36. The non-transitory computer readable storage medium of claim 31, wherein each of the sub-sets comprises a sub-block of transform coefficients in the scan order.

37. The non-transitory computer readable storage medium of claim 31, wherein the significance information of the one or more first passes and the first bin and the second bin of the levels of the one or more second passes are grouped together for coding for the sub-set.

38. The non-transitory computer readable storage medium of claim 31, wherein to code comprises encoding, and wherein the instructions cause the one or more processors to include information representing the significance information, the first bin and the second bin of the levels of the transform coefficients, the remaining bins of the levels of the transform coefficients and the sign of the levels of the transform coefficients in an encoded bitstream.

39. The non-transitory computer readable storage medium of claim 31, wherein to code comprises decoding, and wherein the instructions cause the one or more processors to receive information representing the significance information, the first bin and the second bin of the levels of the transform coefficients, the remaining bins of the levels of the transform coefficients and the sign of the levels of the transform coefficients in an encoded bitstream.

40. The non-transitory computer readable storage medium of claim 39, wherein the instructions further cause the one or more processors to:
  determine transform coefficients for a block of video data from the information representing the significance information, the first bin and the second bin of the levels of the transform coefficients, the remaining bins of the levels of the transform coefficients and the sign of the levels of the transform coefficients;
  apply an inverse transform to the determined transform coefficients to generate a block of residual video data; and
  combine the block of residual video data with a predictive block of video data to form a reconstructed block of video data.

* * * * *